(12) United States Patent
Letunovskiy et al.

(10) Patent No.: US 12,542,919 B2
(45) Date of Patent: Feb. 3, 2026

(54) APPARATUS AND METHOD FOR CODING PICTURES USING A CONVOLUTIONAL NEURAL NETWORK

(71) Applicant: HUAWEI TECHNOLOGIES CO., LTD., Shenzhen (CN)

(72) Inventors: Alexey Aleksandrovich Letunovskiy, Moscow (RU); Denis Vladimirovich Parkhomenko, Saint Petersburg (RU); Alexander Andreevich Pletnev, Moscow (RU); Andrey Sergeevich Shutkin, Moscow (RU); Anuar Taskynov, Moscow (RU); Haitao Yang, Shenzhen (CN); Xiang Ma, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 18/456,346

(22) Filed: Aug. 25, 2023

(65) Prior Publication Data

US 2024/0064318 A1     Feb. 22, 2024

Related U.S. Application Data

(63) Continuation of application No. PCT/RU2021/000082, filed on Feb. 25, 2021.

(51) Int. Cl.
*H04N 19/42*     (2014.01)
*G06N 3/0455*     (2023.01)
(Continued)

(52) U.S. Cl.
CPC .......... *H04N 19/42* (2014.11); *G06N 3/0455* (2023.01); *G06N 3/084* (2013.01); *H04N 19/172* (2014.11); *H04N 19/463* (2014.11)

(58) Field of Classification Search
CPC .... H04N 19/42; H04N 19/172; H04N 19/463; H04N 19/117; H04N 19/132;
(Continued)

(56) References Cited

U.S. PATENT DOCUMENTS

2019/0075301 A1    3/2019   Chou et al.
2019/0230354 A1    7/2019   Kim
(Continued)

FOREIGN PATENT DOCUMENTS

WO     2017222140 A1     12/2017

OTHER PUBLICATIONS

Yin (Intel) H. et al: "AHG9: Adaptive convolutional neural network loop filter", 13th JVET Meeting; Jan. 9, 2019-Jan. 18, 2019; Marrakech; (The Joint Video Exploration Team (JVET) of ITU-T SG 16 and ISO/IEC JTC 1/SC 29/WG 11), No. JVET-M0566, XP030253871, Jan. 13, 2019.

(Continued)

*Primary Examiner* — Nam D Pham
(74) *Attorney, Agent, or Firm* — Leydig, Voit & Mayer, Ltd.

(57) ABSTRACT

The present disclosure relates to encoding and decoding of a picture or a plurality of pictures (e.g. video) using a neural network which is partially trained online. Accordingly, at an encoder, one or more layers are selected which are to be trained. Then, the training of the neural network is performed, in which parameters of the selected layers are updated. The parameters of the remaining layers are maintained and not updated. The updated parameters are provided within a bitstream. The picture(s) is/are also encoded. The decoder receives an indication of the updated parameters, updates only those parameters indicated, and applies the so obtained neural network.

22 Claims, 29 Drawing Sheets

(51) Int. Cl.
   *G06N 3/084* (2023.01)
   *H04N 19/172* (2014.01)
   *H04N 19/463* (2014.01)

(58) Field of Classification Search
   CPC ...... H04N 19/14; H04N 19/147; H04N 19/80;
             H04N 19/82; H04N 19/30; H04N 19/70;
             H04N 19/85; G06N 3/0455; G06N 3/084;
             G06N 3/0464; G06N 3/0495; G06N
             3/096
   See application file for complete search history.

(56) References Cited

U.S. PATENT DOCUMENTS

2020/0210840 A1* 7/2020 Darvish Rouhani .. G06N 3/082
2021/0397876 A1* 12/2021 Hemani ............... G06V 10/761
2022/0156584 A1* 5/2022 Fersch .................... G10L 19/00

OTHER PUBLICATIONS

Zhang et al., "Multi-Instance Multi-Label Learning of Natural Scene Images: via Sparse Coding and Multi-Layer Neural Network," IET Comput. Vis., 2018, vol. 12, No. 3, ISSN: 1751-9632, doi.10.1049/iet-cvi.2016.0338, www.ietdl.org, XP006079139, total 8 pages, IET Journals The Institution of Engineering and Technology (Apr. 1, 2018).

"Series H: Audiovisual and Multimedia Systems, Infrastructure of audiovisual services—Coding of moving video, Information technology—Generic coding of moving pictures and associated audio information: Video: Frame packing arrangement signalling for 3D content," ITU-T Telecommunication Standardization Sector of ITU, H.262 Amendment 4 (Feb. 2012), total 238 pages, International Union of Telecommunication, Geneva, Switzerland (Feb. 2012).

"Series H: Audiovisual and Multimedia Systems Infrastructure of audiovisual services—Coding of moving video, Video coding for low bit rate communication," ITU-T Recommendation H.263, ITU-T Telecommunication Standardization Sector of ITU, H.263 (Jan. 2005), total 226 pages, International Union of Telecommunication, Geneva, Switzerland (Jan. 2005).

Series H: Audiovisual and Multimedia Systems Infrastructure of audiovisual services—Coding of moving video, Advanced video coding for generic audiovisual services, Recommendation ITU-T H.264, ITU-T Telecommunication Standardization Sector of ITU, H.264 (Feb. 2014), total 790 pages, International Union of Telecommunication, Geneva, Switzerland (Feb. 2014).

"Series H: Audiovisual and Multimedia Systems Infrastructure of audiovisual services—Coding of moving video, High efficiency video coding," Recommendation ITU-T H.265, ITU-T Telecommunication Standardization Sector of ITU, H.265 (Apr. 2015), total 634 pages, International Union of Telecommunication, Geneva, Switzerland (Apr. 2015).

"Line Transmission of Non-Telephone Signals, Video Codec for Audiovisual Services AT p×64 kbits," ITU-T Recommendation H.261, ITU-T Telecommunication Standardization Sector of ITU, H.261 (Mar. 1993), total 29 pages, International Union of Telecommunication, Geneva, Switzerland (Mar. 1993).

Oseledets, "Tensor-Train Decomposition," 2011 Society for Industrial and Applied Mathematics, SIAM, vol. 33, No. 5, Total 23 pages (Jan. 2011).

Yin et al., "CE10-1.7: Adaptive convolutional neural network loop filter," Joint Video Experts Team (JVET) of ITU-T SG 16 WP 3 and ISO/IEC JTC 1/SC 29/WG 11 15th Meeting: Gothenburg, JVET-O0063, total 4 pages (Jul. 2019).

"Convolutional neural network." Wikipedia, Online: https://static.hlt.bme.hu/semantics/external/pages/LSTM/en.wikipedia.org/wiki/Convolutional_neural_network.html#:~:text=In, last edited on Feb. 9, 2019, total 31 pages (Nov. 2018).

Dony et al., "Neural Network Approaches to Image Compression," Proceedings of the IEEE, vol. 83, No. 2, Total 16 pages (Feb. 1995).

He et al., "A Video Compression Framework Using an Overfitted Restoration Neural Network," Total 5 pages (Jun. 14-19, 2020).

Zou et al., "L2C—Learning to Learn to Compress," 2020 IEEE 22nd International Workshop on Multimedia Signal Processing (MMSP), arXiv:2007.16054v1 [eess.IV], Total 6 pages (Jul. 2020).

Lam et al., "Efficient Adaptation of Neural Network Filter for Video Compression," Proceedings of the 28th ACM International Conference on Multimedia (MM '20), Oct. 12-16, 2020, arXiv:2007.14267v2 [eess.IV], total 8 pages (Aug. 2020).

Lam et al., "Compressing Weight-updates for Image Artifacts Removal Neural Networks," CVPR Workshops 2019, arXiv:1905.04079v2 [cs.LG], total 5 pages (Jun. 2019).

Babin et al., "CNN inference acceleration using dictionary of centroids," arXiv:1810.08612, Total 7 pages (Oct. 2018).

* cited by examiner

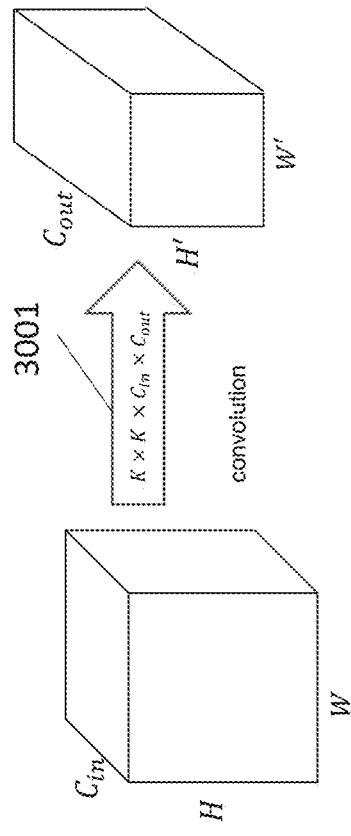
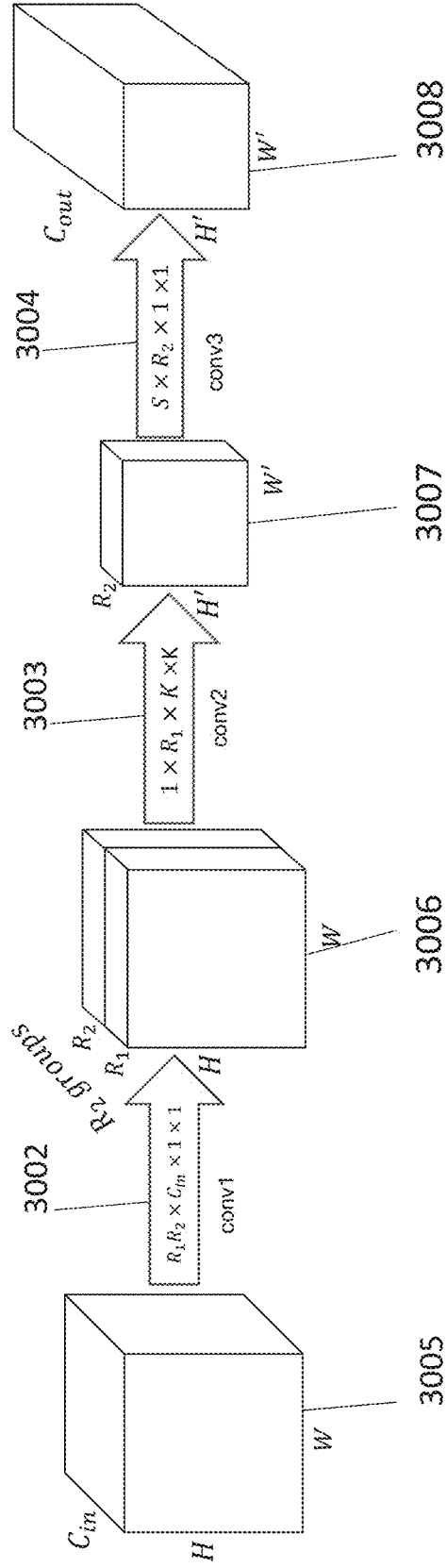
Fig. 3

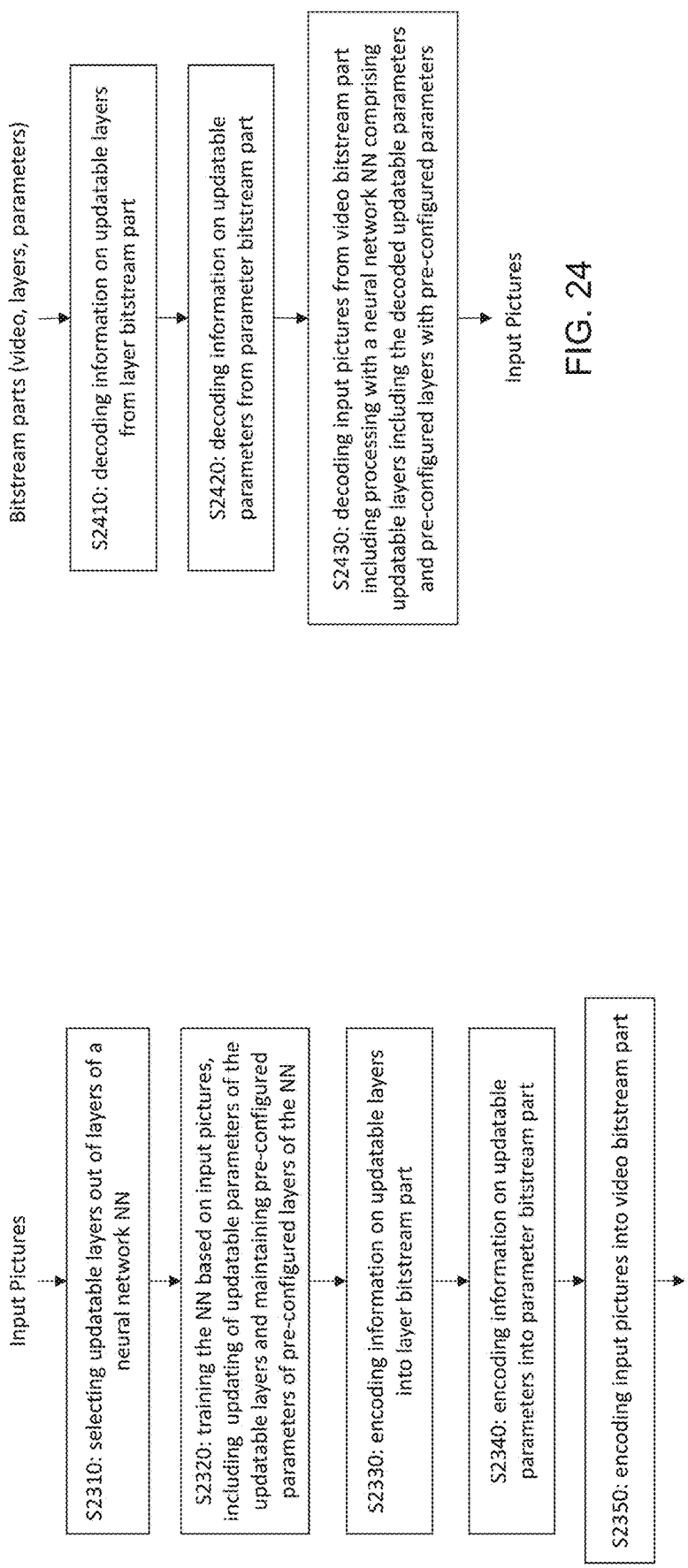

APPARATUS AND METHOD FOR CODING PICTURES USING A CONVOLUTIONAL NEURAL NETWORK

CROSS-REFERENCE TO RELATED APPLICATIONS

This application is a continuation of International Application No. PCT/RU2021/000082, filed on Feb. 25, 2021, the disclosure of which is hereby incorporated by reference in its entirety.

TECHNICAL FIELD

The present disclosure relates to encoding and decoding of pictures, and, in particular, to encoding and decoding of pictures using a neural network, e.g. a neural network as in-loop filter or post-processing filter.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, mobile device video recording, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, VP8, VP9, AV1, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266, Versatile Video Coding (VVC) and extensions, such as scalability and/or three-dimensional (3D) extensions, of these standards.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

The encoding and decoding of the video may be performed by standard video encoders and decoders, compatible with H.264/AVC, HEVC (H.265), VVC (H.266) or other video coding technologies, for example.

SUMMARY

The embodiments of the present disclosure provide apparatuses and methods for encoding and decoding or general processing of pictures using a neural network.

According to an embodiment, an apparatus is provided for encoding one or more input pictures including using a neural network (NN), the apparatus comprising: a processing circuitry configured to: select, out of layers of the neural network, one or more updatable layers; train, based on the one or more input pictures, the neural network including updating one or more parameters of the one or more (selected) updatable layers and maintaining parameters of one or more pre-configured layers out of the layers of the neural network; encode information on the updated one or more parameters of the one or more updatable layers into a parameter bitstream part; and encode the one or more input pictures into a picture bitstream part. The training of the neural network by re-training or updating of only a sub-set (e.g. one or more, but not all) of all layers of the neural network, namely the one or more updatable layers having updatable parameters, allows to accelerate the NN training and hence reduce the time for the NN training. Moreover, the signaling overhead is reduced as information on updated parameters (after the NN training) is encoded. Hence, only a part of the NN parameters is encoded and not the parametrization of the whole network.

According to an implementation, the processing circuitry is further configured to encode information on the one or more updatable layers into a layer bitstream part. For example, the information on the one or more updatable layers includes layer indices of the one or more updatable layers, and the layer indices are indices of the one or more updatable layers out of the layers of the neural network indexed according to a pre-set rule. Accordingly, updating information on the updatable layers may not be needed, and hence reduces the signaling overhead. In turn, if signaled, the signaling overhead is still reduced as the information relates to the updatable layers (one or more, but not all) as opposed to the whole layers of the neural network. Hence, the bit amount of the layer bitstream part is small.

In another example, an updatable layer has one or more updatable parameters and one or more pre-configured parameters; the processing circuitry is configured to train the neural network by updating the one or more updatable parameters of the one or more updatable layers and maintaining the one or more pre-configured parameters. Accordingly, the training of the neural network by re-training or updating of only a subset (one or more, but not all) of all layers of the neural network, namely the one or more updatable layers having updatable parameters, allows to accelerate the NN training and hence reduce the time for the NN training. Moreover, the overhead for calculating and signaling update information on the updated parameters is reduced, as not all of updatable parameters of said updatable layer may be updated. Hence, the amount of parameters updated during the NN training is further reduced.

In one exemplary implementation, the updatable layer comprises an updatable sublayer with weights which are the one or more updatable parameters, and a pre-configured sublayer with weights which are the one or more pre-configured parameters. The same input of the updatable layer is provided to the updatable sublayer and to the pre-configured sublayer. The output of the updatable layer is an elementwise sum of the updatable sublayer and the pre-configured sublayer. The use of sublayers of the updatable layer and training the weights of the updatable sublayer while maintaining the pre-configured weights allows training of the updatable layer based on weights changes with reference to pre-configured weights. This is referred to as delta-weight training. Accordingly, the NN training by re-training and updating of only a subset (one or more, but not all) of all layers of the neural network, namely the one or more updatable layers having updatable parameters, allows accelerating the NN training and hence reducing the time for the NN training, since pre-configured weights are used as reference for said training. In other words, the convergence of the NN training is accelerated.

According to an implementation, the updatable sublayer comprises a sparse neural network. As a result, the number of the parameters of the updatable sublayer is reduced. For example, the updatable sublayer comprises a tensor train neural network layer.

Moreover, the processing circuitry is configured to update the one or more updatable parameters by a training method less complex than a training method used to train the one or more pre-configured parameters. Accordingly, the complexity of the NN training by re-training and updating of only a subset (one or more, but not all) of all layers of the neural network is reduced, and hence may save training costs (e.g. complexity, latency, or the like).

In an implementation example, the one or more updatable layers are convolutional layers. Moreover, at least one of the following applies: (i) the less complex training processes less parameter updates than the training method used to train the one or more pre-configured parameters; (ii) the less complex training updates a smaller convolutional kernel than the training method used to train the one or more pre-configured parameters. Accordingly, the time required for the NN training by re-training and updating of only a subset (one or more, but not all) of all layers of the neural network is reduced. Moreover, a smaller convolutional kernel has as output less updated parameters, and hence reduces the signaling overhead of said updated parameters.

Furthermore, the processing circuitry is configured to: update the one or more updatable parameters of the one or more updatable layers by initializing them pseudo-randomly; and perform the training with pairs of an original picture and a reconstructed picture. Accordingly, the updatable layers are initialized quickly and in a simple manner, and hence reduces the training complexity.

In some embodiments, the processing circuitry is configured to train the neural network by updating the one or more parameters of the one or more updatable layers based on pairs of an original picture and a reconstructed picture. The reconstructed picture is, for example, an input to the NN, and the NN (respectively, the one or more parameters of the one or more updatable layers) is trained to reduce the difference between the reconstructed picture and the corresponding original picture. For example, the one or more parameters of the one or more updatable layers include weights of the one or more updatable layers. Accordingly, the architecture of the neural network has a low complexity since the updatable layer does not comprise in this case two sublayers arranged in parallel.

According to an implementation, the processing circuitry is further configured to: pre configure by pre-training, based on the one or more input pictures, the neural network including updating parameters of the one or more pre-configured layers less frequently than the training of the one or more updatable layers; and encode information on the updated parameters of the one or more pre-configured layers into a network bitstream part. Accordingly, the actual training of the neural network by re-training and updating of only a subset (one or more, but not all) of all layers of the neural network may be improved by using updated pre-configured parameters. Hence, information related to less frequently updated pre-configured parameters is separated from information related to more frequently updated updatable parameters.

Moreover, the processing circuitry is further configured to: obtain a plurality of sets of pre-configured layers; and select, out of the plurality of sets of pre-configured layers, a set comprising said one or more pre-configured layers of the neural network; wherein the information on the updated parameters is an indication of the selected set. The indication of the selected set may be an index of the respective neural network layers. Alternatively, the indication may be the parameters of the NN. Accordingly, the NN training by re-training and updating of only a subset (one or more, but not all) of all layers of the neural network may be adapted to a particular compression task by selecting an existing NN (i.e. a NN pre-configured by pre-training), and hence improves the overall NN training.

For example, the selection of the layers and/or updating is performed in different intervals. Hence, an interference between layer selection and layer update may be avoided, which improves the performance and robustness of the NN training. Further, the NN training by re-training and updating of only a subset (one or more, but not all) of all layers of the neural network may be adapted according to preferences to either layer selection or layer update.

Furthermore, the information on the one or more updatable layers is encoded less frequently than the information on the updated one or more parameters of the one or more updatable layers. This means that the selection of the updatable layer is performed less frequently than the re-training of the parameters of the updatable layer. Accordingly, the NN training by re-training and updating of only a subset (one or more, but not all) of all layers of the neural network may be performed with preference to layer update (i.e. updated parameters) as opposed to layer selection, which accelerates the NN training.

In some exemplary implementations, the training is based on a first number of pairs of input pictures and reconstructed pictures. The encoding of the information on the updated one or more parameters is performed after encoding of the first number of input pictures, and the trained neural network is to be applied to a second number of reconstructed pictures. The second number is larger than the first number. Accordingly, the NN training by re-training and updating of only a subset (one or more, but not all) of all layers of the neural network may be performed on a smaller set of input picture pairs while the decoder-side NN may be applied to a larger set of input pictures, and hence accelerate the NN training and make it less complex. Still, there may be a regular adaption to the picture content.

According to an example, the one or more pre-configured layers and/or the one or more updatable layers of the neural network are convolutional layers.

Further, the processing circuitry is configured to select the one or more updatable layers based on an optimization of a cost function including at least one of rate, distortion, and complexity. Accordingly, the one or more updatable layers may be selected in an optimized manner, and hence improves the overall training of the neural network by re-training and updating of only a subset (one or more, but not all) of all layers of the neural network.

In one implementation, the neural network is a neural network trained for post-filtering.

Moreover, the encoding of the one or more pictures is performed using the neural network.

In another implementation, the neural network is trained to perform one out of in-loop filtering, end-to-end picture coding, adaptive sampling, and coding of picture coding parameters. Accordingly, the same architecture of the neural network may be used to train the NN for different kinds of video compression tasks. Hence, the NN training by re-training and updating of only a subset (one or more, but not all) of all layers of the neural network may be performed in a flexible manner and adapted to a variety of tasks.

According to an embodiment, an apparatus is provided for decoding one or more input pictures including using a neural network. The apparatus comprises a processing circuitry configured to: decode, from a parameter bitstream part, information on one or more parameters of one or more (selected) updatable layers; and decode, from a picture bitstream part, the one or more input pictures including processing with the neural network, wherein the neural network comprises: the one or more updatable layers including the decoded one or more parameters; one or more pre-configured layers with pre-configured parameters. Accordingly, updating the neural network by updating only a subset (one or more, but not all) of all layers of the neural network, namely the one or more updatable layers having updatable parameters, allows reducing the signaling overhead to signal the information to update the NN and to accelerate the update of the NN. Moreover, the overhead for calculating and signaling update information on the updated parameters is reduced, as not all of updatable parameters of said updatable layer may be updated. Furthermore, the one or more input pictures may be decoded quickly by use of the neural network using updated parameters having an amount less than the amount of the pre-configured parameters. Hence, efficiency of the picture decoding is improved while ensuring a high quality of the decoded pictures as updated NN parameters are used.

In an implementation, the processing circuitry is configured to decode, from a layer bitstream part, information on one or more updatable layers. For example, the information on the one or more updatable layers includes layer indices of the one or more updatable layers; and the layer indices are indices of the one or more updatable layers out of the layers of the neural network indexed according to a pre-set rule. Accordingly, the decoder may not need to decode information on the updatable layers, and hence reduces the signaling overhead for processing the update information. In turn, if signaled, the overhead for decoding is still reduced as the information relates to the updatable layers as opposed to all layers of the neural network. Hence, the bit amount of the layer bitstream part being decoded is still small, and hence allows for a quick decoding of update information on the updatable layers.

In an exemplary implementation, an updatable layer has one or more updatable parameters and one or more pre-configured parameters; and the processing circuitry is configured to update the one or more updatable parameters of the one or more updatable layers and maintaining the one or more pre-configured parameters. Accordingly, the NN-based picture decoding may be accelerated further as well as the overhead for decoding information on the updated parameters, as not all of updatable parameters of said updatable layer may be updated. Hence, the amount of parameters representing the updated parameter configuration of the NN is further reduced.

In some exemplary implementations, the updatable layer comprises an updatable sublayer with weights being the one or more updatable parameters and a pre-configured sublayer with weights being the one or more pre-configured parameters; the same input of the updatable layer is provided to the updatable sublayer and to the pre-configured sublayer; and the output of the updatable layer is an elementwise sum of the updatable sublayer and the pre-configured sublayer. Accordingly, the picture decoding is accelerated, since only weight changes are updated while pre-configured weights are used as reference.

According to an example, the updatable sublayer comprises or is a sparse neural network layer. As a result, the number of the parameters of the updatable sublayer is reduced. Moreover, the updatable sublayer comprises a tensor train neural network layer. The tensor train neural network is an example of a sparse NN.

In one exemplary implementation, the one or more updatable layers are convolutional layers; and at least one of the following applies: the updatable sublayer has less parameters than the pre-configured sublayer; the updatable sublayer applies a smaller convolutional kernel than the pre-configured sublayer. Accordingly, the time required for the picture decoding is reduced. Moreover, a smaller convolutional kernel has less updated parameters, and hence reduces the amount data being processed.

Further, the one or more parameters of the one or more updatable layers include weights of the one or more updatable layers. As a result, the updatable parameters of the updatable layers are the weights being directly updated. Accordingly, the architecture of the neural network has a low complexity since the convolutional layer does not comprise in this case two sublayers arranged in parallel.

In some exemplary implementations, the processing circuitry is further configured to: decode, from a network bitstream part, information on updated parameters of the one or more pre-configured layers; and update the pre-configured parameters based on the information on the updated parameters less frequently than the updatable parameters. Accordingly, the picture decoding may be improved by using updated pre-configured parameters for the decoder-side NN. Further, information on the updated pre-configured parameters is decoded from a network bitstream part separate from the other bitstream parts (video, parameter, layer). Hence, information related to less frequently updated pre-configured parameters is separated from information related to more frequently updated updatable parameters.

For example, the processing circuitry is further configured to: obtain, from the information on the updated parameters, an indication of a selected set out of a plurality of sets of pre-configured layers, wherein the selected set comprises said one or more pre-configured layers of the neural network. Accordingly, the decoding may be adapted to a particular compression task by using another existing NN (i.e. a network pre-configured e.g. by pre-training), and hence improves the overall picture decoding.

Furthermore, the information on the one or more updatable layers is decoded less frequently than the information on the updated one or more parameters of the one or more updatable layers. Accordingly, the decoding may be performed with preference to layer update (i.e. updated parameters) as opposed to layer selection (i.e. updated layer indices), accelerating the picture decoding. Hence, an interference between layer update (i.e. updated layer indices) and parameter update may be avoided, improving the performance and robustness of the decoding. Further, the decoding may be adapted according to preferences to either layer update or parameter update. Hence, the decoding may be performed in a flexible manner and adapted to a specific task.

In one exemplary implementation, wherein the one or more pre-configured layers and/or the one or more updatable layers of the neural network are convolutional layers.

For example, the neural network is applied for post-filtering.

According to an implementation, the decoding of the one or more pictures is performed using the neural network.

In another example, the neural network is applied for in-loop filtering, picture decoding, adaptive sampling, and decoding of picture coding parameters. Accordingly, the same architecture of the neural network may be used to decode the input pictures for different kind of video compression tasks. Hence, the decoding may be performed in a flexible manner and adapted to a variety of tasks, including post-filter and in-loop filter.

According to an embodiment, a method is provided for encoding one or more input pictures including using a neural network, the method comprising steps of: selecting, out of layers of the neural network, one or more updatable layers; training, based on the one or more input pictures, the neural network including updating one or more parameters of the one or more updatable layers and maintaining parameters of one or more pre-configured layers out of the layers of the neural network; encoding information on the updated one or more parameters of the one or more updatable layers into a parameter bitstream part; and encoding the one or more input pictures into a picture bitstream part.

According to an embodiment, a method is provided for decoding one or more input pictures including using a neural network, the method comprising steps of: decoding, from a parameter bitstream part, information on one or more parameters of one or more updatable layers; and decoding, from a picture bitstream part, the one or more input pictures including processing with the neural network, wherein the neural network comprises: the one or more updatable layers including the decoded one or more parameters; one or more pre-configured layers with pre-configured parameters.

Further methods comprise implementations and examples of the encoding and decoding method, which correspond to the implementations and examples for the encoding and decoding apparatus described above.

The methods provide similar advantages as the apparatuses performing the corresponding steps and described above.

According to an embodiment, provided is a computer-readable non-transitory medium storing a program, including instructions which when executed on one or more processors cause the one or more processors to perform the above methods for encoding and/or decoding of one or more input pictures including using a neural network.

According to an embodiment, an apparatus is provided for encoding one or more input pictures including using a neural network, the apparatus comprising: one or more processors; and a non-transitory computer-readable storage medium coupled to the one or more processors and storing programming for execution by the one or more processors, wherein the programming, when executed by the one or more processors, configures the encoder to carry out the encoding method according to any of the embodiments, implementations and examples herein.

According to an embodiment, an apparatus is provided for decoding one or more input pictures including using a neural network, the apparatus comprising: one or more processors; and a non-transitory computer-readable storage medium coupled to the one or more processors and storing programming for execution by the one or more processors, wherein the programming, when executed by the one or more processors, configures the apparatus to carry out the decoding method according to any of the embodiments, implementations and examples herein.

According to an embodiment, provided is as computer program comprising a program code for performing the method when executed on a computer according to any one of the embodiments and examples herein.

The updatable layers may also be referred to as adaptive or adaptable layers or layers selected to be updated (e.g. by online training at the encoder, in particular by online training for a specific picture set or video sequence to be coded) to distinguish these layers or the set of these layers (of the NN) from other or all remaining layers or a set of other or all remaining layers (of the NN) that are not updated or not to be updated (in other words fixed or static, e.g. keeping their weight values). Correspondingly, updatable parameters may also be referred to as adaptive or adaptable parameters or parameters selected to be updated (e.g. through the selection of the layers or sublayers to be updated) to distinguish these parameters from other or remaining parameters (of the NN) that are not updated or not to be updated (in other words fixed or static, e.g. parameters of layers or sublayers not to be updated.

Embodiments of the present disclosure can be implemented in hardware (HW) and/or software (SW) or in any combination thereof. Moreover, HW-based implementations may be combined with SW-based implementations.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 3 a schematic drawing illustrating a usual and a lightweight (tensor trained) convolutional layer architecture.

FIG. 23 is a flowchart illustrating an encoding method using a neural network according to an embodiment.

FIG. 24 is a flowchart illustrating a decoding method using a neural network according to an embodiment.

DETAILED DESCRIPTION OF THE EMBODIMENTS

Figure 1:
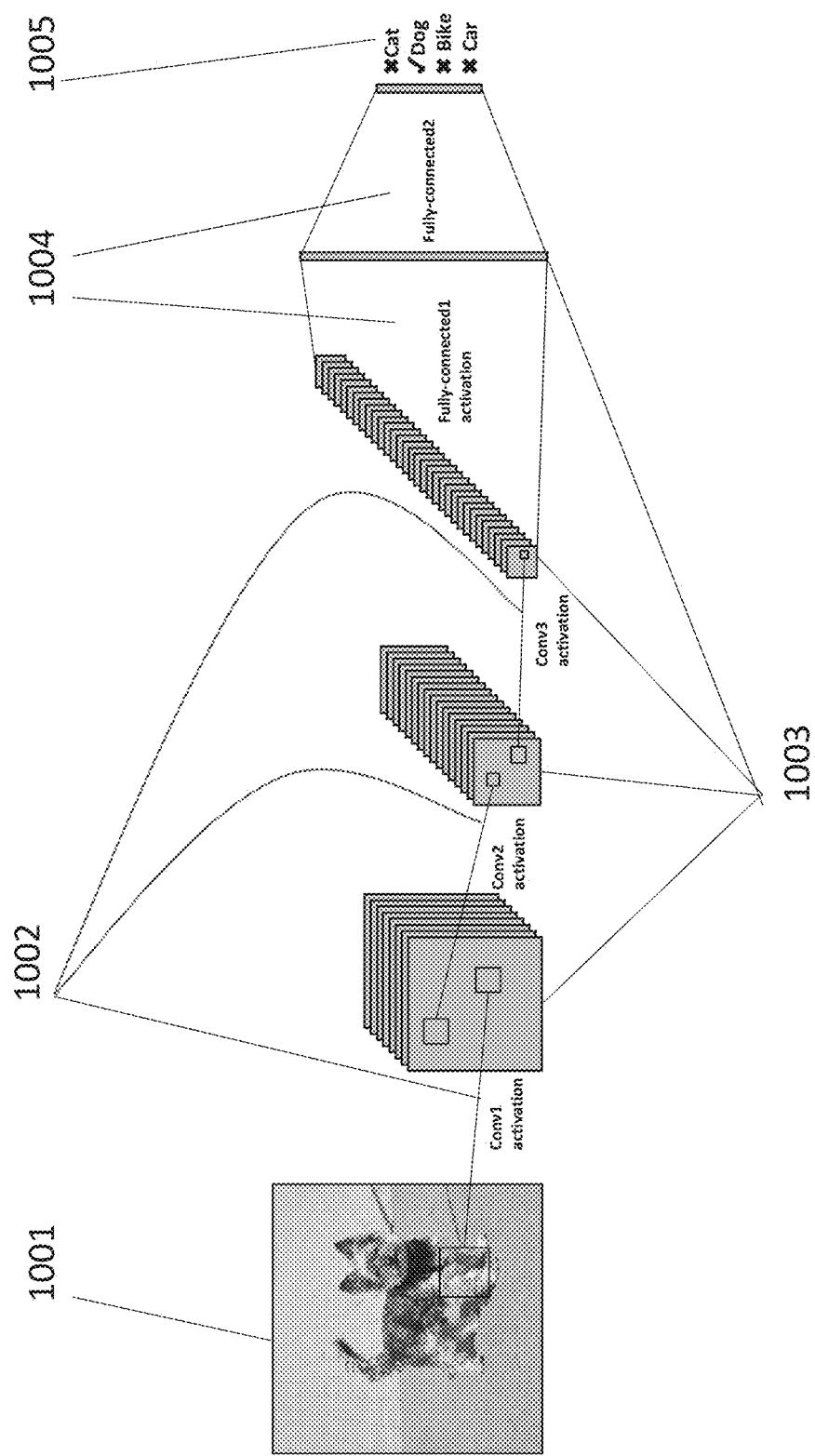
FIG. 1 is a schematic drawing illustrating an exemplary convolutional neural network processing.

In the following description, reference is made to the accompanying figures, which form part of the disclosure, and which show, by way of illustration, aspects of embodiments or aspects in which embodiments may be used. It is understood that embodiments may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of method steps is described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission errors or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2-D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter-predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

The past decade has witnessed great success of deep learning technologies in many disciplines, especially in computer vision (CV) and image processing. Recently, there have been a lot of attempts to apply deep-learning (DL) to data compression, such as image/video compression, but also to some other data compression including audio data compression, 3D data (e.g. point-cloud data) compression, etc. For example, for video compression, there is a lot of attempts to use neural networks to enhance or even replace some modules in the traditional video codec architecture, including modules for:

Deep learning based intra prediction: In the traditional intra prediction, the neighboring reconstructed samples of a coding block are used to get the prediction of the samples inside the coding block along a specific straight direction (or some fixed pattern) which is indicated by an intra prediction mode. By performing the deep learning with reference samples, the generated prediction sample value could be more flexible, and could be more similar to the samples inside the current coding block.

Deep learning based inter prediction: In the traditional inter prediction, the reference blocks in a reference picture are used to get the prediction of the samples inside the current coding block, by using a simple weighting method. By performing the deep learning with the reference blocks, more flexible predictions can be obtained, which could be more similar with the samples inside the current coding block.

Deep learning based entropy coding: In the traditional entropy coding, some neighboring information or priori knowledge are used as context, which will be used to estimate the probability of a syntax value for arithmetic coding. By using deep learning with context, a more accurate probability could be estimated.

Deep learning based adaptive sampling: In the codec area, there is a classical method, in which the spatial resolution of the video will be reduced by downsampling, and then fed to the encoder. While in the decoder, after getting the reconstructed image of the video, an upsampling will be done. With the deep learning method, the up-sampled images could have a higher quality. Similarly, the adaptive sampling also could be used in the temporal domain.

Also, there is another important attempt in using the deep learning technology to reduce or even remove coding artifacts so as to enhance the overall quality (objective quality or subjective quality) of decoded pictures. Neural network (like CNN) based enhancement filters are the most common deep-learning techniques, which may be applied in data compression, such as video compression.

Picture and/or video coding solutions (or codecs respectively frameworks), which use traditional codecs like JPEG (Joint Photographic Experts Group), H.264, H.265, H.266 or MPEG EVC (Motion Picture Experts Group-Enhanced Video Coding) as basis and replace or improve parts or tools (like in-loop filters or post-processing filters) using neural networks or other artificial intelligence (AI) solutions are also referred to as hybrid AI based picture or video coding or AI-enhanced picture or video coding solutions (or codecs respectively frameworks). Embodiments of the present disclosure relate, for example, to such hybrid AI based picture or video coding.

In order to better understand the forthcoming discussion, some terms with respect to exemplary encoding and decoding approaches are introduced which are referred to throughout the description.

Figure 25:
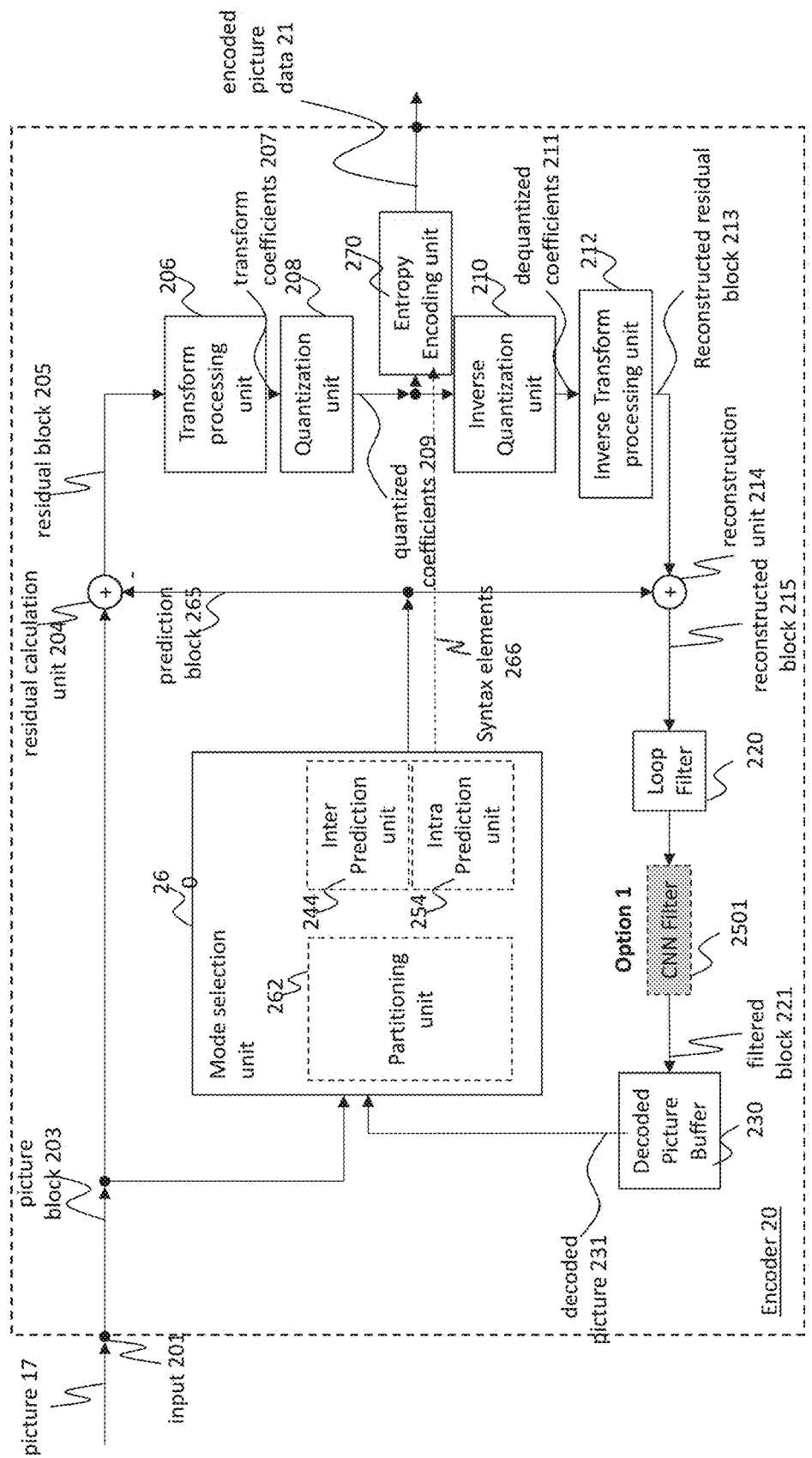
FIG. 25 is a block diagram showing an example of a video encoder configured to implement embodiments of the present disclosure.

FIG. 25 shows a schematic block diagram of an example video encoder 20 that is configured to implement the techniques of the present application. In the example of FIG. 25, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 25 may also be referred to as hybrid video encoder or a video encoder according to a hybrid video codec.

Figure 26:
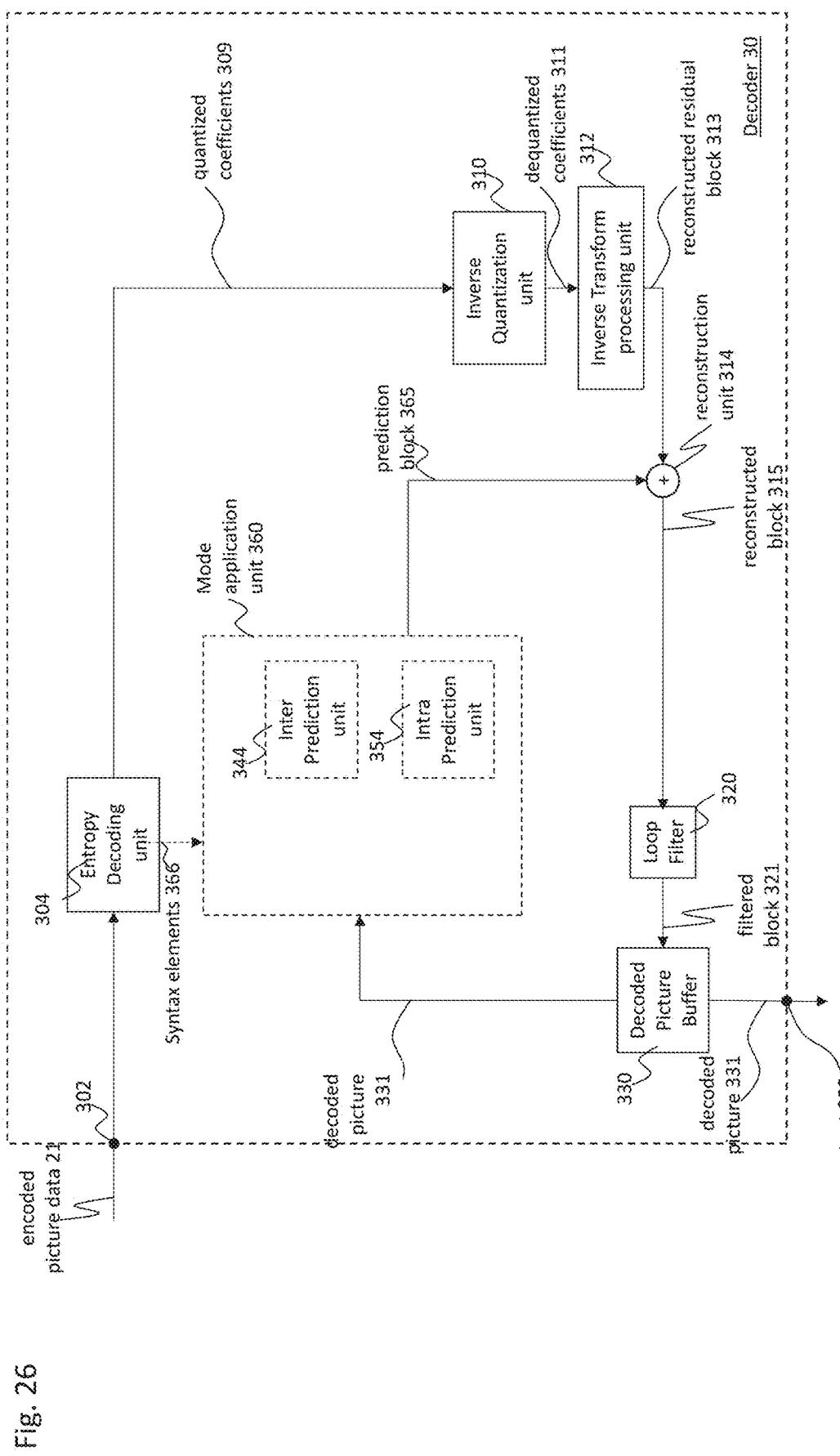
FIG. 26 is a block diagram showing an example structure of a video decoder configured to implement embodiments of the present disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 26). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity, the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 25) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 25 may be configured to encode the picture 17 block by block, e.g. the encoding and prediction is performed per block 203.

Embodiments of the video encoder 20 as shown in FIG. 25 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 25 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. They may be implemented, for example, by a neural network as will be explained in more detail later. Although the loop filter unit 220 is shown in FIG. 25 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode, which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to VVC, a coding tree unit (CTU) may be split into coding units (CUs) by using a quad-tree, ternary tree and/or binary coding tree. In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied. The inter prediction unit 244 may include a motion estimation (ME) unit and a motion compensation (MC) unit (both not shown in FIG. 25). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 26 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 26, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 25.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 26), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 26 as being an in loop filter, in other configurations, the loop filter unit 320 may be implemented as a post loop filter.

The decoded video blocks 321 of a picture are then stored in decoded picture buffer 330, which stores the decoded pictures 331 as reference pictures for subsequent motion compensation for other pictures and/or for output respectively display. The decoder 30 is configured to output the decoded picture 311, e.g. via output 312, for presentation or viewing to a user.

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles. Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles. Embodiments of the video decoder 30 as shown in FIG. 26 may be configured to partition and/or decode the picture by using slices (also referred to as video slices), wherein a picture may be partitioned into or decoded using one or more slices (typically non-overlapping), and each slice may comprise one or more blocks (e.g. CTUs). Embodiments of the video decoder 30 as shown in FIG. 26 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks. Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit. It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering. Some further terms used herein are explained below.

Coding artifact compression artifact: For an image or images in a video, after coding or compression, when viewing the decoded/decompressed/reconstructed image or video, there could be some artifacts such as a block artifact, blur artifact, ring artifact, contouring artifact, or some other artifact. Those artifacts will affect the objective quality and/or the subjective quality of the image/video. In other words, the term artifact typically refers to picture distortions visible by a human eye, e.g. parts of picture, which do not belong there such as additional edges caused by block based coding or the like.

Image enhancement: Increase of the objective quality and/or subjective quality of an image (or an image in a video sequence), which has, for example, a low quality as a result of the compression (e.g. using deblocking, deblurring, or some other method). It is noted that the term subjective quality in the context of picture coding typically denotes a quality measure that correlates well with the human perceptual score. There are many metrics known in the art which measure (estimate) subjective quality based on some objective video parameters.

Loopfilter or in-loopfilter: The filter is used to increase the quality of the decoded picture, like a deblocking filter, sample adaptive offset filter or adaptive loop filter. The filtered picture can be used as a reference picture for the prediction of another (e.g. next) picture, for example, based on inter-prediction.

Post filter: The filter is used to increase the quality of the decoded picture, like deblocking filter, sample adaptive offset filter, or adaptive loop filter. The filtered picture will NOT be used as a reference picture for the prediction of other pictures. The difference between the loop filter (or in-loop filter) and the post filter is whether the filtered picture will be used for prediction to encode/decode other pictures.

Picture size: refers to the width w or height h or the width-height pair of a picture. The width and height of an image is usually measured in the number of luma samples.

Downsampling: Downsampling is a process, where the sampling rate (sampling interval) of the discrete input signal is reduced. For example, if the input signal is an image, which has a size of h and w, and the output of the downsampling has a size of h2 and w2, at least one of the following holds true:

h2<h
w2<w.

In one example implementation, downsampling can be implemented as keeping only each m-th sample, while discarding the rest of the input signal (e.g. image).

Upsampling: Upsampling is a process, where the sampling rate (sampling interval) of the discrete input signal is increased. For example, if the input image has a size of h and w, and the output of the downsampling has a size h2 and w2, at least one of the following holds true:

h<h2
w<w2.

Resampling: downsampling and upsampling processes are both examples of resampling. Resampling is a process where the sampling rate (sampling interval) of the input signal is changed.

Interpolation filtering: During the upsampling or downsampling processes, filtering can be applied to improve the accuracy of the resampled signal and to reduce the aliasing effect. Interpolation filtering usually includes a weighted combination of sample values at sample positions around the resampling position. It can be implemented as:

$$f(x_r, y_r) = \sum_{(x,y) \in \Omega_r} s(x, y) C(k)$$

with f( ) referring to the resampled signal, $(x_r, y_r)$ are the resampling coordinates (coordinates of the resampled samples), C(k) are the interpolation filter coefficients, and s(x,y) is the input signal. The coordinates x, y are coordinates of the samples of the input image. The summation operation is performed for (x,y) that are in the vicinity $\Omega_r$ of $(x_r, y_r)$. In other words, a new sample $f(x_r, y_r)$ is obtained as a weighted sum of input picture samples s(x, y). The weighting is performed by the coefficients C(k), wherein k denotes the position (index) of the filter coefficient within the filter mask. For example, in case of a 1D filter, k would take values from one to the order of the filter. In case of 2D filter, which may be applied to a 2D image, k may be an index denoting one among all possible (non-zero) filter coefficients. The index is associated, by convention, with a particular position of the coefficient within the filter mask (filter kernel).

Super-resolution: including spatial super-resolution, and temporal super-resolution. For spatial super-resolution, it means increase of the size of an image (or image in a video sequence) by upsampling, for example, from w×h to 2w×2h. For the temporal super-resolution, it means increase of the frame rate of a video sequences, for example, from 10 frames/second (10 fps) to 20 frames/second (20 fps), with fps being a unit of frames per second RDO (rate-distortion optimization): RDO refers to a principle to make a selection under some limitation (constraint) among some possible parameters. For example, in video compression, there are many coding modes or parameters corresponding to different distortion and amount of coding bits. When a high quality and low number of coding bits are preferred at the same time, then the cost C to make the decision could be formulated as C=Distortion+λ*Rate. Here, the Distortion is the distortion of the reconstructed signal (distance or difference between the reconstructed signal and the original signal), the Rate is the number of bits after coding the original signal, and X is a coefficient called Lagrange multiplier (also referred to as Lagrangian).

Neural Network (in computing systems, i.e. meaning artificial neural network) is vaguely inspired by biological neural networks that constitute animal brains. Any neural network can be formalized and fully defined as a directed acyclic graph with a set of nodes Z. Each node $z^{(k)}$ represents a tensor (multi-dimensional array) and associated with an operation (neural network layer) $o^{(k)} \in O$ on a set of its parent nodes $I^{(k)}$. An only exception is input node x which does not have input nodes and associated operations. Computations at node k may be formally expressed as:

$$z^{(k)} = o^{(k)}(I^{(k)})$$

wherein the set of operations O includes unary operations (convolutions, pooling, activations, batchnorms, etc.) and multivariate operations (concatenation, addition, etc.). Any representation that specifies a set of parents and an operation of each node completely defines a neural network.

Convolution: Convolution may be defined for the input signal f[ ] and a filter g[ ] in one dimension as:

$$(f * g)[n] = \sum_{m=-\infty}^{\infty} f[m]g[n-m]$$

Figure 2:
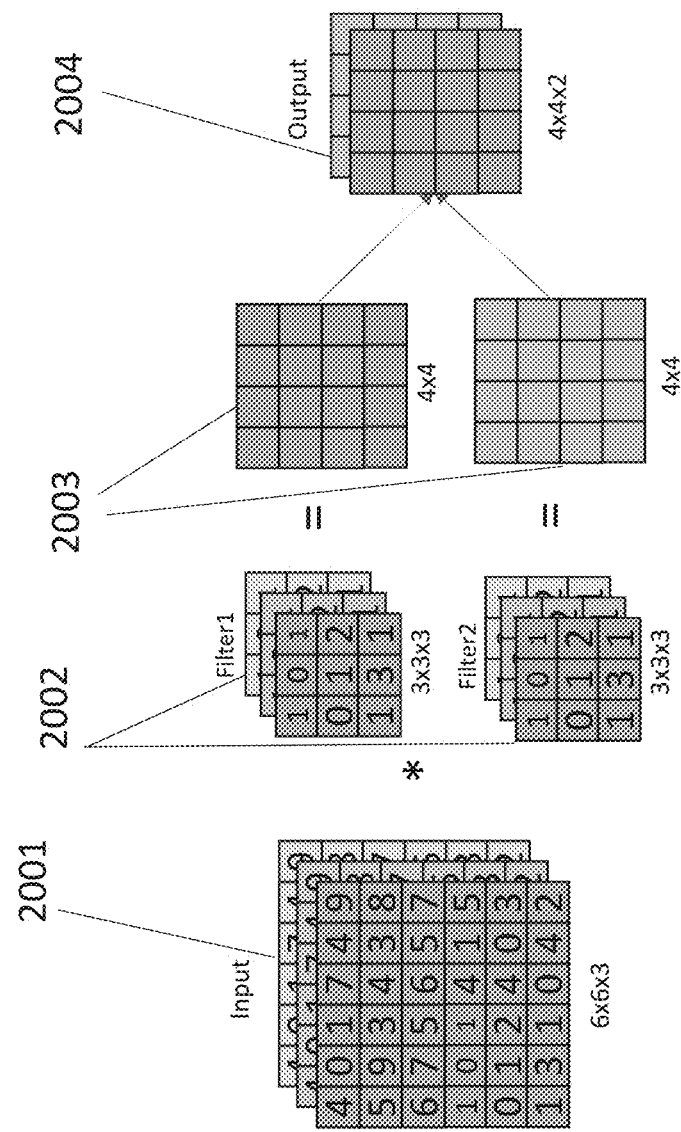
FIG. 2 is a schematic drawing illustrating an exemplary layer processing of a layer of a convolutional neural network.

Here, m is an index within the input signal and the filter, and n indicates the position (shift) of the filter with regard to the input signal. Both n and m are integers. S convolution in 2D may work similarly, as is well-known from the art. For the sake of generality, the m can be considered to have values between minus infinity to plus infinity as in the equation above. In practice, however, the filter f[ ] might have a finite length, in which case the filter coefficients f[m] would be equal to zero for m that exceed the filter size. Convolution is a widely used operation in modern neural networks which convolves input data of size $N \times C_{in} \times H_{in} \times W_{in}$ (or $N \times H_{in} \times W_{in} \times C_{in}$ in some implementations) with a convolutional filter of size $K \times K \times C_{in} \times C_{out}$. It is noted that the term size refers also to shape or dimension of input and/or output data (e.g. an input of 6 samples in width and height and 3 color or 3 chroma and luminance components as channels as shown in FIG. 2). The convolution produces output data of size $N \times C_{out} \times H_{out} \times W_{out}$, where N is the size of batch, $H_{in}$ and $H_{out}$ are the height of the input (in) and output (out) data, $W_{in}$ and $W_{out}$ are the width of the input and output data, $C_{in}$ is the number of input channels, $C_{out}$ is the number of output channels. K is a convolutional filter parameter. It defines the size of the area in the input data needed to obtain 1 sample of output data. Here, input data, output data, and kernels are 4-dimensional arrays of some size along each dimension. The values of the convolutional filter are called weights of the convolutional layer. The weights of the convolutional layer could be considered as a tensor in 4-dimensional space.

FIG. 2 shows an example of a convolutional layer. In this example, input data 2001 has a size (also referred to as shape or dimension) of 6×6×3 (e.g. an input of 6 samples in width and height and 3 color or 3 chroma and luminance components as channels), and a convolutional filter 2002 is of size 3×3×3×2 (each kernel having a size K of 3 weights in width and height, 2 kernels (see Filter1 and Filter 2) for each of the 3 channels, the number of kernels or filters defining the number of output channels). Convolutional filter 2002 could be represented as 2 filters (Filter1, Filter2) of size 3×3×3. Both of them are convolved with the input data 2001 using the sliding window principle (here, for example, without padding) to obtain 4×4 (each output channel comprising 4 samples in width and height, e.g. by element-wise adding the results obtained by filtering the 3 input channels) output data 2003. Final output data 2004 have a size of 4×4×2 (2 output channels each comprising 4 samples in width and height).

Convolutional Neural Networks (CNN): A CNN is a subclass of a Deep Neural Network (DNN). The name "convolutional neural network" (CNN) indicates that the network employs a mathematical operation called convolution, which has been defined above. The term "deep" typically means that there are many cascaded layers. As there is no clear cut on when a network architecture is deep, herein, any network with at least one hidden layer may be considered as a deep neural network. Convolution is a specialized kind of linear operation as mentioned above. Convolutional networks are simply neural networks that use convolution in place of general matrix multiplication in at least one of their layers. A convolutional neural network consists of an input and an output layer, as well as one or multiple hidden layers. The input layer is the layer to which the input is provided for processing.

The hidden layers of a CNN typically consist of a series of convolutional layers that convolve with a multiplication or other dot products. The result of a layer is one or more feature maps, also referred to as channels. There may be a subsampling involved in some or all of the layers. As a consequence, the feature maps may become smaller. The activation function in a CNN may be a RELU (Rectified Linear Unit) layer or a GDN (Generalized Divisive Normalization) layer as already exemplified above, and may subsequently be followed by additional convolutions such as pooling layers, fully connected layers and normalization layers, referred to as hidden layers because their inputs and outputs are masked by the activation function and final convolution. GDN is a special type of activation used in end-to-end compression, in which the following transformation may be performed:

$$y[i] = x[i] / \mathrm{sqrt}(\mathrm{beta}[i] + \mathrm{sum}\_j(\mathrm{gamma}[j,i] * x[j])),$$

where i and j run over the channels, and beta and gamma are trainable parameters.

Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing pictures or images, the input is a tensor with a size of (number of images)×(image width)×(image height)×(image depth). It is noted that the term size refers also to shape or dimension of input and/or output data (e.g. an input of 6 samples in width and height and 3 color or 3 chroma and luminance components as channels as shown in FIG. 2). Then, after passing through a convolutional layer, the image becomes abstracted to a feature map, with a size of (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are designed to emulate the behavior of a visual cortex. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers, it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear downsampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 down-samples at every depth slice in the input by 2 along both width and height, discarding 75% of the activations. In this case, every max operation is over 4 numbers. The depth dimension remains unchanged.

In addition to max pooling, pooling units can use other functions, such as average pooling or l2-norm pooling. Average pooling was often used historically but has recently fallen out of favour compared to max pooling, which performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

Hence, CNNs may be configured to perform any of the following operations:
Convolution
Batch Normalization
Non-linear activation (sigmoid, ReLU, etc.)
Fully-connected layers (FCL)
Element-wise operations (addition, multiplication)
Downsampling (max pooling, average pooling)

Nowadays, CNNs are the most used approaches for computer vision (CV) tasks like classification, FaceID, person re-identification, car brand recognition, object detection, semantic and instance segmentation, image/video enhancement, image/video superresolution and many others.

FIG. 1 shows an example of a typical CNN architecture used for classification task. Input node 1001 has a size (also referred to as shape or dimension) of $H_{in} \times W_{in} \times 3$ for RGB images or $H_{in} \times W_{in} \times 3$ for grayscale images. 1002—related to convolutional layers coupled with activation layer. 1004—related to fully-connected layers. 1003 represents nodes of the neural network, 1005 represents an output node of the CNN. Taking RGB/grayscale as the input, the CNN calculates sequentially all intermediate nodes up to the output node. The output node represents a vector of probabilities for the input image belonging to one of the classes (here, cat, dog, bike, car).

Many other kind of popular NN architectures exist. For example, recurrent neural networks (RNN) used for Natural Language Processing (NLP) tasks and transformers used for NLP and CV tasks.

Training: Is the adaptation of the network to better handle a task by considering sample observations. Training involves adjusting the weights and other parameters of the network to improve the accuracy of the result (i.e. the output of the NN). This is done by minimizing the observed errors. After the training of the neural network is finished, the neural network with adapted weights is called a trained neural network. Hence, the neural network is a trainable neural network.

Loss function: Is a function that maps values of one or more variables onto a real number representing some "cost" associated with the observed variables. For example, if we consider values of errors on a multi-dimensional array (for example video), then a loss function could be MeanSquareError (MSE) corresponding to the average of the squares of the errors Backpropagation: Is a method to adjust the weights to compensate for each error found during learning. Technically, backpropagation calculates the gradient (the derivative) of the cost function associated with a given state with respect to the weights. The weight updates can be done via stochastic gradient descent (SGD) or other methods.

Neural network training initialization: is a method of assigning weights of neural network layers at the beginning of the training process.

A typical NN training process includes the splitting of a training dataset into batches of samples. Then, a backpropagation method is executed sequentially on all batches. One pass of backpropagation processing for all training dataset samples is called an epoch of training.

Neural network inference: Is an execution of trained neural network on test data.

Neural network size: Is an amount of memory required for storing a neural network (i.e. parameters defining the neural network). Typically, the size of the network is the sum of the amount of memory required to store the neural network graph (architecture) and the amount of memory required to store the weights of the layers. The amount of memory required to store the weights of convolutional layer with a convolutional filter size of $K \times K \times C_{in} \times C_{out}$ can be calculated as $C_{in} * C_{out} * K * K * numbits\_of\_1element$.

Lightweighted convolutional layer: A layer of the neural network, which has a similar input and output size (also referred to as shape or dimension) as a regular convolutional layer, but has a much less amount of memory required to store weights of layer.

Tensor Train convolutional layer (TTConv):—Is a lightweighted convolutional layer of a neural network. FIG. 3 shows an example of such a lightweighted convolutional layer. For a filter of size $K \times K \times C_{in} \times C_{out}$ 3001, the respective TTConv layer consists of 3 convolutional layers (conv1, conv2, conv3). Conv1 3002 has a size of $1 \times 1 \times C_{in} \times R_1 * R_2$. Conv2 (3003) has a size of $K \times K \times R_1 \times 1$. Conv3 3004 has a size of $1 \times 1 \times R_2 \times C_{out}$, where $R_1$, $R_2$ refer to ranks of the TTConv layer. In general, the lower the ranks the less parameters the TTConv layers have. There is a tradeoff between the TTConv ranks and performance. A TTConv layer is applied with the following procedure.

Conv1 convolves input data of size $C_{in} \times H_{in} \times W_{in}$ 3005. The output of conv1 has a shape $R_1 * R_2 \times H_{in} \times W_{in}$. 3006.

Output of conv1 3006 is split into $R_2$ arrays of size $R_1 \times H_{in} \times W_{in}$.

Split arrays are convolved by conv2.

Outputs of conv2 are concatenated 3007.

Concatenated outputs of conv2 are convolved with conv3. Output of conv3 is output of TTConv layer 3008.

The lightweighted versions of convolution have input and output sizes being the same as in regular convolutions, but have much less parameters. For example, in case of a regular convolution with kernel 3, the number of input and output channels is 64 and has 3*3*64*64=36864 parameters. In contrast, a TensorTrain convolutional layer with R_1=R_2=4 has 64*4*4*1*1+4*3*3+4*64*1*1=1316 parameters.

Figure 4:
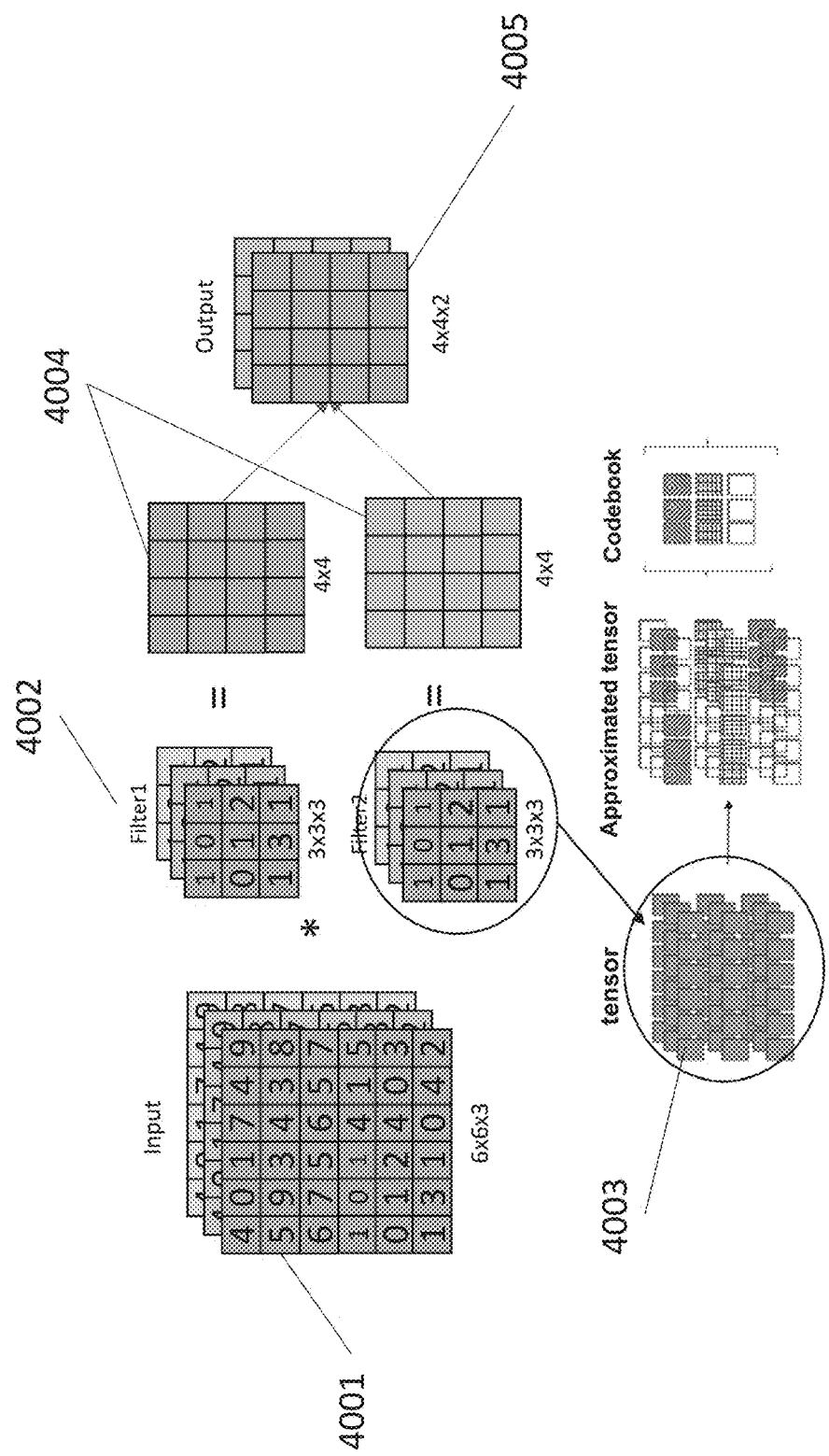
FIG. 4 is an illustration of an exemplary weight-sharing compression.
Figure 5:
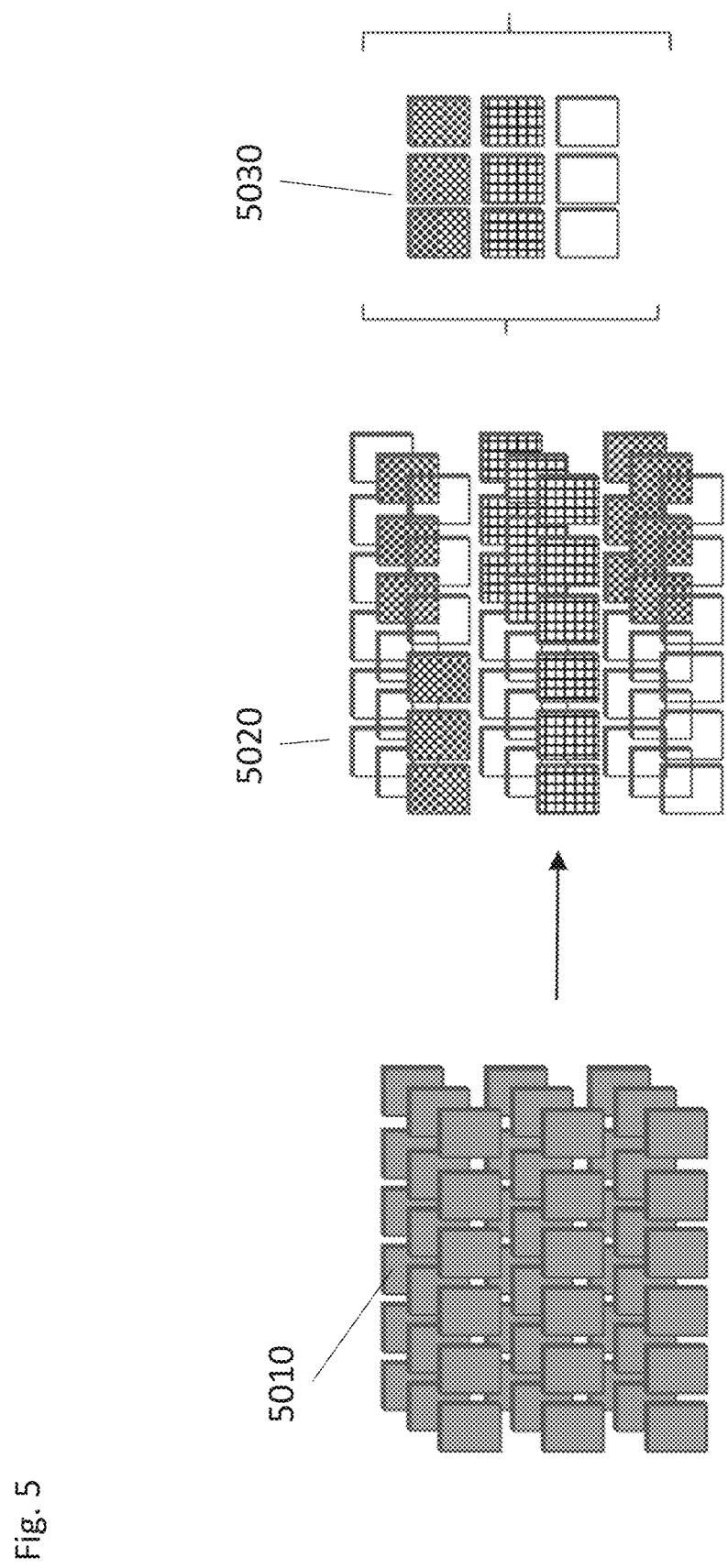
FIG. 5 is an illustration of another exemplary weight-sharing compression, where a sparse data tensor 4003 of FIG. 4 is approximated by a tensor.

Neural network compression: Is a process of reducing the neural network size. There are a lot of NN compression methods, which include for example:

Weight-sharing compression is one of simple forms of network reduction and involves sharing of weights between layers, as discussed in "*CNN inference acceleration using dictionary of centroids*" by D. Babin et al., and illustrated in FIGS. 4 and 5. For this method, different subtensors of tensor weights are similar and instead of saving all subtensors only one is saved and for all others only the references are saved.

Figure 6:
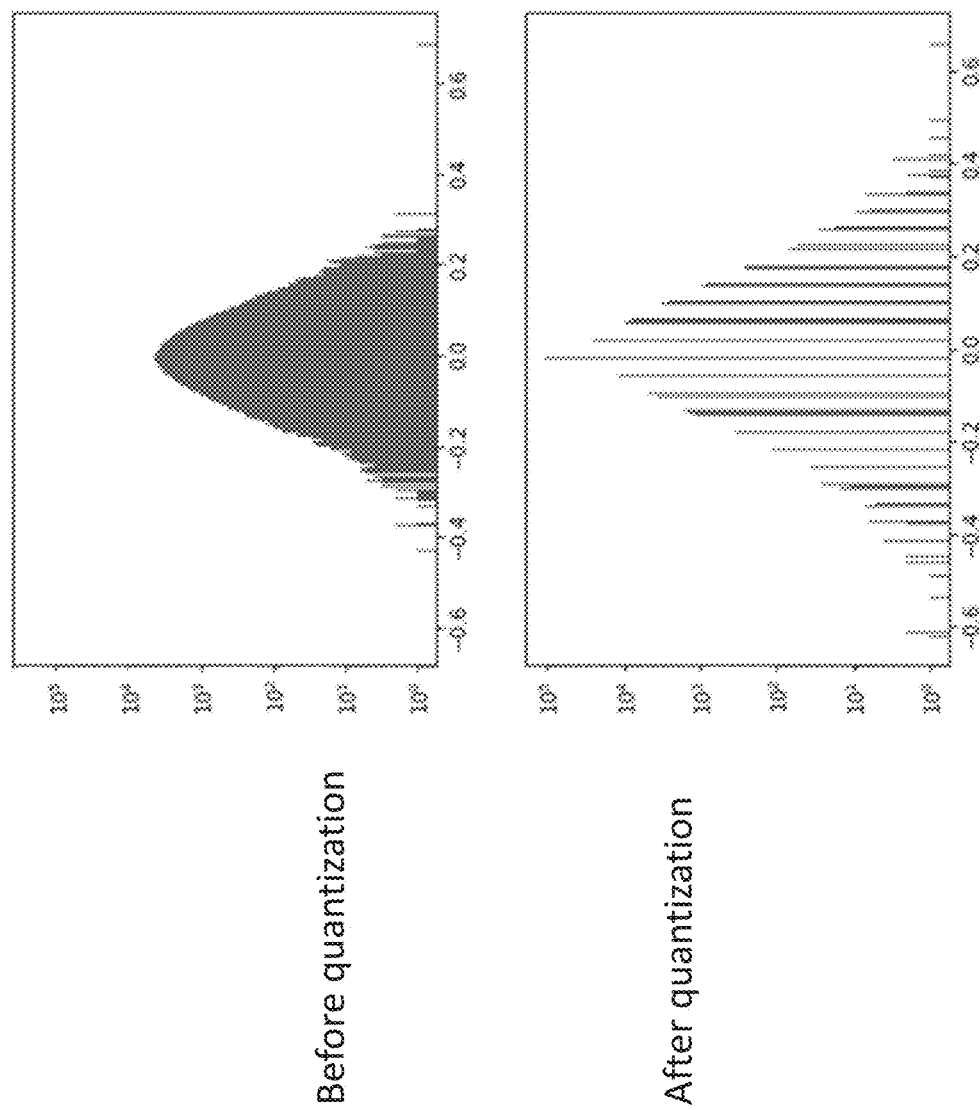
FIG. 6 are exemplary distributions of weights when quantization is not applied and when it is applied.

Quantization: Network quantization compresses the original network by reducing the number of bits required to represent each weight. Weights values distribution without quantization and with quantization could be found illustrated in FIG. 6. For example, in case of the weights being originally in double precision (e.g. 64 bits), the number of bits (bit depth) may be reduced to single precision (float 32 bits). It is noted that this is only a simple example of a quantization by reducing bit depth. However, the for the purpose of the present disclosure, any kind of quantization may be applied.

Figure 7:
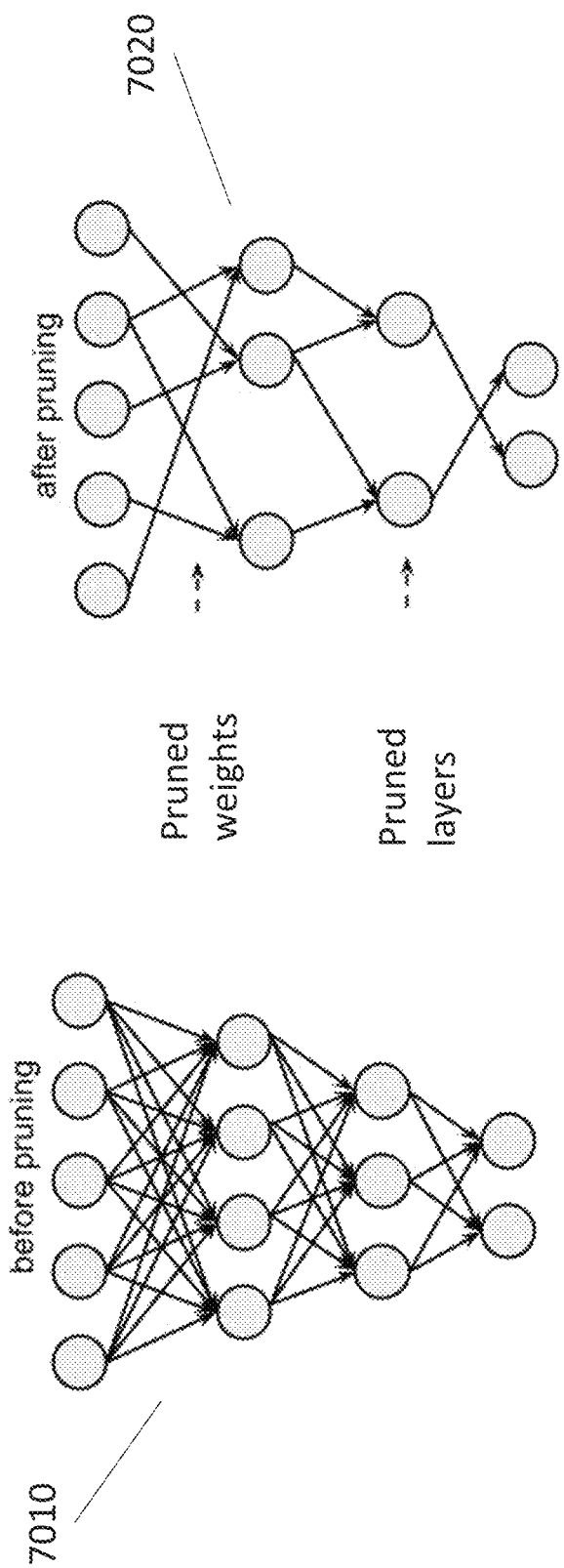
FIG. 7 is a schematic drawing illustrating weights pruning in a neural network with a plurality of layers.

Pruning: Is a method of compression that involves removing some unimportant weights from a trained model. In machine learning, pruning is removing unnecessary layers or weights of layers. A schematic representation of a pruning operation is exemplified in FIG. 7, which shows a trained network 7010 of a trained network not subject to pruning, and a trained network 7020 subjected to pruning. In network 7020, both weights and layers are pruned by removing weights (connections) between nodes of adjacent layers and removing nodes within a layer.

Inference time neural network compression: Is a method of neural network compression, which typically starts from a network that has been trained in a standard manner, without considering compression.

Training-aware neural network compression: Is a method of neural network training, which presents additional regularization loss to force weights of neural network layers be better compressed with some of compression methods.

Residual neural network (ResNet) is a class of a convolutional neural network. Residual neural networks utilize skip connections, or shortcuts to jump over some layers. Typical ResNet models are implemented with double- or triple-layer skips that contain nonlinearities (e.g. ReLU) and batch normalization in between. This is exemplified in FIGS. 8 and 14.

A typical ResNet architecture consists of some number of residual blocks. A ResNet is exemplified in FIG. 8, which shows a first convolutional layer 810 followed by a ReLU, a last convolutional layer 850 followed by a ReLU 860 and between them a plurality of residual blocks 830 to 840. There is also a skip connection 801.

Figure 14:
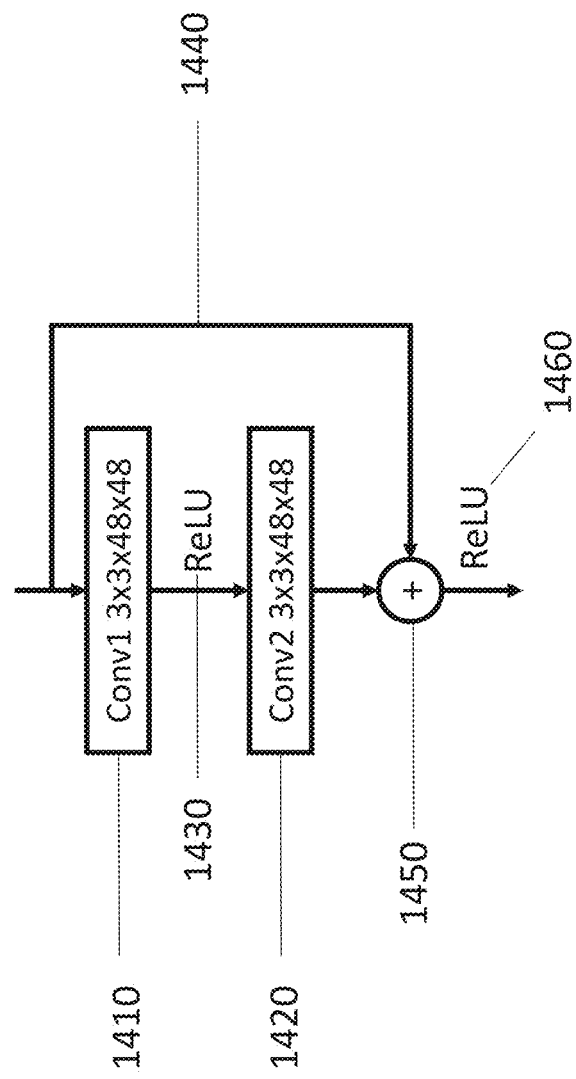
FIG. 14 is a block diagram illustrating an exemplary structure of a residual block of a residual neural network ResNet including two convolutional layers and a ReLU layer after the respective convolutional layer.

A residual block structure is exemplified in FIG. 14. It contains two convolutional layers 1410, 1420, a ReLU layer 1430, 1460 after the convolutional layers, a skip connection 1440 from the input of the block to the output 1450 of conv2 and ReLU layer after skip connection, as illustrated in FIG. 14.

Clustering is the task of grouping a set of objects in such a way that objects in the same group (called a cluster) are more similar (in the sense of a predefined similarity measure) to each other than to those in other groups (clusters).

Figure 8:
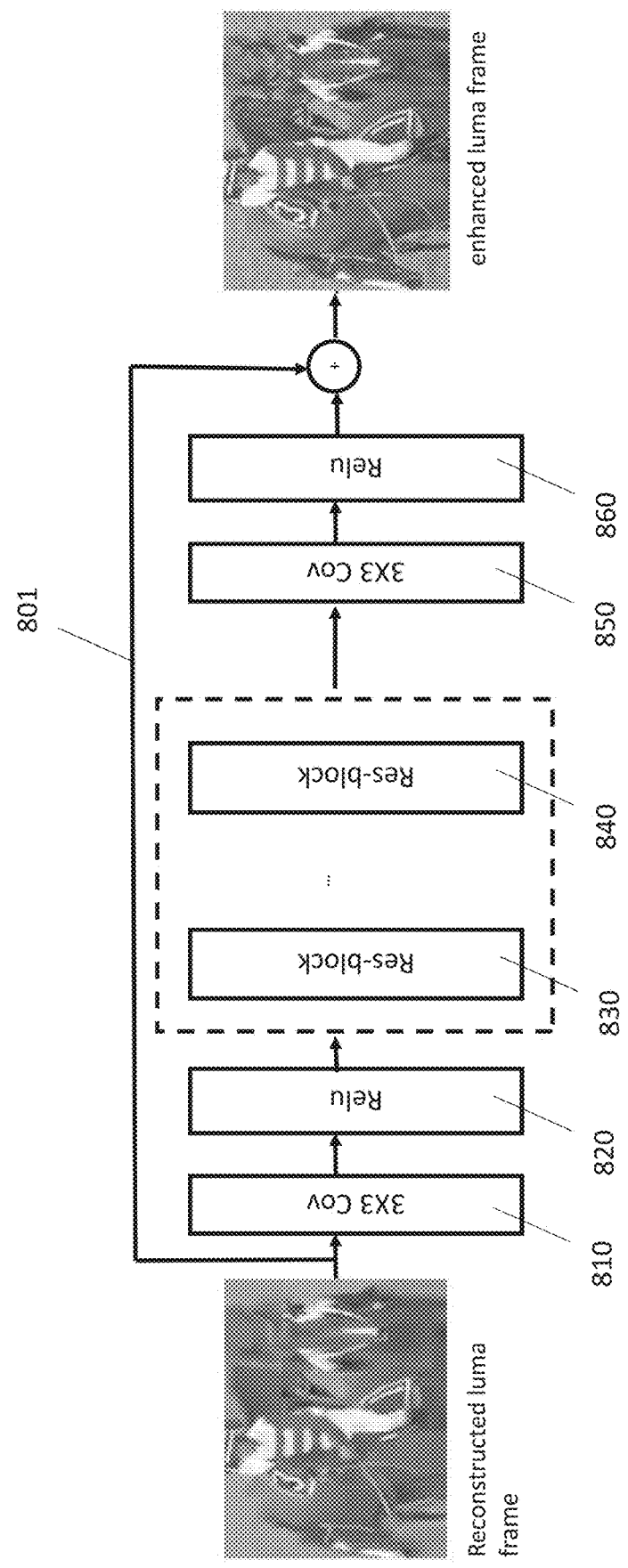
FIG. 8 is a block diagram illustrating an exemplary residual network with residual blocks and other layers.

Equipped with the above defined terminology, a typical processing of an input image by CNN is described with reference to FIG. 8. FIG. 8 shows an example, where a CNN (or in general a NN) is used as a filter for picture enhancement. The reconstructed image (luma frame) is fed into the CNN network, which after processing provides as the output e.g. a higher quality image (enhanced luma frame).

Figure 10:
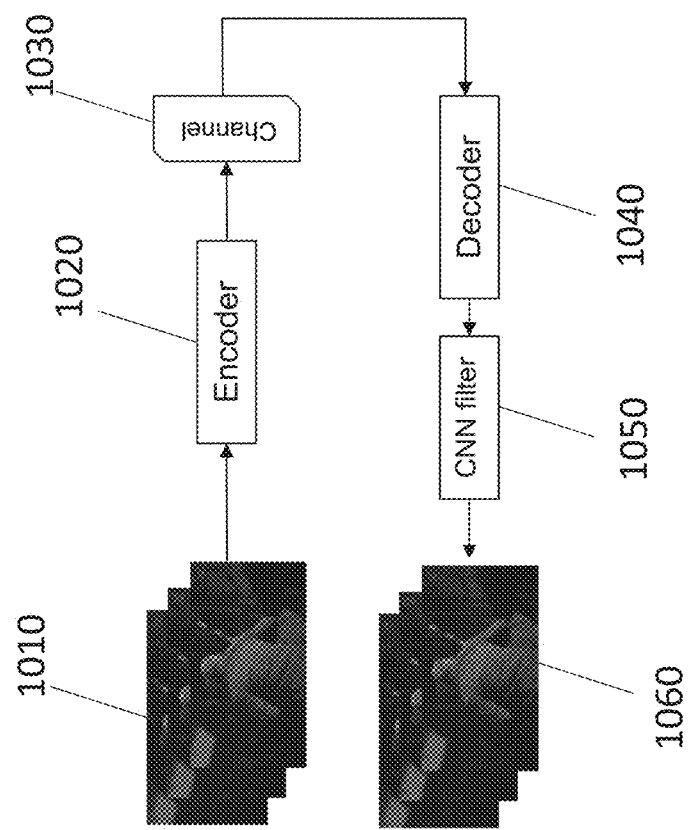
FIG. 10 is a block diagram illustrating an exemplary encoder-decoder processing chain including employing a CNN for the purpose of filtering reconstructed pictures.

A so-called enhancement filter can be trained on a big dataset and applied to other video sequences. This case is called offline training. FIG. 10 shows pictures (such as still or video pictures) 1010 encoded by an encoder 1020 into a bitstream and provided to a channel 1030. Such encoder may be any known picture or video encoder, which may, but does not have to be based on a neural network. A decoder 1040 obtains the coded bitstream and decodes it. After the decoding, a filter 1050 is applied to the decoded picture(s). The decoded and filtered pictures 1060 may be then displayed.

The filter may be a filter based on a CNN. It may be a loop filter (LF), such as a CNN-LF. However, it may also be a post filter. More generally, it can be an enhancement filter, which is a term referring to the aim of the filter to enhance the reconstructed image to have a better quality (e.g. measured by an objective or subjective metric). In case of an offline training a compressed video stream is transmitted through the channel 1030. The CNN filter may be pre-configured (pre-trained), before the video stream is filtered, e.g. before the decoder applies the CNN filter 1050 to the decoded video. This is to say that the CNN-LF does not change in dependence on the input video 1010. It is trained in advance, possibly based on pictures or video sequences other than the input video sequence 1010.

Figure 9:
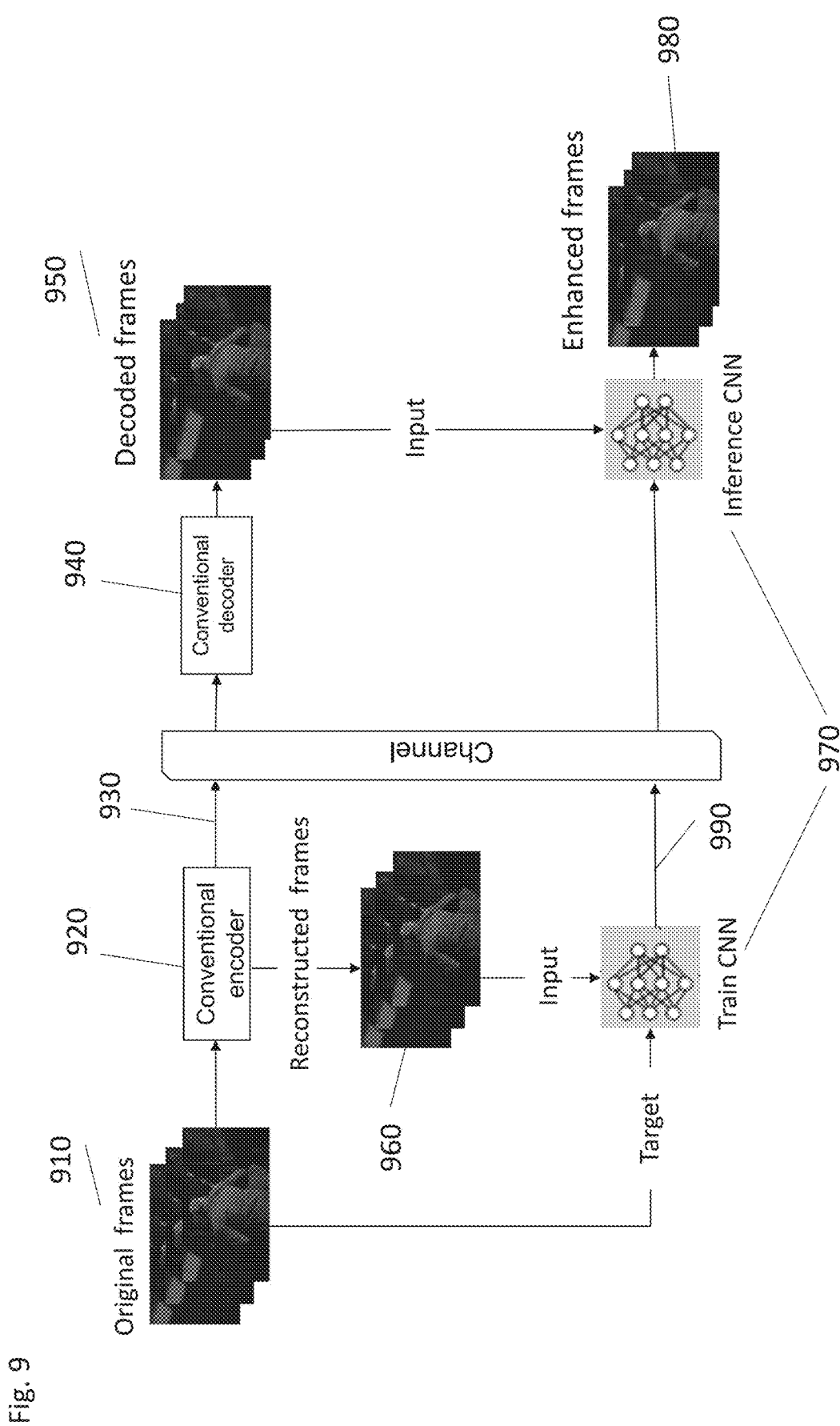
FIG. 9 is a block diagram illustrating an exemplary encoder-decoder processing chain, including CNN-based training on the encoder-side and CNN inference on the decoder side.

Another approach is to train the enhancement filter on one video sequence or one frame or several frames, and to apply it on this video or frame or several frames. In this case, besides the compressed video, the trained network parameters also typically need to be transmitted to the decoder. The decoder will then use the received network (i.e. the network parameters) to get the final reconstructed and filtered pictures. This case is called, online training. FIG. 9 exemplifies a typical scheme of online training.

Original frames 910 are encoded by a conventional video encoder 920. The encoder 920 outputs compressed video 930 and reconstructed frames 960. A CNN filter 970 is trained to improve the reconstructed frames 960 (enhancement) so as to be more close to the original frames with a predefined loss function. The CNN filter parameters are transmitted through the channel 990. Conventional decoder 940 receives the compressed video and decodes it to decoded frames 950. Transmitted CNN filter 970 takes decoded frames 950 as an input, and outputs enhanced frames 980. In general, in the online training, the encoder-side NN 970 is trained based on the input (original) pictures (as target or ground-truth for the reconstructed pictures that shall be enhanced using the NN 970) which are encoded. The trained parameters of the NN 970 are transmitted to the decoder and applied there to reconstruct (in particular enhance) the encoded images by applying an NN (decoder side Inference NN 970) configured with the transmitted parameters. In the present disclosure, the term "transmitting" refers to enclosing into the bitstream. The transmitting may be transmitting to a storage (temporary or permanent) or over a communication interface or the like.

Figure 27:
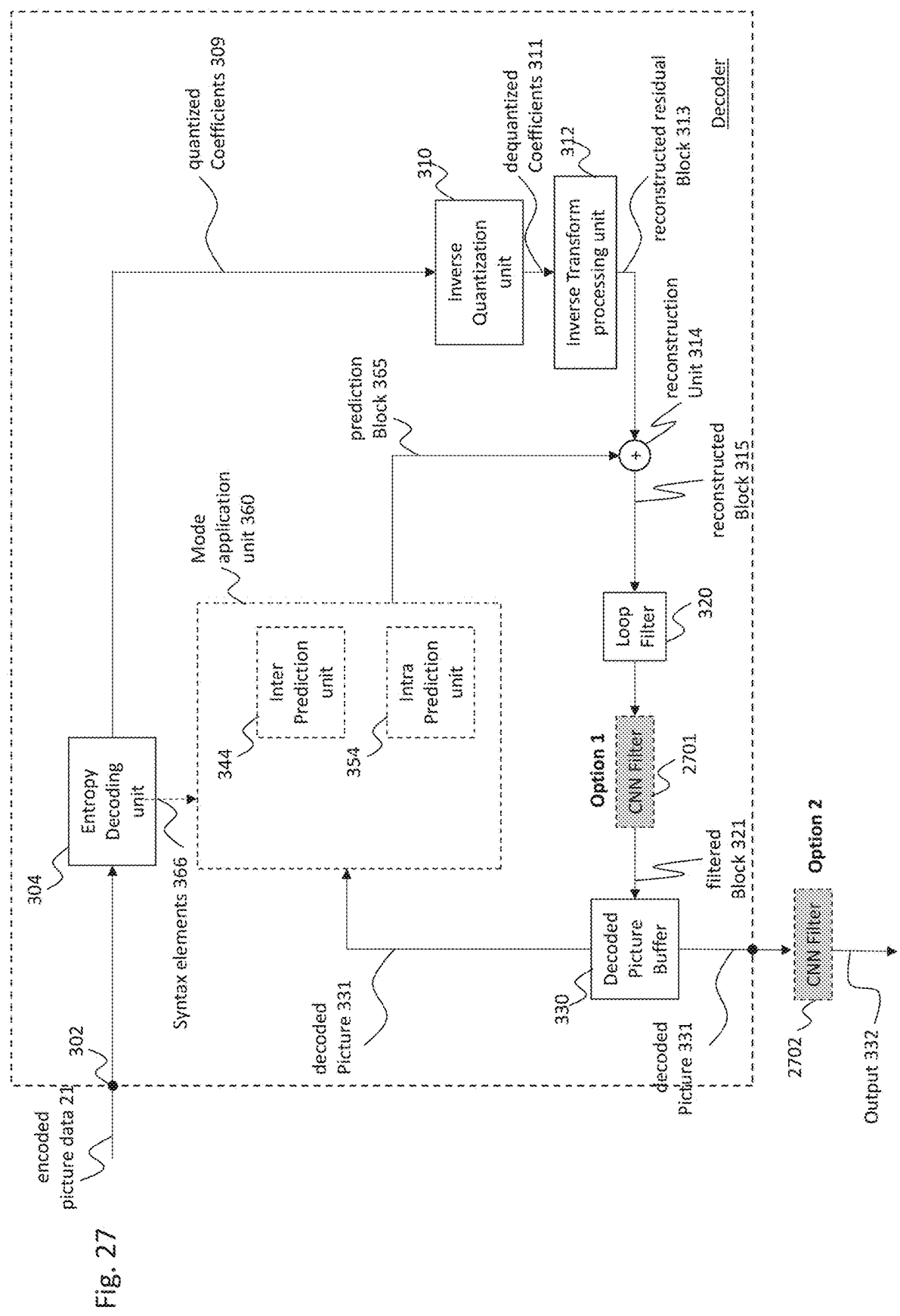
FIG. 27 is a block diagram illustrating an exemplary decoder, which may employ some embodiments of the present disclosure.

Irrespective of the training being performed offline or online, the enhancement filter could be used as a loop filter (option1) or a post filter (option2), as is shown in FIG. 27. Loop filters and post filters may be on the same position as described with reference to FIGS. 25 and 26 above.

Training Offline

In case of the offline training, the NN model is typically fixed both on the encoder and decoder side. Thus, there is no need to transmit it from the encoder to the decoder.

A. In-loop filter or loop filter (Option 1):
   Encoder side (e.g. FIG. 25)
     Compress the video/picture.
     Use the CNN filter (pre-trained, using a large training data set) as a loop filter (e.g. on the position of the loop filter 220 in FIG. 25, e.g. as a replacement of a conventional loop filter or in addition to a conventional loop filter) to the reconstructed picture, and the filtered picture will be used as a reference picture for the other picture.
   Decoder side (e.g. FIG. 26, FIG. 27)
     Decompress the video/picture (e.g. by the modules preceding and including the reconstruction unit 314 in FIGS. 26 and 27).
     Use the CNN filter (pre-trained, e.g. using a large training data set, same as the CNN filter in the encoder) as a loop filter (e.g. on the position of the loop filter 320 in FIG. 26, e.g. as a replacement of a conventional loop filter or in addition to a conventional loop filter, e.g. as shown in FIG. 27: CNN loop filter 2701 in addition to another loop filter 320) to the decompressed/decoded picture. The filtered picture may be used as reference picture for predicting another picture, i.e. is stored in the decoded picture buffer 330.

B. Post-processing filter or post filter (Option 2):
   Encoder side
     Compress the video/picture (this can be done the same way as in option 1).
     Since the post filter will not affect the reference picture, there is no need for the encoder to do the post filtering process. Application of the postfilter is typically performed for enhancing quality of a picture to be presented, e.g. displayed. If the encoder does not present the picture (which it typically does not), then the application of post-filter is unnecessary. Should, on the other hand, a presentation of the picture be desired, the post filter may also be applied at the encoder side.
     The encoder may comprise a loop filter 220 (conventional or CNN or combination of both) as described above for Option 1.
   Decoder side (FIG. 27)
     Decompress the video/picture (this can be done the same way as in option 1).
     Use the CNN filter 2702 (pre-trained, using a large training data set) as a post filter to the decompressed/decoded picture. The filtered picture is not used as a reference picture for other pictures, i.e. it is not stored in the decoded picture buffer.
     The decoder may comprise a loop filter 320/2701 (conventional or CNN or combination of both) as described above for Option 1.

Training Online

In case of online training, the parameters of the NN model are transmitted alongside with the compressed video to the decoder. A typical scenario of the online training is as follows:

Encoder side
   Run a video encoder without a CNN filter.
   Train the CNN filter on the input—reconstructed picture(s), output—input picture(s) with a mean square error (MSE) loss function, or other loss function. In other words, the input to the NN should be the reconstructed picture (or pictures) and the output of the NN should be the original picture (or pictures) which is being encoded. The loss function may be any distortion function (measure or metric). The CNN filter may be pre-trained and thus the training of the CNN may also be referred to as re-training or updating the CNN.
   Compress the (trained or re-trained) CNN filter parameters, e.g. with one or more neural network compression methods (for example quantization and/or entropy coding).
   Transmit the (compressed) CNN filter parameters and the encoded video stream.

Decoder side
   Obtain the encoded video stream and the compressed CNN filter parameters.
   Run a CNN decompression to get the CNN filter parameters.
   Run a video decoder to get the decoded picture(s).
   Apply the CNN filter (configured with the decompressed CNN filter parameters) to the decoded picture(s).

Similarly to the offline training, the online training CNN filter also could be used as a loop filter (option1) or post filter (option2).

The description above refers to a CNN based enhancement filter, used as an example of online training or offline training. The mechanism could be also used in other neural network based compression tools, such as deep learning based intra prediction, deep learning based inter prediction, or deep learning based adaptive sampling or the like.

As mentioned before, for offline training, it is not necessary to transmit the network model to the decoder, so that the bit cost is lower than for the online case. However, the network cannot be adapted to the content of the data to be compressed, so that the compression efficiency of the offline training is usually still not sufficient.

In turn, online training faces the problem, for example, in video compression that neural network parameters have a significant bit cost (rate) compared with the bit cost of the video, so that even a significant gain of picture quality cannot compensate the more significantly increased bit cost. For example, for a typical CNN filter with 40 layers, the transmission cost may be 3 MB, while the average bits for 1 frame in 4K video sequences may be less than 0.5 MB. Therefore, an efficient network construction and compression to obtain an optimal online content adaptation is a challenging task.

In view of the problems of the above approaches, there is a need for providing an efficient method to represent and compress the network model, while keeping the costs for transmitting the network model low. As will be detailed below, some of the embodiments and examples of the present disclosure solve the above problems of online training for encoding and decoding of input pictures using a neural network, which may reduce the costs for transmitting the network model by transmitting a minimal set of network parameters.

In particular, some embodiments of the present disclosure provide apparatuses and methods for performing an online training based data compression scheme, which uses one or more of the following approaches which will be described in more detail later on, alongside with some exemplary alternatives:

partial update of layers (one or more layers but not all layers are updated) of an existing NN model (which exists in both encoder and decoder already), including training of the partial-update (updatable) layers on the encoder side.

Throughout the description, the existing neural network refers to a neural network that is already configured on the encoder-side and/or the decoder side. In other words, the existing neural network may refer to a current neural network, having layers with pre-configured parameters. The pre-configuration of said parameters may be performed by pre-training. Hence, the existing or current neural network may also be referred as pre-configured neural network and/or pre-trained neural network.

An information to update the updatable layers may be encoded and transmitted in some exemplary implementations. At the decoder side, the information to update the updatable (partial-update) layers may be decoded to get a modified or updated model (i.e. an updated neural network with partially updated parameters) for inference in the decoder. Such a modified or updated neural network may be seen as (an)other neural network (a neural network other than the neural network before the (partial) update).

Throughout the description, the other neural network refers to a neural network (both on the encoder-side and/or decoder side) where the existing neural network is subjected to (partial) update. Said update may include a (partial) update of one or more updatable parameters of the (selected) updatable layers and/or a (partial) update of the layers (e.g. their layer indices, or in general an update about which layers are selected for an update respectively as updatable layers). Hence, the other neural network may also be referred as the updated neural network.

In some exemplary implementations, it is possible to compress the layers (indication and/or parameters of such layers) which will be updated, e.g. by a compact representation, dictionary based mechanism, or another neural network compression method.

Partial-update (updatable) layers in the other (modified, updated) NN model could have a different architecture from the existing (current) NN model. For example, the existing model is a part of the other (modified, updated) model, which means for the layers to be updated in the other NN model, it includes the original part at the same layer in the existing NN model and includes a new added part. In the encoder, only the new added part (also referred to as a delta part in implementations below) are retrained, and the weights of the new added part will be encoded and transmitted to the decoder. In the decoder, the bits for the weights of the new added part are decoded, and used to get the other NN (modified, updated) model.

Compress the new added part of the layers which will be updated, e.g. with a compact representation, dictionary based mechanism, or another (e.g. lossless) network compression method.

According to an embodiment of the present disclosure, an apparatus 2100 is provided for encoding one or more input pictures 1010, 17 including using a neural network. The one or more input pictures may be a still picture or video pictures. A picture (still or video) may include one or more samples (i.e. pixels). Typically, a picture would be a rectangular arrangement of samples. The samples may belong to a single channel such as in a gray-scale image. However, the present disclosure may be equally applied to a plurality of channels such as color channels or other kinds of channels (e.g. depth, motion, or the like). The neural network may be any artificial neural network such as multi-layer perceptron or convolutional neural network or the like. The present disclosure is not limited to any particular neural network architecture. The term "using a neural network" above means any kind of use, such as using as a filter as mentioned above, which may be a loop filter. However, the present disclosure is not limited thereto. The using does not necessarily mean that such filter is necessarily applied: for example, it may be only determined at the encoder side by using the neural network, such as in case of the post filter. The present disclosure is not limited to filtering. The neural network may be used in other tasks such as encoding or decoding of picture data or data for encoding/decoding picture data such as coding parameters (motion vectors, motion information, prediction mode, or the like). The neural network may be used in a classical, hybrid encoder/decoder or in neural network based approaches. Apart from video or still picture coding, some embodiments may be used for computer vision tasks such as recognition or classification of objects or the like.

Figure 13:
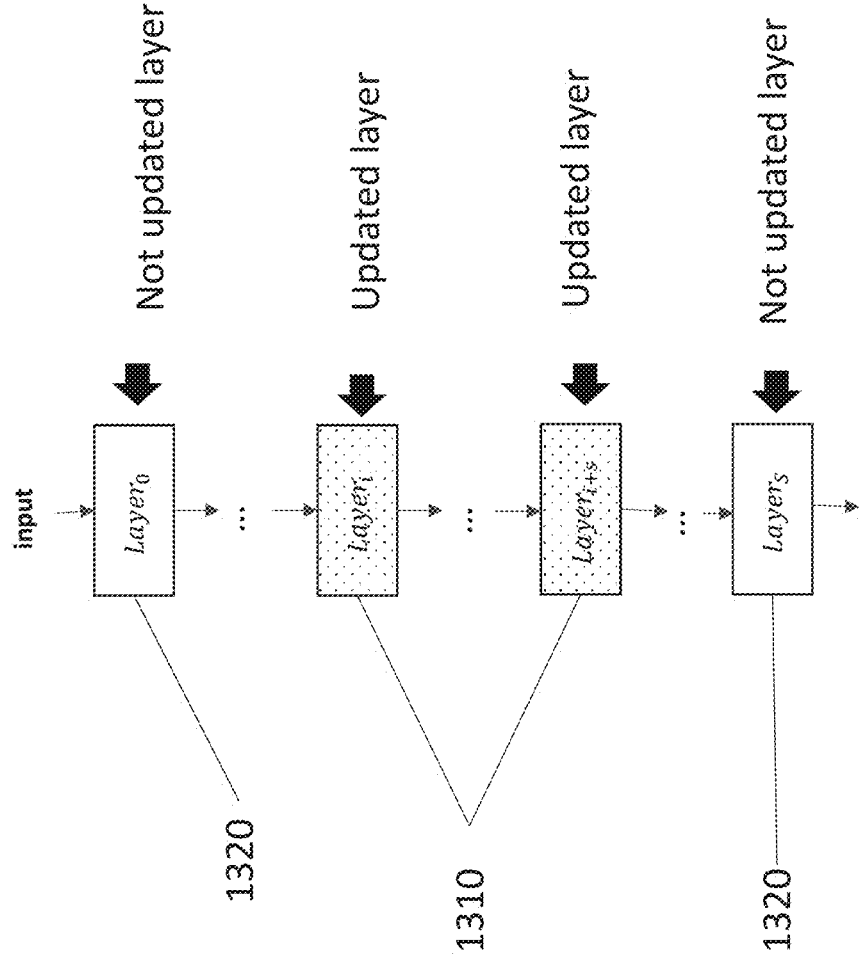
FIG. 13 is an illustration of a neural network N with multiple layers, including updatable layers to be updated and pre-configured layers not updated.
Figures 21, 22:
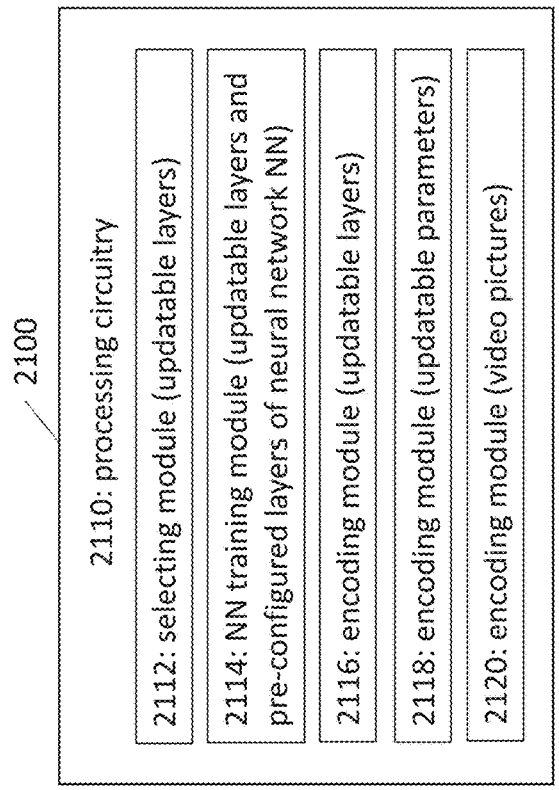
FIG. 21 is a block diagram illustrating an exemplary encoding apparatus according to an embodiment.
FIG. 22 is a block diagram illustrating an exemplary decoding apparatus according to an embodiment.

FIG. 21 shows a block diagram of an encoding apparatus 2100 for encoding the one or more input pictures using a neural network NN. The apparatus 2100 comprises a processing circuitry 2110 configured to select, out of (among) layers 1310, 1320 of the neural network, one or more updatable layers 1310. In other words, the encoder may determine which layers will be updated (e.g. re-trained). FIG. 13 shows an example of a neural network NN, with layers 1310 and layers 1320. In this example, layers 1310 are selected to be updated (updatable layers), meaning their respective parameters (e.g. weights or weight changes) may alter (may be updated) during the training of the NN. In turn, layers 1320 are not selected for being updated (fixed or non-updatable layers), implying that their respective parameters (e.g. weights) are maintained and have their pre-configured parameters. Hence, layers 1320 are pre-configured layers. The pre-configuring may be performed in a pre-processing step, for example, by offline training. The respective indices [i, . . . , i+s] of layers 1310 are included in a Layer List. Unless the indices are not already known to the decoder, the encoder encodes the information of the pre-configured layers into a layer bitstream, and transmits the layer bitstream to the decoder.

The processing circuitry is further configured to train, based on the one or more input pictures (e.g. online), the neural network. The training includes updating one or more parameters of the one or more updatable layers and maintaining parameters of one or more pre-configured layers 1320 out of the layers of the neural network. Thus, only parameters of the updatable layer(s) are trained, while the parameters of the pre-configured layers do not change and are not trained (at least not during encoding of one or more current pictures which are used to perform the online training of the updatable layer parameters).

The one or more parameters of the one or more updateable layers may include weights. Alternatively or in addition, said one or more parameters may include a bias applied to the one or more updatable layers. Any other parameter(s) characterizing (configuring) the neural network may be trained. Similar applies for the maintained parameters of the one or more-pre-configured layers which may be weights, bias, etc.

Maintaining the parameters of the one or more pre-configured layers means that said parameters are not subject to changes/updates during the training of the neural network in which the one or more updatable parameters are updated. In other words, while the training of the NN involves the whole network with its entirety of parameters, the actual training modifies only the updatable parameters by updating them. It is noted that also the maintained parameters may change and be subjected to some kind of updating processing. However, this may happen less frequently than for the updatable layers or only at the beginning of a video, or the like. In other words, the pre-configured parameters may be (in some embodiments), but are not necessarily fixed e.g. for the entire video stream.

For example, the pre-configured layers may be pre-configured in that the respective (maintained) parameters may be obtained by pre-training of the neural network, performed before the actual NN training via updating the one or more updatable parameters. The pre-configuring may be pre-training and may be performed offline, so that the neural network is initialized with pre-trained parameters. Alternatively, the (pre-)training of the pre-configured parameters may be performed also online, but less frequently than the training update processing for the updatable parameters.

Processing circuitry 2110 is further configured encode information on the updated one or more parameters of the one or more updatable layers into a parameter bitstream part 1190. The encoding may be performed with the neural network. Further, the processing circuitry may encode the one or more input pictures into a picture bitstream part 1180.

According to an implementation example, the encoding of the one or more pictures is performed using the neural network. The picture encoding may be performed with the neural network as applicable for in-loop filtering. Alternatively, the picture encoding may be performed without the neural network and instead using any coding standard including MPEG-1 video, MPEG-2 video, VP8, VP9, AV1, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266, Versatile Video Coding (VVC) and extensions, such as scalability and/or three-dimensional (3D) extensions, of these standards. This picture encoding is suitable for post-filtering.

The training of the neural network by re-training or updating only a sub-set (one or more, but not all) of all layers of the neural network, namely the one or more updatable layers having updatable parameters, allows to accelerate the NN training and hence to reduce the time for NN training. Moreover, the signaling overhead is reduced as information on updated parameters (after the NN training) is encoded. Hence, only a part of the NN parameters is encoded and not the parametrization of the whole network.

For example, the one or more pre-configured layers and/or the one or more updatable layers of the neural network are convolutional layers 1410, 1420. FIG. 2 shows an example of a convolutional layer. In this example, input data 2001 has a size of 6×6×3 (e.g. an input of 6 samples in width and height and 3 color or 3 chroma and luminance components as channels) and convolutional filter 2002 is of size 3×3×3×2 (each kernel having a size K of 3 weights in width and height, 2 kernels (see Filter1 and Filter 2) for each of the 3 channels, the number of kernels or filters defining the number of output channels). Convolutional filter 2002 could be represented as 2 filters (Filter1, Filter2) of size 3×3×3. Both of them are convolved with input data using the sliding window principle to obtain 4×4 (each output channel comprising 4 samples in width and height, e.g. by element-wise adding the results obtained by filtering the 3 input channels) output data 2003. Final output data 2004 have a size of 4×4×2 (2 output channels each comprising 4 samples in width and height).

According to a further implementation example, the processing circuitry is configured to select the one or more updatable layers based on an optimization of a cost function including at least one of rate, distortion, and complexity. For example, said cost function may by a function for rate distortion optimization (RDO), Distortion+λ*Rate, with the Distortion being the distortion of the reconstructed signal (distance or difference between the reconstructed signal and the original signal), rate is the number of bits, and λ is a coefficient called Lagrange multiplier (in short referred to as Lagrangian). A function of this form allows optimizing the costs under the constraint of a high quality of pictures (i.e. low distortion) and low number coding bits. In many applications, this is the preferred optimization cost function. The reconstructed signal may refer to a reconstructed picture, while the original signal may refer to an original picture. Accordingly, the one or more updatable layers may be selected in an optimized manner, and hence improves the overall training of the neural network.

Figure 11:
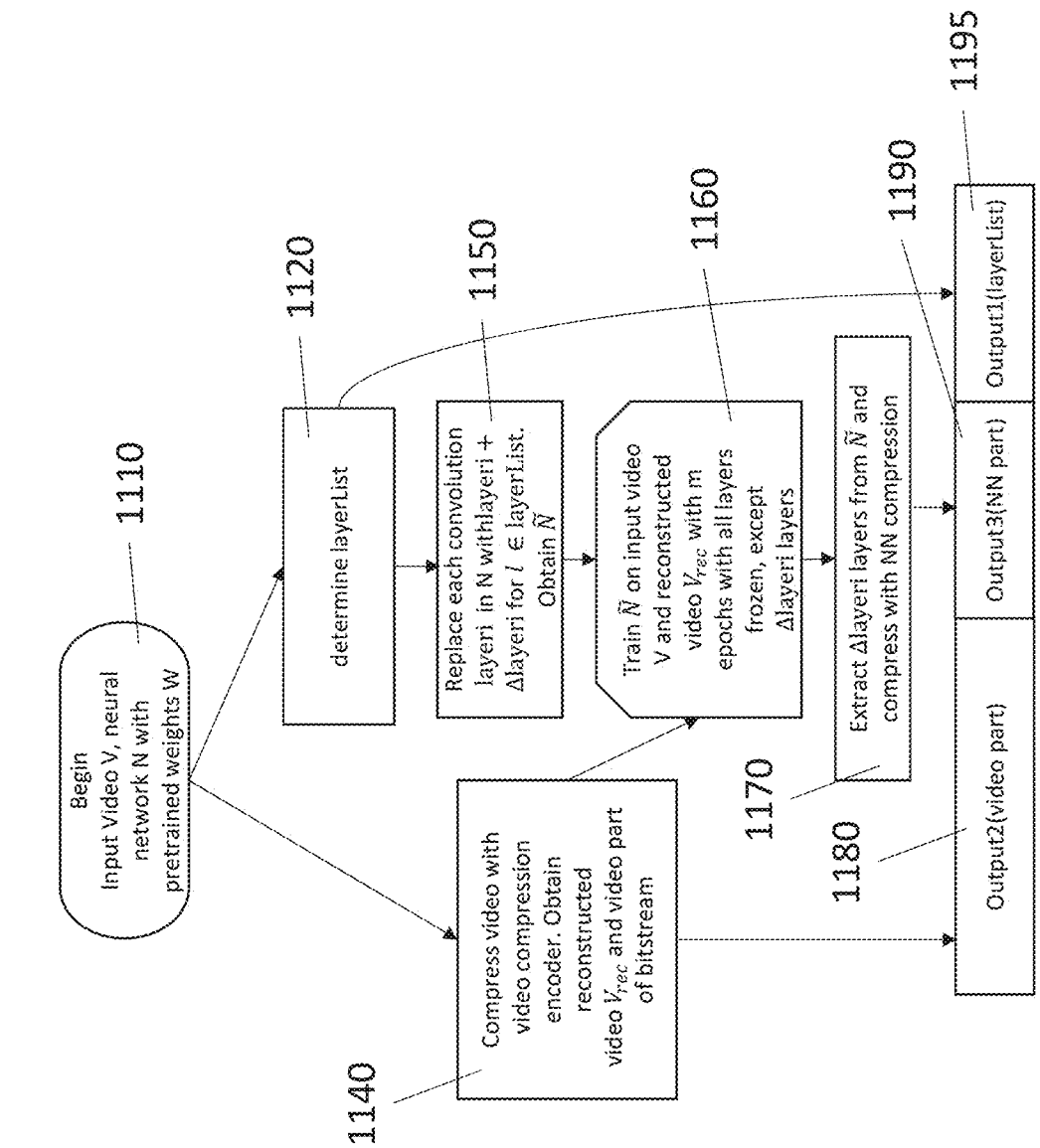
FIG. 11 is a block diagram of an exemplary encoder processing and output.

FIG. 11 shows an exemplary implementation of an encoder processing and will be described in more detail later on. In one exemplary implementation, the processing circuitry is configured to encode information on the one or more updatable layers into a layer bitstream part 1195. For example, the information on the one or more updatable layers includes layer indices of the one or more updatable layers, and the layer indices are indices of the one or more updatable layers out of the layers of the neural network indexed according to a pre-set rule. For example, the pre-set rule of the layer indexing may be a consecutive indexing from the input to the output of the neural network. The parameter bitstream part 1190, the picture bitstream part 1180, and the layer bitstream part 1195 may be encoded into one bitstream, as shown in FIG. 11. Alternatively, the different bitstream parts may be encoded separately. The different bitstream parts 1180, 1190 ad 1195 may be encoded and transmitted in different order and other bitstream parts (e.g. for other purposes) may be arranged between them. The term bitstream part may also be a bitstream portion. In addition, the information on the one or more updatable layers may include the number (i.e. amount) of the selected updatable layers. For example, the number of the selected updatable layers may be pre-set, and hence known also on the decoder side. Accordingly, signaling information on the updatable layers may not be needed, and hence reduces the signaling overhead. In turn, if signaled, the signaling overhead is still reduced as the information relates to the updatable layers as opposed to the whole layers of the neural network. Hence, the bit amount of the layer bitstream part is small.

In one exemplary implementation of apparatus 2100 shown in FIG. 21, the processing circuitry 2110 may include respective modules for the encoding, such as a selecting module 2112 for selecting one or more updatable layers out of the NN layers, a NN training module 2114 for training the neural network including the selected updatable layers and the pre-configured layers using the input pictures. Finally, an encoding module 2116, encoding module 2118, and encoding module 2120 for encoding information on the updatable layers, information on the updated parameters, and the input pictures into their respective bitstream parts.

According to an exemplary implementation, an updatable layer 1310 has one or more updatable parameters and one or more pre-configured parameters. The updatable layer belongs to the one or more updatable layers being selected. Further, the processing circuitry is configured to train the neural network by updating the one or more updatable parameters of the one or more updatable layers and maintaining the one or more pre-configured parameters. In other words, the updatable layer has parameters, part of which are updated during the NN training while the remaining parameters are pre-configured and not subject to changes during the NN training. This means that, while in general all parameters of the updatable layer may be changed by training, said parameters of an updatable layer are split into a sub-set of parameters being changed during the training and the other sub-set of parameters retain their parameter value during the NN training. The maintained pre-configured parameters of the updatable layer may be pre-configured by pre-training performed in a similar manner as for the (maintained) pre-configured parameters of the one or more pre-configured layers of the NN. Accordingly, the NN training is accelerated further as well as the overhead for calculating and signaling update information on the updated parameters, as not all of updatable parameters of said updatable layer may be updated. Hence, the amount of parameters updated during the NN training is further reduced.

Figure 16:
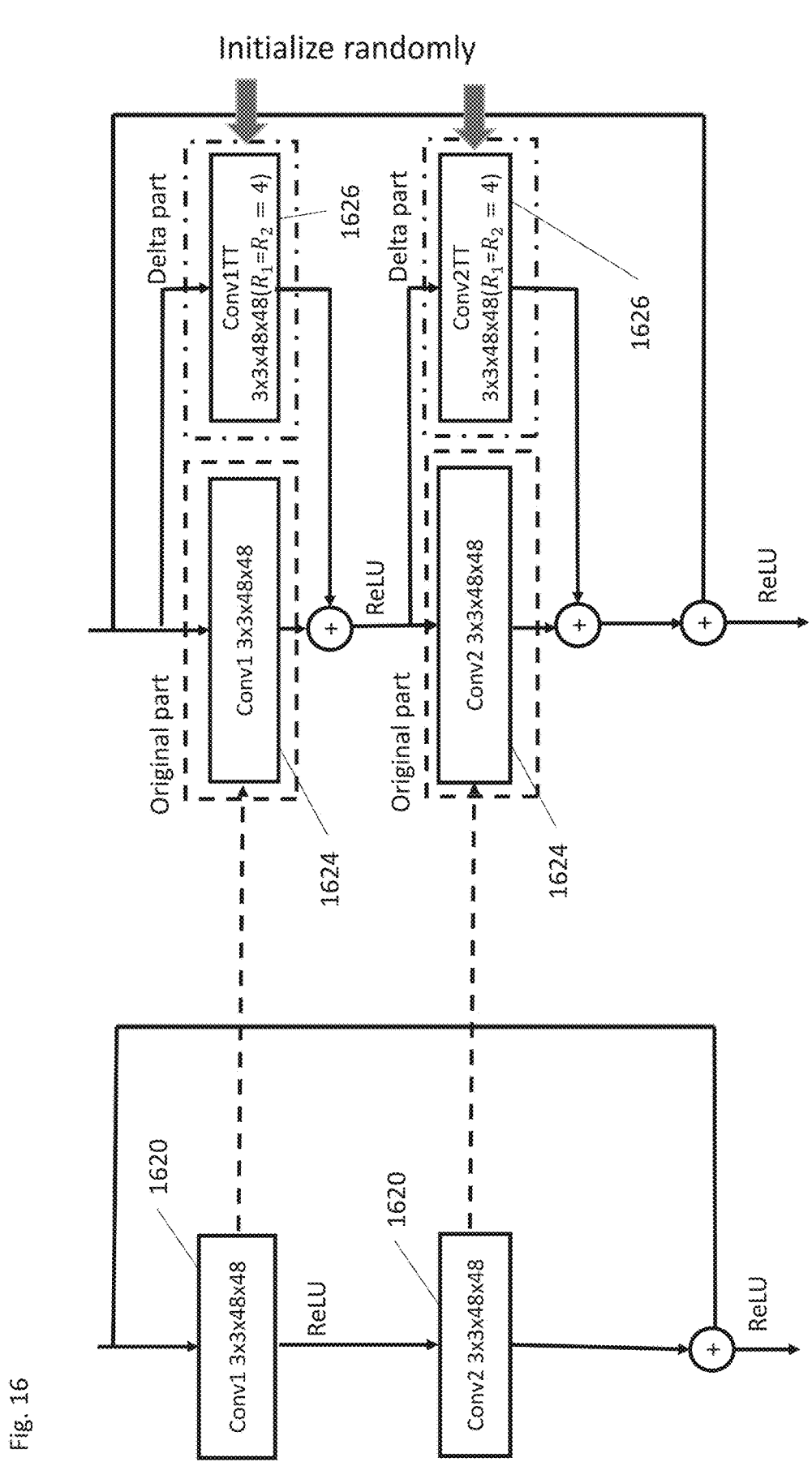
FIG. 16 is a block diagram illustrating an exemplary selection of layers to be updatable layers including a sublayer with parameters, which are not updated during the training and a sublayer with parameters which are updated during the training.

FIG. 16 illustrates this further, showing on the left hand side an updatable layer, which may be a convolutional layer Conv 3×3×48×48. As shown, the output of the first layer Conv1 is input to a common ReLU. On the right hand side is shown an original part and a so-called delta part, both of which are part of the common Conv1 layer on the left. Therein, the original part refers to the updatable layer with the pre-configured parameters being maintained during the training. In turn, the delta part refers to the updatable parameters, which are subject to updates during the NN training.

In an example implementation, the updatable layer 1310, 1620, 1705 comprises an updatable sublayer 1526, 1626, 1720 with weights being the one or more updatable parameters and a pre-configured sublayer 1524, 1624, 1710 with weights being the one or more pre-configured parameters. With reference to FIG. 16, the updatable sublayer corresponds to the delta part (i.e. delta layer) and the pre-configured sublayer corresponds to the original part (i.e. original layer). The updatable sublayer and the pre-configured sublayer are parallel (sub-)layers, results of which are combined to a common output. Further, the same input of the updatable layer is provided to the updatable sublayer and to the pre-configured sublayer; and the output of the updatable layer is an elementwise sum 1730 of the updatable sublayer and the pre-configured sublayer. The provision of the same input to both sublayers implies that the updatable sublayer and the pre-configured layer of the updatable layer are in parallel, as shown in FIG. 16. Further, the respective output of the sublayers is summed. In one example, the element-wise sum may be performed for all outputs of the sublayers.

Figure 17:
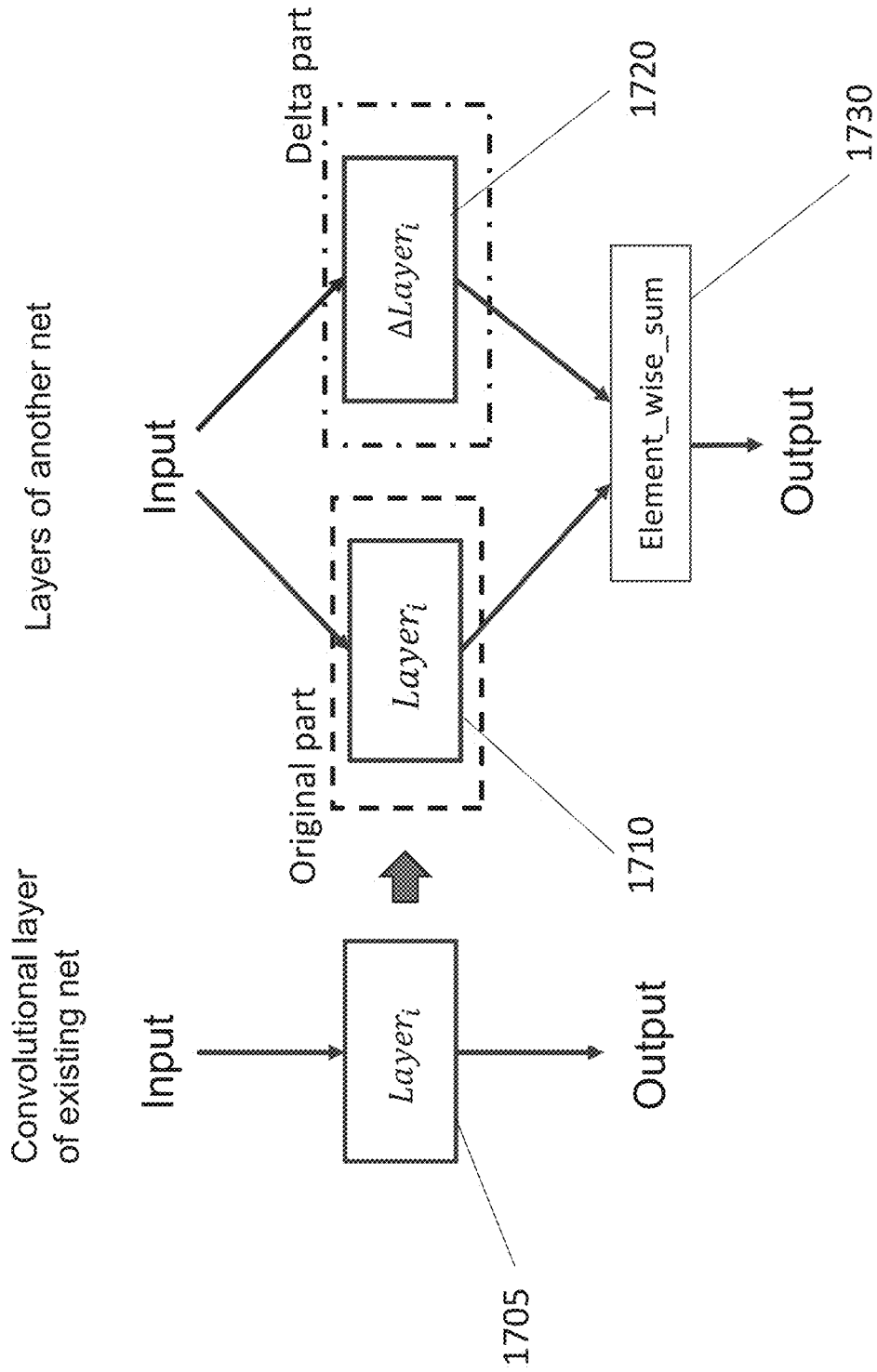
FIG. 17 is a block diagram illustrating an original convolutional layer of an original or existing neural network (i.e. pre-configured NN) and a corresponding layer of an embodiment of a neural network replacing the original layer, wherein the corresponding layer comprises two sublayers including an original part not updated and a delta part being updatable. The output of the sublayers is summed.

FIG. 17 shows another example of an updatable layer 1705, similar to those of layer 1620 in FIG. 16. Layer 1705 may be a convolutional layer and is selected as an updatable layer by the encoder. In the case shown in FIG. 17, layer 1705 comprises an original part 1710 and a delta part 1720. The original part 1710 corresponds to the pre-configured sublayer, while delta part 1720 corresponds to the updatable sublayer. Accordingly, during the training, the original part 1710 maintains its pre-configured parameters (e.g. weights), and the parameters (e.g. weight changes) of delta part 1720 are updated. It is noted that in this example implementation the original part and the delta part are arranged in parallel and take the same input. Their output is then summed elementwise 1730.

The use of sublayers of the updatable layer and training the weights of the updatable sublayer while maintaining the pre-configured weights allows training of the updatable layer based on weights' changes with reference to pre-configured weights. This is referred to as delta-weight training. Accordingly, the NN training is accelerated, since pre-configured weights are used as reference for said training. In other words, the convergence of the NN training may be fast.

According to an example, the updatable sublayer comprises a sparse neural network layer 3006, 4003, 5010. As a result, the number of the parameters of the updatable sublayer is reduced. For example, the updatable sublayer comprises a tensor train neural network layer 3006, 4003, 5010. The tensor train neural network is an example of a sparse NN. The tensor train NN layer is an example of a lightweighted convolutional layer shown in FIG. 3.

FIG. 3 shows an example of such a lightweighted convolutional layer as described above. For a filter of size $K \times K \times C_{in} \times C_{out}$ (3001), the respective TTConv layer has 3 convolutional layers (conv1, conv2, conv3). Conv1 (3002) has a size of $1 \times 1 \times C_{in} \times R_1 * R_2$. Conv2 (3003) has a size of $K \times K \times R_1 \times 1$. Conv3 (3004) has a size of $1 \times 1 \times R_2 \times C_{out}$, where $R_1$, $R_2$ refer to ranks of the TTConv layer. In general, the lower the ranks, the less parameters the TTConv layers has. There is a tradeoff between TTConv ranks and performance. The lightweighted versions of convolution have input and output sizes being the same as in regular convolutions, but have much less parameters. For example, in case of a regular convolution with kernel of size 3×3, the number of input and output channels is 64 and has 3*3*64*64=36864 parameters. In contrast, a TensorTrain convolutional layer with R 1=R 2=4 has 64*4*4*1*1+ 4*3*3+4*64*1*1=1316 parameters as mentioned also above.

According to an implementation, the processing circuitry is configured to update the one or more updatable parameters by a training method less complex than a training method used to train the one or more pre-configured parameters. For example, since the training of the updatable layers may be performed using pre-configured parameters for the pre-configured sublayer, the actual training of the updatable parameters of the updatable sublayer requires less parameters updates and may require less training steps. Accordingly, the complexity of the NN training is reduced, and hence may save training costs (e.g. complexity, latency, or the like).

In one example, the one or more updatable layers are convolutional layers 1003, 3001, 810, 850, 1410, 1420, 1620, 1705; and at least one of the following applies: the less complex training processes less parameter updates than the training method used to train the one or more pre-configured parameters; the less complex training updates a smaller convolutional kernel than the training method used to train the one or more pre-configured parameters. Accordingly, the time required for the NN training may be reduced. Moreover, a smaller convolutional kernel has as output less updated parameters, and hence reduces the signaling overhead of said updated parameters.

FIG. 2 shows an example of a convolutional layer. In this example, input data (2001) has a size of 6×6×3 (e.g. an input of 6 samples in width and height and 3 color or 3 chroma and luminance components as channels) and convolutional filter (2002) is of size 3×3×3×2 (each kernel having a size K of 3 weights in width and height, 2 kernels (see Filter1 and Filter 2) for each of the 3 channels, the number of kernels or filters defining the number of output channels). Convolutional filter (2002) could be represented as 2 filters (Filter1, Filter2) of size 3×3×3. Both of them are convolved with input data using the sliding window principle to obtain 4×4 (each output channel comprising 4 samples in width and height, e.g. by element-wise adding the results obtained by filtering the 3 input channels) output data (2003). Final output data (2004) have a size of 4×4×2 (2 output channels each comprising 4 samples in width and height). It is noted that as such a tensor train layer, TTConv layer shown in FIG. 3, is a specialized convolutional layer. For example, in case of a regular convolution with kernel 3, the number of input and output channels is 64 and has 3*3*64*64=36864 parameters. In contrast, a TensorTrain convolutional layer with R 1=R 2=4 has 64*4*4*1*1+4*3*3+4*64*1*1=1316 parameters.

In a further implementation example, the processing circuitry is configured to: update the one or more updatable parameters of the one or more updatable layers 1626 by initializing them pseudo-randomly; and perform the training with pairs of an original picture 910 and a reconstructed picture 960. Accordingly, the updatable layers are initialized quickly and in a simple manner, and hence reduces the training complexity. FIG. 16 exemplifies this case where an updatable layer comprises an updatable sublayer and a pre-configured sublayer (delta weight training). As discussed above, in this case the pre-configured parameters refer to pre-configured weights, which in turn may be obtained by pre-training in an offline or online training process. These weights may be already close to the final weights obtained after the NN training. Part of the training is initializing the updatable parameters to be trained, which may be performed in a randomized manner. Using these random weights as a kind of an initial guess, the NN training may be then performed using the original picture and a reconstructed picture. This allows to determine, for example, the picture residual which is used as a cost function to the NN so as to train the weights. It is noted that this is true for post-filter and loop-filter and spatial-temporal filter or other enhancement filters. For example, for end-to-end (E2E) coding, training may be performed only based on the original video picture. For some other tools, there could be some other options. For example, a transform processing unit (e.g. a transform processing unit 206 or inverse transform processing unit 212, 312 shown in FIG. 25) may be NN-based trained, in which case a cost function related to the degree in which transformation coefficients may be quantized could be used.

According to a further implementation, the processing circuitry is configured to train the neural network by updating the one or more parameters of the one or more updatable layers based on pairs of an original picture 910 and a reconstructed picture 960. The reconstructed picture may be reconstructed without the neural network. Further, the one or more parameters of the one or more updatable layers include weights of the one or more updatable layers. In this implementation example, the NN training updates the respective weights while using pairs of the original picture and the reconstructed picture. In other words, picture residuals (i.e. a difference between the reconstructed and original picture) may be used to train the NN, but what is updated are the weights. The one or more updatable layers 1310 of the NN are convolutional layers 1410, 1420. FIG. 14 and FIG. 16 (left) show an example of two convolutional layers Conv1 and Conv2 with a kernel of 3×3×48×48. As may be discerned from FIGS. 14 and 16 (left), the respective Conv layer to be updated have no sublayers which are updatable and pre-configured as discussed before and shown in FIGS. 15 and 16 on the right. As a result, the updatable parameters of the updatable layers are the weights being directly updated (referred to weight training). It is noted that, while said weights are subject to changes, the weights may still be pre-configured by pre-training (online or offline training) and hence may be used as initialization parameters for the weights. Another option is to pre-set the weights. Alternatively, the weights may be initialized, for example, randomly. Accordingly, the architecture of the neural network has a low complexity since the updatable layer does not comprise in this case two sublayers arranged in parallel.

According to an implementation, the processing circuitry is further configured to: pre-configure by pre-training, based on the one or more input pictures, the neural network including updating parameters of the one or more pre-configured layers less frequently than the training of the one or more updatable layers; and encode information on the updated parameters of the one or more pre-configured layers into a network bitstream part. The neural network refers here to the existing NN model which exists both at the encoder and decoder side. It is noted that the existing NN model may not imply that said NN is a fixed part of the encoder and decoder in terms of its pre-configured parameters. Rather, the pre-configured parameters may be pre-trained and for that matter re-trained as needed. Hence, pre-training for the purpose of pre-configuring of the one or more pre-configured layers means that said pre-training is performed (offline or online) before the actual training of the NN where updatable parameters of updatable layers are updated. The difference lies in the frequency (i.e. how often over the course of a certain time) the pre-training of the pre-configured parameters is performed. Since the pre-configured parameters are typically more than the updatable parameters, the pre-training is performed less often than the actual NN training. The exiting NN model also could be compressed and transmitted to the decoder, but in a much longer period. For example, the pre-training may use a number of pictures P as 10 or 32, but the pre-training is executed for every 10,000,000 frames. The new existing model (i.e. the newly pre-configured NN) could be transmitted to the decoder. As a matter of course, the pre-training may be applied to the new existing model repeatedly. Accordingly, the actual training of the neural network may be improved by using updated pre-configured parameters. Further, information on the updated pre-configured parameters is encoded in a network bitstream part separate from the other bitstream parts (video, parameter, layer). Hence, information related to less frequently updated pre-configured parameters is separated from information related to more frequently updated updatable parameters.

In another example implementation, the processing circuitry is further configured to: obtain a plurality of sets of pre-configured layers; and select, out of the plurality of sets of pre-configured layers, a set comprising said one or more pre-configured layers of the neural network; wherein the information on the updated parameters is an indication of the selected set. The indication of the selected set may be an index of the respective neural network layers. Alternatively, the indication may be the parameters of the NN. For example, there could be multiple existing NN models N1, N2, . . . , Nj, . . . , $N_M$, among which the encoder may select one model Nj as the existing NN model N (Nj→N). The encoder then sends/transmits, for example, the NN index j to the decoder. The decoder will determine the existing NN model N which will be used based on the index j. Accordingly, the NN training may be adapted to a particular compression task by selecting an existing NN, and hence improves the overall NN training.

In a further example, the selection of the layers and/or updating is performed in different intervals. As discussed above, the selection of layers impacts directly the architecture of the NN in terms of that said layer selection specifies which of the NN layers are actually chosen being updated. In turn, the layer updating after layer selection affects the output response via the updatable parameters, which alter during the NN training. Hence, an interference between layer selection and layer update may be avoided, which improves the performance and robustness of the NN training. Further, the NN training may be adapted according to preferences to either layer selection or layer update.

For example, every P frames will have their corresponding information to update the layers which will be updated. However, P could also vary, even in one video. Assume, for example, a video with 1000 frames (f0, f1, . . . . f999). A first frame set including frames f0 to f10 will have a corresponding information to update the layers, which will be updated. Another frame set including frames f11 to f35 will have another corresponding information to update the layers, which will be updated. Moreover, the layer list updateLayersList could also be changed for different frame set, meaning the updatable layers may be selected based on particular set of frames.

For example, the information on the one or more updatable layers is encoded less frequently than the information on the updated one or more parameters of the one or more updatable layers. This means that the selection of the updatable layer is performed less frequently than the re-training of the parameters of the updatable layer. Accordingly, the NN training may be performed with preference to layer update (i.e. updated parameters) as opposed to layer selection, which may further simplify the NN training.

In terms of the bitstream syntax, such implementation may include indicating the layer bitstream part 1195 less frequently than the parameter bitstream part 1190. For example, the layer bitstream part 1195 may be signaled within a parameter set applicable to a plurality of pictures whereas the parameter bitstream part 1190 may be signaled within a picture header or slice header or generally within a parameter set applicable to less pictures than the parameter set in which the layer bitstream part is signalled. In particular, the layer bitstream part 1195 may be signalled in a sequence parameter set or picture parameter set or video parameter set or the like, whereas the parameter bitstream part 1190 may be signaled in picture header or the like.

In another implementation example, the training is based on a first number of pairs of input pictures and reconstructed pictures; the encoding of the information on the updated one or more parameters is performed after encoding of the first number of input pictures, and the trained neural network is to be applied to a second number of reconstructed pictures; and the second number is larger than the first number. The term number refers to the amount of pairs. The second number of input pictures may include all of the input pictures of the first number of pairs. Alternatively, the second number pairs may include a part of the first number of pairs. Alternatively, the second number pairs may not include the first number of pairs.

For example, assume 100 frames being encoded. The encoder may use frames f0 to f9 to be encoded, and are used for the training of the neural network to get a new model (i.e. a new NN with updated parameters). Then, the new network model may be used as a filter for the following frames, for example, frames f10 to f99, as case of in-loop filter or post filter. However, the new network model may not be applied to frames f0 to f9. Otherwise, even when frame is encoded f0 and transmitted (in the video bitstream part), frame f0 cannot be reconstructed (because without NN filter), and displayed on the decoder side, unless encoding of frame f9 is finished. Then, the NN model could be trained, and the NN model signaled to the decoder side. In this case, the low delay is affected (real-time encoding). In the above example, there is a delay of >10 frames time delay. The encoding (bitstream) order could be as follows: [f0~f9][NN parameters][f11~f99]. In this case, the NN parameters do not need to wait for frames [f11~f99], because the NN parameters could be obtained already after the encoding of frames [f0~f9]. Similar applies for the NN parameter set for frames [f11~f99]. In this case, the quality of frames f0~f9 may be low, but a low delay functionality may be realized. Alternatively, the new network model may be applied to a part of the first set of frames f0 to f9, such as frames f8 and f9. Alternatively, the new network model may be applied to all of the first frame set f0 to f9. As to the decoder side the decompress network model may be applied to the same frames as the encoder side discussed above Otherwise, even when frame f0 is decoded, frame f0 cannot be displayed, unless the NN parameters are available, which will be after f9. The new network model may not be applied to frame f0. In this case, the low delay will be affected (real-time decoding).

Accordingly, the NN training may be performed on a smaller set of input picture pairs while the decoder-side NN may be applied to a larger set of input pictures, and hence accelerates the NN training and make it less complex. Still, there may be a regular adaption to the picture content.

For example, to get information on the updated partial layers, the reconstructed P frames and the original P frames are used. In the decoder, the derived other NN model (i.e. the NN with updated parameters) is applied to the P frames using the decoded information. Note that the derived other NN model could be also used to other frames besides the P frames. For example, assume a video with 1000 frames (f0, f1, . . . , f999). A first frame set including frame f0 to f10 will have a corresponding information to update the layers, which will be updated. In the decoder, the other NN model is derived by using the corresponding information. The other NN model will be applied to another frame set including frames f11 to f35. The other NN model may be even applied to other frame sets, but may be not applied to the frame set including frames f0 to f10.

In one example, the neural network is a neural network trained for post-filtering 2702. FIG. 27 shows an encoder 20 with an in-loop filter 220 and provides output 271 of encoded picture data 21. For this case the CNN filter (i.e. the enhancement filter) may be located outside of the encoder, with the CNN filter taking output 272 as input. The respective output would be the filtered output (option 2). In another example, the neural network is trained to perform one out of in-loop filtering 2701, end-to-end picture coding, adaptive sampling, and coding of picture coding parameters. In this case, the CNN filter may be located to the left of in-loop filter 220 of FIG. 27 taking as input filtered block 221 (option 1). The respective output of the CNN filter would be provided as input to decoded picture buffer 230. The picture coding parameters may include motion vectors, prediction types etc. Accordingly, the same architecture of the neural network may be used to train the NN for different kind of video compression tasks. Hence, the NN training may be performed in a flexible manner and adapted to a variety of tasks.

For example, in case of adaptive spatial sampling for video compression, the reconstructed spatial downsampled video and the original downsampled video (original spatial resolution video) is used as training data to get the information used to update the partial layers which will be updated. The information on the updated parameters will be encoded and transmitted to the decoder. The decoder will decode the information and use it to get the other model. The other model refers to a neural network on the decoder side, which uses the updated parameters. The other model will be used to upsample the decoded low spatial resolution video.

Figure 19:
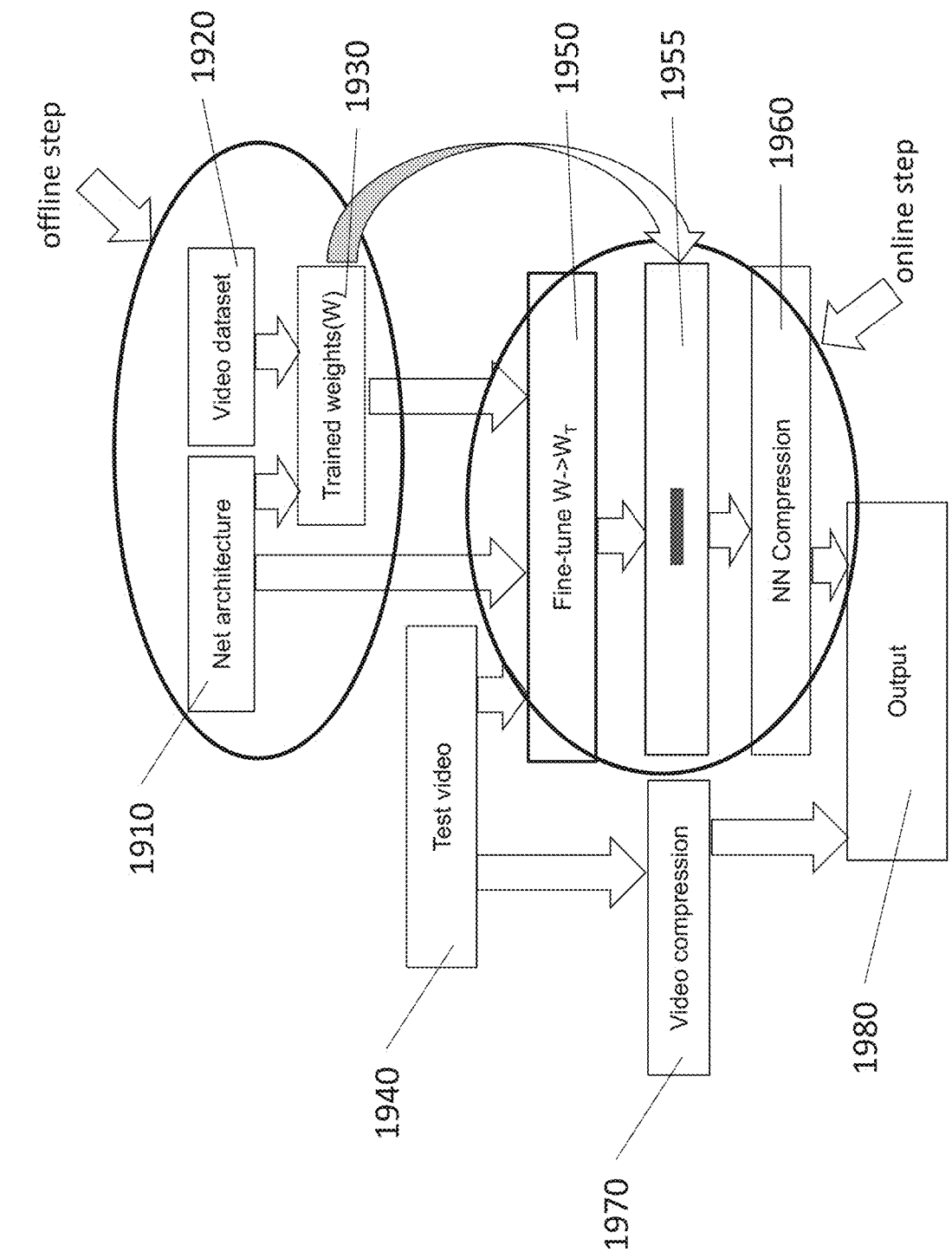
FIG. 19 is an exemplary encoder processing and output, including pre-training of weights by offline training, and an online training for weight fine tuning for the updatable layers, and compression of video and NN.

FIG. 19 exemplifies the above encoder scheme. In the example, an offline step is performed as a kind of pre-processing, and a subsequent online training. Starting with an existing network architecture 1910 (e.g. neural network), a video data set 1920 having multiple input pictures are used to train parameters 1930 of the network. In this example, the updatable parameters (i.e. pre-trained) are the weights. It is noted that these parameters correspond to pre-configured parameters as a result of the offline training. Then, the online training is performed in that the pre-configured (i.e. pre-trained) weights from the offline training are used to fine tune updatable parameters of selected layers of the network 1910, using input pictures of a test video 1940 or current video 1940 (e.g. currently to be coded). In this example, the weights are subjected to fine tuning 1950 and hence subject to update during the online training. The result of the online training are one or more updated parameters (here weights) for the selected updatable layers. In the encoder scheme of FIG. 19, a subtracting operation 1955 is performed where the pre-configured weights (weight references) are subtracted from the trained weights of the updatable layers, providing weight differences. These weight differences refer to the information on the updated parameters, which are encoded (i.e. compressed) 1960 into a parameter bitstream part. Since the value range of the weight differences are typically smaller than the values of the actual weights, the costs for the bits of the weight changes is reduced. Alternatively instead of updated parameters, element-wise differences (minus) between updated parameters and pre-trained parameters are encoded to parameter bitstream. As well, the test video is encoded (i.e. compressed) 1970 into a picture bitstream part. The compressed bitstreams including picture part and parameter part are provided as output 1980. It is noted that the output 1980 may further include an encoded layer bitstream part, which entails information on the selected updatable layers.

According to an embodiment of the present disclosure, an apparatus 2200 is provided for decoding one or more input pictures 1060, 331 including using a neural network. The one or more input pictures may be a still picture or video pictures. A picture (still or video) may include one or more samples (i.e. pixels). Typically, a picture would be a rectangular arrangement of samples. The samples may belong to a single channel such as in a gray-scale image. However, the present disclosure may be equally applied to a plurality of channels such as color channels or other kinds of channels (e.g. depth, motion, or the like). The neural network may be any artificial neural network such as multi-layer perceptron or convolutional neural network or the like. The present disclosure is not limited to any particular neural network architecture. The decoding may be suitable to decode bitstream including the bitstream parts 1180, 1190, 1195 described above as generated by an exemplary encoder.

FIG. 22 shows a block diagram of a decoding apparatus 2200 for decoding the one or more input pictures using a neural network NN. The apparatus 2200 comprises a processing circuitry 2210 configured to decode, from a parameter bitstream part 1220, information on one or more parameters of one or more updatable layers 1310.

The processing circuitry is further configured to: decode, from a picture bitstream part 1210, the one or more input pictures including processing with the neural network. The neural network comprises: the one or more updatable layers 1310 including the decoded one or more parameters; and one or more pre-configured layers 1320 with pre-configured parameters. The decoded one or more parameters may have also pre-trained parameters. The one or more pre-configured parameters may be pre-trained. Thus, updated parameters of the updatable layer(s) are used when decoding the one or more input pictures.

The one or more parameters of the one or more updatable layers may include weights. Alternatively or in addition, said one or more parameters may include a bias applied to the one or more updatable layers. Any other parameter(s) characterizing (configuring) the neural network may be included in the parameter bitstream part. Similar applies for the parameters of the one or more-pre-configured layers, which may be weights, bias, etc.

It is noted that also the pre-configured parameters may change and be subjected to some kind of updating processing. However, this may happen less frequently than for the updatable layers or only at the beginning of a video, or the like. In other words, the pre-configured parameters may be (in some embodiments), but are not necessarily fixed e.g. for the entire video stream.

For example, the pre-configured layers may be pre-configured in that the respective parameters may be obtained by pre-training of the neural network on the encoder side, performed before the encoder-based actual NN training via updating the one or more updatable parameters. The pre-configuring by pre-training may be performed offline. Information on the pre-configured parameters and/or pre-configured layers may be encoded into a network bitstream part, from which the decoder will decode the respective information on pre-configured parameters and/or pre-configured layers. Such information related to pre-configured parameters and/or layers may be provided to and decoded by the decoder less frequently than information on the updated parameters.

Accordingly, the one or more input pictures may be decoded quickly by use of the neural network using updated parameters having an amount less than the amount of the pre-configured parameters. Hence, efficiency of the picture decoding is improved while ensuring a high quality of the decoded pictures as updated NN parameters are used.

According to an implementation example, the decoding of the one or more pictures is performed using the neural network. The picture decoding may be performed with the neural network as applicable for in-loop filtering. Alternatively, the picture decoding may be performed without the neural network and instead using any coding standard including MPEG-1 video, MPEG-2 video, VP8, VP9, AV1, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266, Versatile Video Coding (VVC) and extensions, such as scalability and/or three-dimensional (3D) extensions, of these standards. This picture decoding is suitable for post-filtering.

In an implementation example, the processing circuitry is configured to decode, from a layer bitstream part 1230, information on one or more updatable layers. For example, the information on the one or more updatable layers includes layer indices of the one or more updatable layers, and the layer indices are indices of the one or more updatable layers out of the layers of the neural network indexed according to a pre-set rule.

Figure 12:
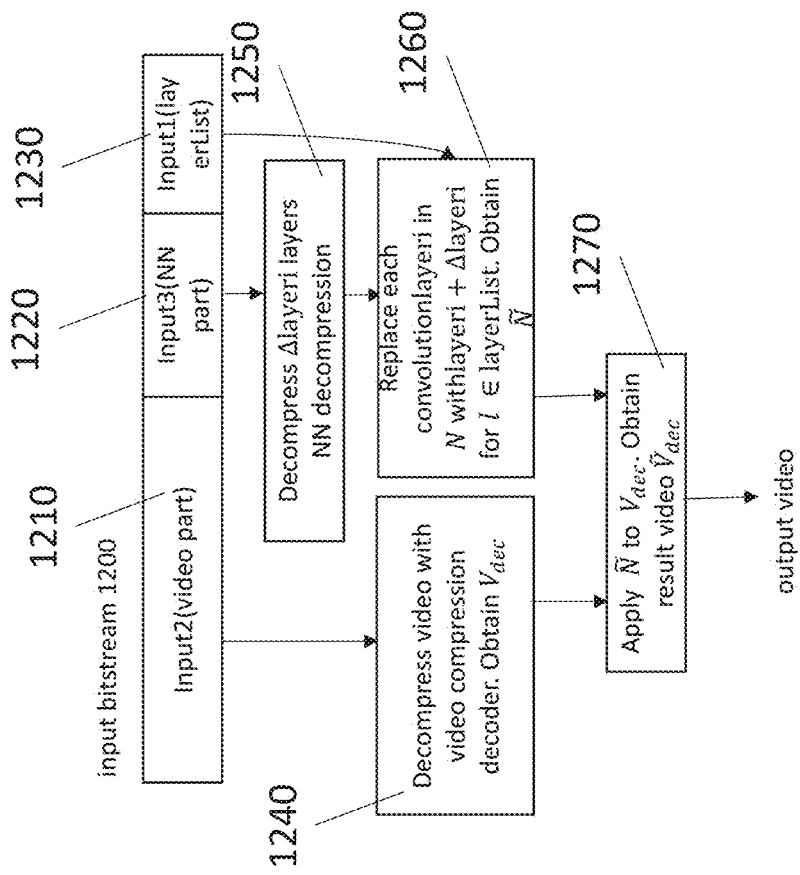
FIG. 12 is a block diagram of an exemplary decoder processing and output.

For example, the pre-set rule of the layer indexing may be a consecutive indexing from the input to the output of the neural network. The parameter bitstream part, the picture bitstream part, and the layer bitstream part may one bitstream, from which the pictures, information on updated parameters, and information on updatable layers may be decoded, as shown in FIG. 12. Alternatively, the video and information (updated parameters, updatable layers) may be decoded separately from the respective bitstream parts. The term bitstream part may also be a bitstream portion. In addition, the information on the one or more updatable layers may include the number (i.e. amount) of the updatable layers whose parameters are to be updated. For example, the number of the updatable layers may be pre-set, and hence already known to the decoder. Accordingly, the decoder may not need to decode information on the updatable layers, and hence reduces the signaling overhead. In turn, if signaled, the overhead for decoding is still reduced as the information relates to the updatable layers as opposed to the whole layers of the neural network. Hence, the bit amount of the layer bitstream part being decoded is small.

In one exemplary implementation of apparatus 2200 shown in FIG. 22, the processing circuitry 2210 may include respective modules for the decoding, such as a decoding module 2216 for decoding from the layer bitstream part information on the updatable layers, a decoding module 2218 for decoding from the parameter bitstream part information on the updated parameters, and a decoding module 2220 for decoding from the picture bitstream part the one or more input pictures.

Moreover, the one or more pre-configured layers 1320 and/or the one or more updatable layers 1310 of the neural network are convolutional layers 1410, 1420. FIG. 2 shows an example of a convolutional layer. In the example, input data 21 has a size of 6×6×3 and convolutional filter 2002 is of size 3×3×3×2. Convolutional filter 2002 could be represented as 2 filters (Filter1, Filter2) of size 3×3×3. Both of them are convolved with input data using the sliding window principle to obtain 4×4 output data 2003. Final output data 2004 have a size 4×4×2 filled with output of 2 filters 2003.

According to an exemplary implementation, an updatable layer 1310, 1620, 1705 has one or more updatable parameters and one or more pre-configured parameters. The processing circuitry is configured to update the one or more updatable parameters of the one or more updatable layers and maintaining the one or more pre-configured parameters.

In other words, the updatable layer has parameters, part of which are updated while the remaining parameters are pre-configured and not subject to changes when decoding the one or more input pictures. This means that, while in general all parameters of the updatable layer may be changed, said parameters of an updatable layer are split into a sub-set of parameters being updated and the other sub-set of parameters retain their parameter value. The maintained pre-configured parameters of the updatable layer may be pre-configured by pre-training on the encoder side. Accordingly, the NN-based picture decoding may be accelerated further as well as the overhead for decoding information on the updated parameters, as not all of updatable parameters of said updatable layer may be updated. Hence, the amount of parameters representing the updated parameter configuration of the NN is further reduced.

Figure 15:
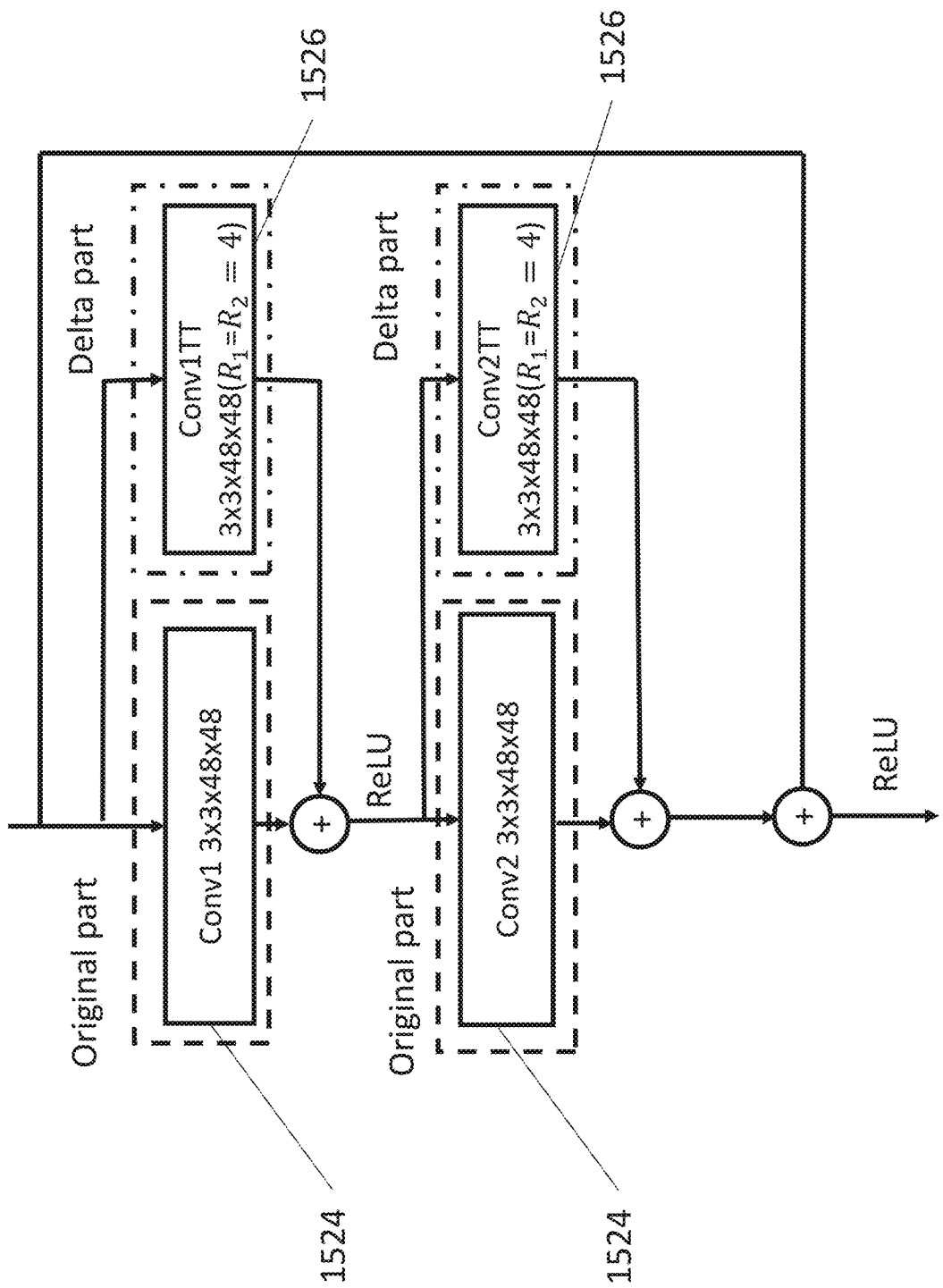
FIG. 15 is a block diagram illustrating an exemplary structure of an updatable layer including a sublayer with parameters, which are not updated during the training and a sublayer with parameters, which are updated during the training.

In an example implementation, the updatable layer 1310, 1620, 1705 comprises an updatable sublayer 1526, 1626, 1720 with weights being the one or more updatable parameters and a pre-configured sublayer 1524, 1624, 1710 with weights being the one or more pre-configured parameters. With reference to FIG. 15 and FIG. 16, the updatable sublayer corresponds to the delta part (i.e. delta layer) and the pre-configured sublayer corresponds to the original part (i.e. original layer). Further, the same input of the updatable layer is provided to the updatable sublayer and to the pre-configured sublayer; and the output of the updatable layer is an elementwise sum 1730 of the output of the updatable sublayer and the output of the pre-configured sublayer. The provision of the same input to both sublayers implies that the updatable sublayer and the pre-configured layer of the updatable layer are in parallel, as shown in FIG. 15 and FIG. 16. Further, the respective output of the sublayers is summed (added). In one example, the element-wise sum may be performed for all elements of the sublayers.

Accordingly, the picture decoding is accelerated, since only weight changes are updated while pre-configured weights are used as reference.

According to an example, the updatable sublayer comprises a sparse neural network layer 3006, 4003, 5010. As a result, the number of the parameters of the updatable sublayer is reduced. For example, the updatable sublayer comprises a tensor train neural network layer 3006, 4003, 5010. The tensor train neural network is an example of a sparse NN. The tensor train NN layer is an example of a lightweighted convolutional layer shown in FIG. 3 and described above.

According to an implementation, the one or more updatable layers are convolutional layers 1003, 3001, 810, 850, 1410, 1420, 1620, 1705; and at least one of the following applies: the updatable sublayer has less parameters than the pre-configured sublayer; the updatable sublayer applies a smaller convolutional kernel than the pre-configured sublayer. Accordingly, the time required for the picture decoding is reduced. Moreover, a smaller convolutional kernel has less updated parameters, and hence reduces the amount data being processed.

In one example implementation, the one or more parameters of the one or more updatable layers include weights of the one or more updatable layers. FIG. 14 and FIG. 16 (left) show an example of two convolutional layers Conv1 1410 and Conv2 1420 with a kernel of 3×3×48×48. As may be discerned from FIGS. 14 and 16 (left), the respective Conv layer to be updated has no sublayers which are updatable and pre-configured as discussed before and shown in FIG. 15 and FIG. 16 on the right. As a result, the updatable parameters of the updatable layers are the weights being directly updated. It is noted that, while said weights are subject to changes, the weights may still be pre-configured by pre-training (online or offline training) on the encoder side. Another option is to pre-set the weights. Accordingly, the architecture of the neural network has a low complexity since the convolutional layer does not comprise in this case two sublayers arranged in parallel.

According to an implementation, the processing circuitry is further configured to: decode, from a network bitstream part, information on updated parameters of the one or more pre-configured layers; and update the pre-configured parameters based on the information on the updated parameters less frequently than the updatable parameters. The neural network refers here to the existing NN model, which exists at the decoder side. For example, the decoder may have 10 layers having fixed pre-configured parameters. Then, only one layer may be updated (retrained) on the encoder side, while the other 9 layers maintain their fixed pre-configured parameters (partial update). Alternatively, all of the parameters of the 10 layers may be retrained on the encode side, which may be performed less frequently (full update). It is noted that the existing NN model may not imply that said NN is a fixed part of the decoder in terms of its pre-configured parameters.

The pre-configured parameters may be pre-trained on the encoder side, and for that matter re-trained as needed. Hence, pre-training for the purpose of pre-configuring of the one or more pre-configured layers means that the updatable parameters may be pre-trained (offline or online) on the encoder side, from which the updated pre-configured parameters are transmitted to the decoder. The decoder then uses the updated parameters to update the parameters of the pre-configured layers. The difference lies in the frequency (i.e. how often over the course of a certain time) the pre-configured parameters are pre-trained. Since the pre-configured parameters are typically more than the updatable parameters, the pre-training is performed less often and hence the updated pre-configured parameters need to be transmitted to the decoder less often. As a result, the decoder needs to decode information on the updated parameters less often. Consequently, the exiting NN model also could be compressed and transmitted to the decoder, but in a much longer period. For example, the pre-training on the encoder side may use a number of pictures P as 10 or 32, but the pre-training is executed for every 10,000,000 frames. Therefore, the new existing model (i.e. the newly pre-configured NN) may be transmitted to the decoder every 10,000,000 frames. Likewise, the decoder needs to decode information on the updated pre-configured parameters for every 10,000,000 frames.

Accordingly, the picture decoding may be improved by using updated pre-configured parameters for the decoder-side NN. Further, information on the updated pre-configured parameters is decoded from a network bitstream part separate from the other bitstream parts (video, parameter, layer). Hence, information related to less frequently updated pre-configured parameters is separated from information related to more frequently updated updatable parameters.

In another implementation, the processing circuitry is further configured to: obtain, from the information on the updated parameters, an indication of a selected set out of a plurality of sets of pre-configured layers, wherein the selected set comprises said one or more pre-configured layers of the neural network. The indication of the selected set may be an index of the respective neural network layers. Alternatively, the indication may be the parameters of the NN. For example, on the encoder side there could be multiple existing NN models N1, N2 . . . Nj, $N_M$, among which the encoder may select one model Nj as the existing NN model N (Nj→N). It is noted that, in this implementation example, the multiple existing NN models exists also on the decoder side. The encoder then sends/transmits, for example, the NN index j (indication) to the decoder. The decoder will determine the existing NN model N, which will be used based on the index j. Accordingly, the decoding may be adapted to a particular compression task by using another existing NN, and hence improves the overall picture decoding.

According to an implementation, the information on the one or more updatable layers is decoded less frequently than the information on the updated one or more parameters of the one or more updatable layers. Accordingly, the decoding may be performed with preference to layer update (i.e. updated parameters) as opposed to layer selection (i.e. updated layer indices), and hence accelerates the picture decoding.

It is noted that the layer update (i.e. updated layer indices) impacts directly the architecture of the decoder NN in terms of that information on the updatable layers specifies which of the decoder NN layers are actually chosen to be updated. In turn, the actual update of the respective parameters affects the output response via the updatable parameters, which may alter more frequently. Hence, an interference between layer update (i.e. updated layer indices) and parameter update may be avoided, improving the performance and robustness of the decoding. Further, the decoding may be adapted according to preferences to either layer update or parameter update. Hence, the decoding may be performed in a flexible manner and adapted to a specific task.

In one implementation example, the neural network is applied for post-filtering 2702. FIG. 25 shows for this case the CNN filter (i.e. the enhancement filter) being located outside of the decoder (option 2). In another example implementation, the neural network is applied for in-loop filtering 2701, picture decoding, adaptive sampling, and decoding of picture coding parameters. FIG. 27 shows for this case the CNN filter being located inside of the decoder (option 1). The picture coding parameters may include motion vectors, prediction types etc. Accordingly, the same architecture of the neural network may be used to decode the input pictures for different kind of video compression tasks. Hence, the decoding may be performed in a flexible manner and adapted to a variety of tasks, including post-filter and in-loop filter.

For example, in case of adaptive spatial sampling for video compression, the reconstructed spatial downsampled video and the original downsampled video (original spatial resolution video) is used as training data to get the information used to update the partial layers which will be updated. The information on the updated parameters will be encoded and transmitted to the decoder. The decoder will decode the information and use it to get the other model. The other model refers to a neural network on the decoder side, which uses the updated parameters. The other model will be used to upsample the decoded low spatial resolution video.

Figure 20:
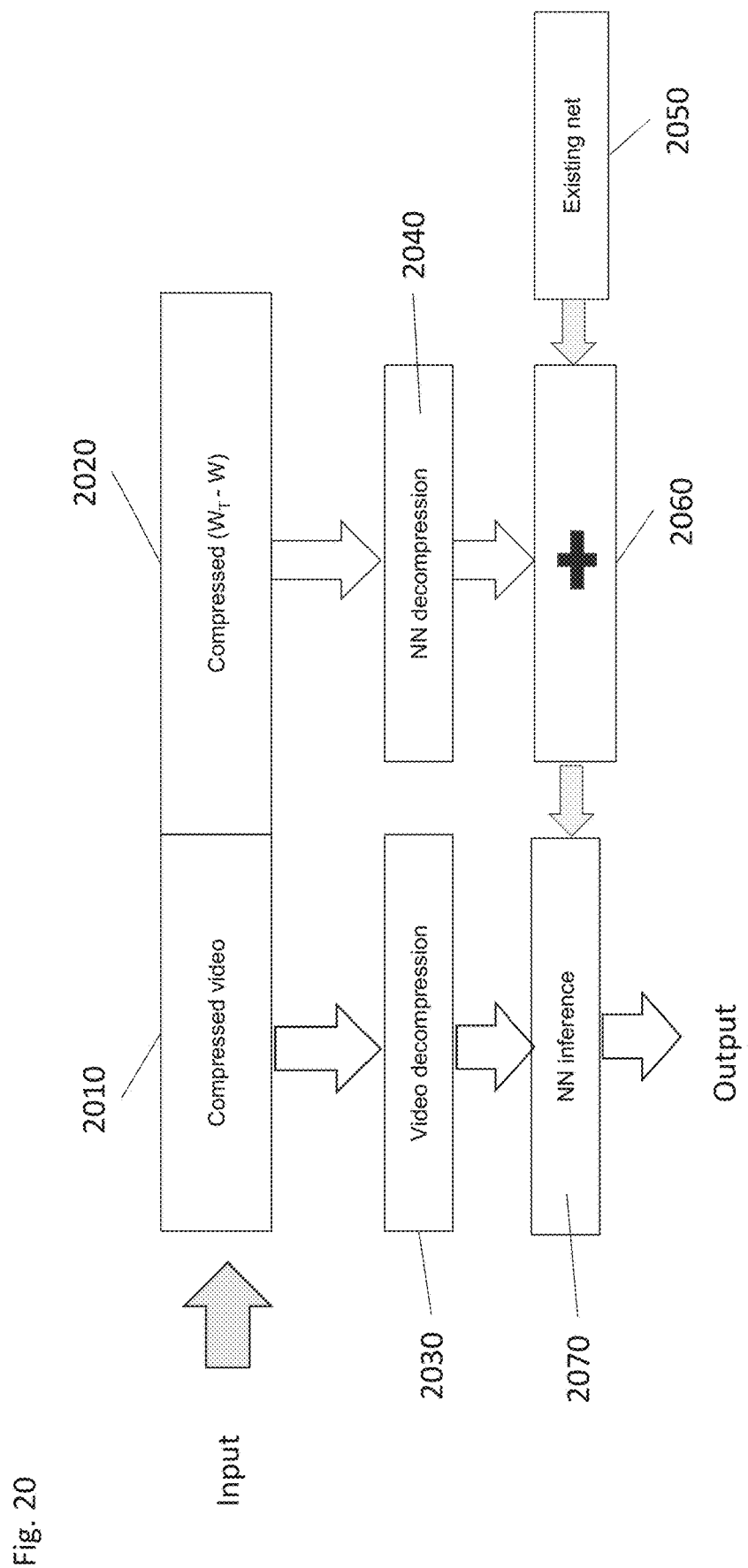
FIG. 20 is an exemplary decoder processing and output, including decompressing the video and the NN.

FIG. 20 exemplifies the above decoder scheme in compliance with the encoder scheme of FIG. 19. In the example, the input comprises the compressed video 2010 (i.e. picture bitstream part) and the compressed weights 2020 (i.e. encoded parameter bitstream part). In the example of FIG. 20, the compressed parameters are weight changes WT-W for the purpose of saving bits as the weight changes have typically a smaller value range than the value range of the actual weights. The video and the updated parameters (e.g. signaled as the weight changes WT-W) are decompressed (decoded) and provide the decoded video 2030 and the decoded updated parameters 2040. In order to update the (existing) decoder-side neural network 2050, the weights of the updatable layers need to be updated. In other words, the existing network updates parameters (e.g. weights) of those layers, which the decoder either already knows as being updatable layers or the decoder knows from information on updatable layers decoded from a layer bitstream part. As noted above, since the updated parameters are weight changes in this example, an (parameter-wise) adding operation 2060 is performed where the changes are added to the (pre-trained) pre-configured weights of the respective updatable layers. The existing neural network 2050 is now updated. Alternatively, if decoded parameter bitstream contains not updated parameters, but element-wise minus of updated parameters and pre-configured parameters, then decoded parameter bitstream element-wise added to pre-trained parameters (2060). The decompressed video bitstream is then processed by the updated neural network for neural network inference 2070, so as to obtain as output 2080 the decoded input pictures.

According to an embodiment of the present disclosure, a method is provided for encoding one or more input pictures 1010, 17 including using a neural network. FIG. 23 shows the respective flowchart, which comprises a step S2310 for selecting, out of layers 1310, 1320 of the neural network, one or more updatable layers 1310. The method comprises further a step S2320 for training, based on the one or more input pictures, the neural network including updating one or more parameters of the one or more updatable layers and maintaining parameters of one or more pre-configured layers 1320 out of the layers of the neural network. Further, a step S2340 for encoding information on the updated one or more parameters of the one or more updatable layers into a parameter bitstream part 1190, and a step S2350 for encoding the one or more input pictures into a picture bitstream part 1180. The encoding method may include further a step S2330 for encoding information on the one or more updatable layers into a layer bitstream part (optional).

The training of the neural network by updating a sub-set of NN parameters of updatable layers having updatable parameters may provide an advantage of accelerating the NN training and hence saving the time costs for NN training. Moreover, the signaling overhead is reduced as information on updated parameters (after the NN training) is encoded. Hence, only a part of the NN parameters is encoded and not the parametrization of the whole network.

According to an embodiment of the present disclosure, a method is provided for decoding one or more input pictures 1060, 331 including using a neural network. FIG. 24 shows the respective flowchart, which comprises a step S2410 (optional) for decoding from a layer bitstream part information on one or more updatable layers. Further comprised is step S2420 for decoding, from a parameter bitstream part 1220, information on one or more parameters of one or more updatable layers 1310. Finally, comprised is a step S2430, for decoding, from a picture bitstream part 1210, the one or more input pictures including processing with the neural network, wherein the neural network comprises: the one or more updatable layers 1310 including the decoded one or more parameters; one or more pre-configured layers 1320 with pre-configured parameters.

Accordingly, the one or more input pictures may be decoded quickly by use of the neural network using updated parameters having an amount less than the amount of the pre-configured parameters. Hence, efficiency of the picture decoding is improved, while ensuring a high quality of the decoded pictures as updated NN parameters are used.

According to an embodiment of the present disclosure, provided is a computer-readable non-transitory medium storing a program, including instructions which when executed on one or more processors cause the one or more processors to perform the method according to any of the previous embodiments.

According to an embodiment of the present disclosure, apparatus is provided for encoding one or more input pictures including using a neural network, the apparatus comprising: one or more processors; and a non-transitory computer-readable storage medium coupled to the one or more processors and storing programming for execution by the one or more processors, wherein the programming, when executed by the one or more processors, configures the encoder to carry out the encoding method.

According to an embodiment of the present disclosure, an apparatus is provided for decoding one or more input pictures including using a neural network, the apparatus comprising: one or more processors; and a non-transitory computer-readable storage medium coupled to the one or more processors and storing programming for execution by the one or more processors, wherein the programming, when executed by the one or more processors, configures the apparatus to carry out the decoding method.

According to an embodiment of the present disclosure, provided is a computer program comprising a program code for performing the method when executed on a computer according to any one of the encoding and/or decoding method.

In the following, an example of post-filter application is discussed in more detail for the encoder decoder whose processing circuitry is configured so to perform the below processing.

FIG. 11 shows a particular detailed and exemplary process performed by the encoder and may be itemized as follows:

Step 1: Obtain 1110 the existing neural network N and the reconstructed data Vrec.

An existing neural network will be denoted as N, which could have convolutional layers {Layer$_0$, Layer$_1$, . . . , Layer$_s$} and pre-trained weights of those layers W={W$_0$, W$_1$, . . . , W$_s$} using a larger dataset in advance. For example, the existing neural network N could be a neural network of classic residual neural networks (Resnet) with totally 20 residual blocks. FIG. 14 describes a residual block scheme. It contains of 2 convolutional layers (conv1 1410, conv2 1420) of size 3×3×48×48, a ReLU layer 1430 after conv1, a skip connection 1440 from input of block to output of conv2 1420, an elementwise sum 1450 of conv2 output and skip connection, and ReLU layer 1460 after element wise sum. In this example, N could have a total of 40 convolutional layers {Layer$_0$, Layer$_1$, . . . , Layer$_{39}$}. The existing neural network N exists in the encoder already. The term existing neural network refers to the neural network that the encoder already implements, it may be pre-trained.

The original P frames (P being an integer number representing the number of frames) will be denoted as V, and are compressed using an existing coding scheme, such as H.266/VVC, H.265/HEVC, and so on. Here, the bitstream of the compressed V (i.e. the picture bitstream part) is denoted as output2. Then, the reconstructed P frames are obtained, which will be denoted as Vrec, as shown in FIG. 11.

Step 2: Determine 1120 the Index of the Layers which Will be Updated.

FIG. 13 shows a neural network having multiple layers, including layers 1310 and layers 1320. Since only a part of the N layers will be updated, it needs to be determined which layers will be updated. In the example shown FIG. 13, layers 1310 are updated, while layers 1320 are not updated. This means that layers 1320 maintain their pre-configured parameters (e.g. weights). The layers to be updated could be configured on the encoder side according to analysis of experimental results or based on experience. For example, the experience may be that updating the middle layers is preferred over updating the front layers or behind layers. For example, in this implementation, N has 40 layers, and if only 4 layers could be updated (this can be adjusted according to the practical scenario, considering the training complexity and the totally layers of the whole network), then 20th, 24th, 26 th, 27 th layers could be updated. Besides, one may use the rate-distortion optimization (RDO) principle to determine which layers will be updated, like:

For Set$_1$, 20th, 21th, 22th, 23th layers as the updated layers, or

For Set$_2$, 20th, 22th, 24th, 26th layers as the updated layers, or

For Set$_3$, 20th, 24th, 26th, 27th layers as the updated layers, or

. . .

Accordingly, each Set$_i$ entails information of the updatable layers of the NN, i being an integer.

For each Set$_i$, the rate distortion cost, Distortion+$\lambda$*Rate, is evaluated as already mentioned above. Here, the Distortion is the distortion of the filtered signal (distance or difference between the filtered signal and the original signal) using the Set$_i$, rate is the number of bits of the bitstream (including the video parts and NN parts and the layerList, as shown in FIG. 11), and $\lambda$ is a coefficient called Lagrange multiplier (in short Lagrangian). It is noted that both Distortion and Rate only can be known in Step3, which means, for each Set$_i$, one needs to execute step3 once. The set$_i$, with the minimum rate distortion cost is the optimal set. For example, if the rate distortion cost of Set$_3$ is minimum, then 20th, 24th, 26 th, 27 th layers will be updated. It is noted that the selection does not have to be performed by applying the RDO. Other optimization may be performed, such as an optimization, which takes into account complexity, e.g. a rate-distortion-complexity optimization, or the like.

Here, the layer index of the layers to be updated could be put into a layer list called updateLayersList. Such a layerList corresponds to information in the one or more updatable layers of the NN. For example, updateLayersList could be {20, 24, 26, 27}. The updateLayersList needs to be transmitted to the decoder if the layer indices change during the training. But, if the index of the layer to be updated remain fixed, then there is no need to transmit the information of the layer list to the decoder side. This implies that the decoder in turn may not need to decode information on the updatable layers. Note that the parameters of said updatable layers (i.e. information on the one or more updated parameters) may still change (update) during the training, and hence are to be transmitted to the decoder. In this implementation, the layer index of the layers to be updated may change, and hence parts of the updatable NN layers may alter. Here, the bitstream of the layer list denoted as output1.

Step3: Derive and Encode 1170 the Information Used to Update the Layers in updateLayersList.

Since only layers with layer index in updateLayersList will be updated, these layers will be retrained, while the others layers not in the updateLayersList their respective weights will be maintained. The weights of the layers with layer index in updateLayersList will be compressed. In this implementation, another method is proposed to represent the layers with layer index in updateLayersList.

Step 3.1 Change 1150 the Architecture of the Layers with Layer Index in updateLayersList, and Get Another Neural Network Ñ

In this sub-step, the architecture of the layers with layer index in updateLayersList will be changed. This is illustrated in FIG. 17, where besides the original part 1710 which is the same as the architecture of the layers in N, there is a so-called delta part 1720 for each layer with layer index in updateLayersList. The original layer 1710 and delta part (delta layer) refer each to a sublayer of the updatable layer. In other words, formally both sublayers belong to a common updatable layer. However, as may be discerned from FIG. 17, the original part and the delta part have the same input, and hence are arranged parallel to each other. This parallel arrangement of the two sublayers may be considered as another neural network Ñ, but still having the same architecture as N, except layers with layer index in updateLayersList. In this implementation example, Every Layer$_i$ 1710 with layer index in the updateLayersList is changed to 3 parts—(Layer$_i$(1), $\Delta$Layer$_i$(2), elementwise_sum(3)). Here, the Layer$_i$ means the original part and $\Delta$Layer$_i$ means the delta part. Layer$_i$ and $\Delta$Layer$_i$ of Ñ have the same input as Layer$_i$ of existing neural network N. The elementwise_sum 1730—means an element-wise sum of Layer$_i$ and $\Delta$Layer$_i$ of another neural network Ñ. Elementwise_sum layer of another neural network Ñ has same output as Layer$_i$ of the existing neural network N.

For example, $\Delta$Layer$_i$ could be a TensorTrain convolutional layer, TTConv, with ($R_1$=$R_2$=4). The parameters $R_1$,$R_2$ have been already explained in the definition section above with reference to FIG. 3. In general, a lower $R_1$,$R_2$ means a less size of the TTConv, but less performance. For example, the residual block of existing neural network N could have a block scheme, which is shown in FIG. 14. While the block scheme of a residual block of another neural network Ñ corresponding to the residual block in N (shown in FIG. 14) is shown in FIG. 15.

Step 3.2 Update 1160 the Weights of the Delta Part of the Layers with Layer Index in updateLayersList in Another Neural Network Ñ.

The weights of the layers of another neural network Ñ are initialized, whose layers with layer index are not in the updateLayersList, by using the weights of the corresponding layers in existing network N. The weights of the original part of the layers another neural network Ñ are initialized which layers with layer index within the updateLayersList, by using the weights of the corresponding layers in existing network N. In turn, the weights of the delta part of the layers with layer index within updateLayersList are initialized by using randomized weights. For example, as shown in FIG. 16, the weights of Conv1 1610 and Conv2 1620 of layers with layer index in the updateLayersList in another neural network Ñ are set as the weights of the layers with layer index in updateLayersList in existing neural network N, while the weights of Conv1TT 1630 and Conv2TT 1640 layers are initialized randomly.

After the initialization, the weights of the delta part of layers with layer index in the updateLayersList in another neural network Ñ are retrained. Here, for the other neural network Ñ, only the weights of the delta part of layers with layer index in the updateLayersList are changeable (i.e. updated) during the retraining (i.e. the training of the neural network), while the other weights of the original part are maintained during the training (i.e. no update). Then, the training of other neural network Ñ is performed by using V and $V_{rec}$. The loss function M could be M=Metric (another network($V_{rec}$),V). Here, the "another network ($V_{rec}$)" means the filtering of Vrec by using another network. The Metric (A, B) means the distance between A and B by using a specific metric, such as a peak signal noise ratio, PSNR, metric, MSSIM metric, VMAF video metric, or any other image/video quality metric. As shown in FIG. 11, $V_{rec}$ is input into the other neural network Ñ, so that Ñ is trained such that the output of Ñ, another network ($V_{rec}$), is as similar as possible to V. As noted before, in this implementation, only the delta part of the layers with layer index in updateLayersList are updated during the training.

Step 3.3 Encode the Weights for the Delta Part of the Layers in updateLayersList in Another Neural Network N.

Figure 18:
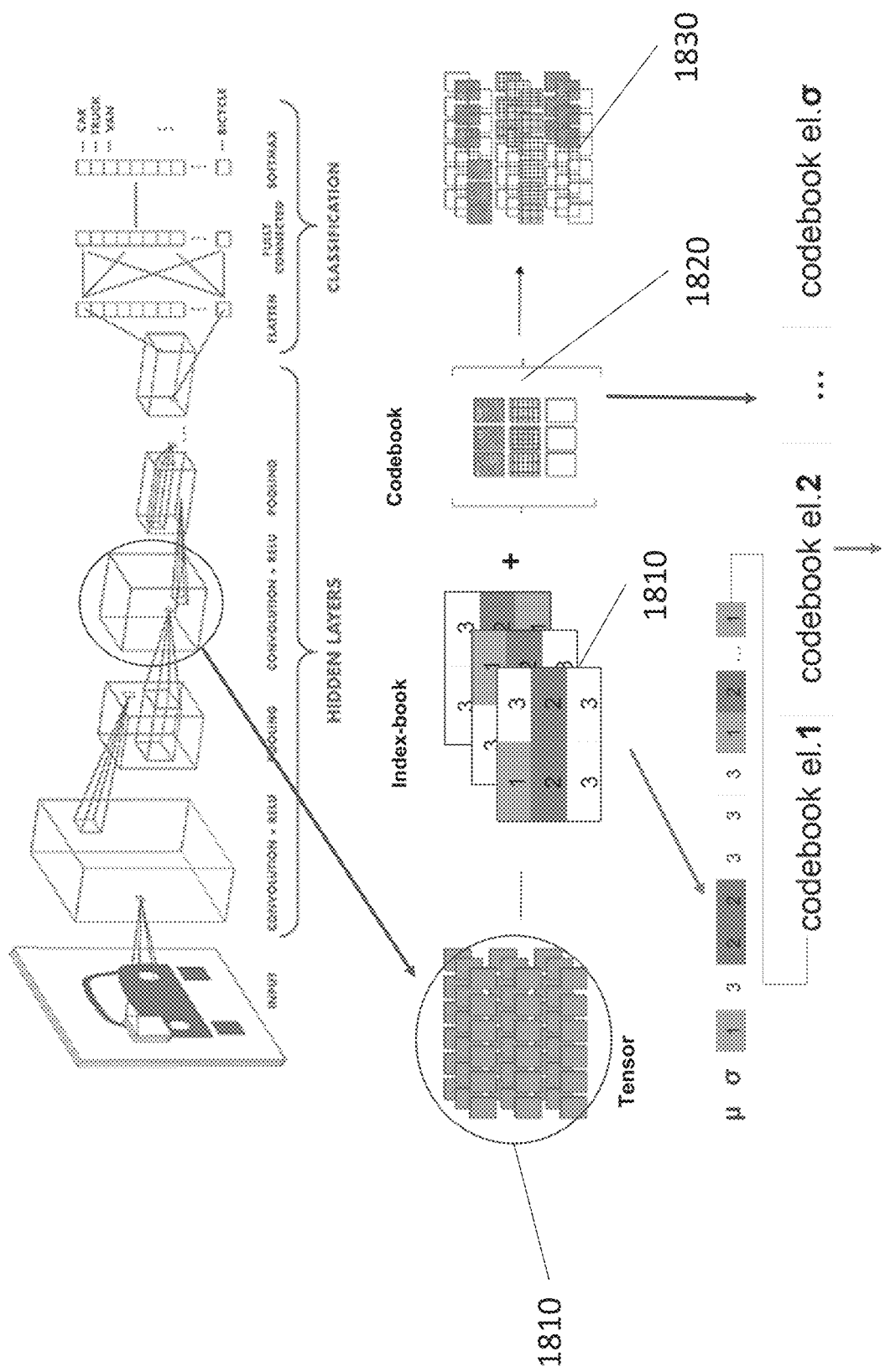
FIG. 18 is an example of dictionary-based compression, employing TensorTrain convolutional layers, TTConv, where the weights of updatable layers are compressed and represented in a codebook and an indexbook.

The weights of the delta part of the layers with layer index in the updateLayersList in Ñ is already updated, and the weights will be then compressed. The bitstream of the compressed of the updated weights of the delta part of the layers with layer index in updateLayersList in Ñ is denoted as output3 (parameter bitstream part), as shown in FIG. 11. For the compression, all of the existing network compression method could be used. FIG. 18 shows an example of a dictionary based compression which may be performed as follows:

1. Select σ—start number of clusters for subtensors clustering. Perform an adaptive-dictionary-based compression of {ΔLayer$_i$} with respect to σ. (FIG. 18). For example, for 4 TTConv layers, an optimal number of clusters is 64.
   (1) Split all tensors in {ΔLayer$_i$( ), 1 from updateLayersList} into tensors 1810 of a predefined size m×n. For example, m=3,n=1. Then, obtain {sub_ΔLayer$_i$( )}. For example, if ΔLayer is TTConv layers with a number of input and output channels equal to 48 and Ranks $R_1=R_2=4$, then conv1 of TTConv layers has a size 1×1×48×16, conv2 has a size 3×3×4×1, conv3 has a size 1×1×4×48. For given parameters, conv1 is split into 16×16=256 sub layers, conv2 is split into 3×4=12 sub layers, conv3 is split into 4×16=64 sub layers. Hence, in total TTConv is split into 256+12+64=332 sub layers. If the total number of ΔLayer is 4, then the total number of sub layers is 332*4=1328.
   (2) Consider each tensor for sub_ΔLayer( ) as an element in $R^{m \times n}$ space, for example, $R^3$ space. Perform clustering (e.g. k-means) with σ centroids. The result is codebook C={$c_i$} 1820, 0<=i<σ and an index book 1820 with pairs of (sub_ΔLayer$_i$( ), relevant code_book element). For example, if the total number of clusters is 64 and the total number of sub layers is 1328, then the codebook C has 64 elements and the index_book has a total of 1328 pairs.
   (3) Change all tensors of ΔLayer$_i$( ) of another network to relevant codebook elements. For example, every subtensor of size 3×1 could be changed to one of 64 codebook elements.
   (4) Measure M̃—performance of another network on $V_{rec}$. For example, M̃=PSNR(another network($V_{rec}$), V). M̃ refers to the performance of the compressed NN.
   (5) If M̃==M, then go to step 6, else set σ=2*σ and go to step 2. If the performance of the compressed NN is similar to the performance of the non-compressed NN, then the proposed compression parameter σ is sufficient to compress the NN without performance loss. If it is not sufficient, then number of clusters needs to be increased.
   (6) Output the codebook and the index_book.
2. Convert neural net to compressed bitstream 1190, 1195
   Input: codebook C={$c_i$}, 0<i<σ and index book with pairs (sub_ΔLayer$_i$( ), relevant code_book element) σ—number of elements in codebook, μ—number of elements in indexbook. For example, assume σ=64, μ=1332.
   (1) calculate the number of bits k, required to store 1 codebook element. For example, if the weights are represented in float32 format, then 32 bits are required. The size of the subtensors is 3×1, so that 32×3=96 bits are needed.
   (2) serialize the codebook into bitstream of length k*σ. For example, for n=32, σ=64 totally 32*64=2048 bits are needed.
   (3) serialize the indexbook into μ*$\log_2$ σ bits. When the codebook has in total 64 elements, then every element requires $\log_2$ 64=6 bits. Therefore, 1332*6=7992 bits needed to store the indexbook.
   (4) put 32 bit values for σ, μ into an bitstream followed by resulting bitstreams from (2) and (3).
   (5) apply any lossless compression to the resulting bitstream (e.g. gzip). The resulting bitstream is output3.

In short, the bitstream will include 3 parts, the bitstream 1180 for the compressed data (like, compressed video) output2, the bitstream 1195 for the layer index of the layers which will be updated (the layer with layer index in updateLayersList) output1, and the bitstream for the compressed weights 1190 of the delta part of the layers which will be updated (the layer with layer index in updateLayersList) output3 (parameter bitstream part).

For the decoder, the following processing shown in FIG. 12 is performed with respect to this implementation example.

For the decoder, the received bitstream will be decoded. Since the bitstream includes 3 parts (here the received parts 1210, 1220, and 1230 correspond to the transmitted parts 1180, 1190, and 1195, respectively), as explained above, all of them will be decoded. The three bitstream parts include the video bitstream part 1210 (input2), the parameter bitstream part 1220 (input3), and the layer bitstream part 1230 (input3). To facilitate the reading, the output$_i$ of the encoder side will be denoted as the input$_i$ on the decoder side, respectively. For example, the bitstream for the compressed video is denoted as Input2 (video bitstream part), the bitstream for the layer index of the layers (i.e. the one or more updatable layers) which will be updated (the layer with layer index in updateLayersList) is denoted as Input1, and the bitstream for the compressed weights (i.e. the one or more updated parameters) of the delta part of the layers which will be updated (the layer with layer index in updateLayersList corresponding to the updatable layers) is denoted as Input3, as shown in FIG. 12.

Step 1: Obtain the Existing Neural Network N and the Decoded Data Vdec 1240.

The existing neural network N is the same as in the encoder, which exist in the decoder already. Accordingly, the existing neural network refers to the neural network having layers, which include one or more pre-configured layers and one or more updatable layers. For example, the neural network may have convolutional layers $\{Layer_0, Layer_1, \ldots, Layer_s\}$ and weights of those layers $W=\{W_0, W_1, \ldots, W_s\}$. For example, since the neural network is the same in the encoder, the existing neural network N could be a neural network of classic residual neural networks (Resnet) with a total of 20 residual blocks, wherein every block as shown in FIG. 14 contains 2 convolutional layers (conv1 1410, conv2 1420) of size 3×3×48×48, a ReLU layer 1430 after conv1 1410, a skip connection 1440 from the input of block to the output of conv2 1420 and ReLU layer 1460 after skip connection 1440. In this example, N could have a total of 40 convolutional layers $\{Layer_0, Layer_1, \ldots, Layer_{39}\}$.

An existing coding scheme may be used to decode the picture bitstream from the compressed video Input2, and get the decoded video Vdec (i.e. the one or more input pictures).

Step 2: Obtain 1250 the Layer Index of the Layers, which Will be Updated.

FIG. 13 shows a neural network having multiple layers, including layers 1310 and layers 1320. Since only a part of the neural network N shown in FIG. 13 will be updated, one needs to obtain or know which layers of the network N will be updated. In the example of FIG. 13, the layers intended to be updated are layers 1310, whereas layers 1320 are intended to be not changed. In other words, layers 1320 maintain their original parameters, which may be pre-configured. In this implementation, the layer index of the layers will be updated (i.e. changed), in which case the bitstream for the layer index of the layers which will be updated will be decoded (i.e. the layer bitstream part). Then, the layer index list updateLayersList will be decoded from the parameter bitstream part including information on the updated parameters for said updatable layers. For example, the updateLayersList could be {20, 24, 26, 27}, in which case it is known that only 20th, 24th, 26th, 27th layers will be updated in the existing neural network N.

Step 3: Decode 1250 the Information Used to Update the Layers with Layer Index in updateLayersList.

Since only the layers with layer index in the updateLayersList will be updated, the weights for the others layers (the layers whose layer index is not in the updateLayersList), will be kept as the same as of the existing neural network N. In other words, the said weights are maintained.

Since in the encoder, the architecture of the layers with layer index in the updateLayersList has been changed (as shown in FIG. 17), only the weights of the delta part 1720 of the layers with layer index are in the updateLayersList are changed. As mentioned before, the delta part of the layers refers to a sublayer of the updatable layer, which has an original part. As FIG. 17 shows, the original part 1710 corresponds to a pre-configured layer. From the parameter bitstream part the compressed weights of the delta part of the layers are decoded, and the respective weights of the delta part are updated (the layer with layer index in updateLayersList). Input3: Here, we will use the corresponding network decompressing method to get those weights in a similar manner as applied in the encoder. An example of a compression scheme based on dictionary-based (de)compression is shown in FIG. 18. In the above example, the dictionary-based-compression was used, which is employed here as well, but for the case of dictionary-based decompression:

(1) Unzip output3.
(2) Apply decompression to unzip the bitstream after lossless compression.
(3) Deserialize the bitstream into σ, μ, the codebook, and the indexbook for every l∈updateLayersList, using the known fixed structure of the bitstream. This means that input1, input2, and input3 are arranged in a certain order in the bitstream.
(4) Construct $\Delta Layer_l( )$ for l∈updateLayersList.

Step 4: Get the Other Neural Network Ñ 1260, Apply Ñ to Vdec 1270.

In the encoder, the architecture of the layers with layer index in updateLayersList is has been changed, as shown in FIG. 17. In this implementation example, the original part (i.e. the sublayer of the updatable layer) is the same as the architecture of the layers in N, while a delta part exists (i.e. sublayer of the updatable layer) for each layer whose layer index is in the updateLayersList. In other words, every Layer$_i$ with layer index in updateLayersList is changed into to 3 parts, namely (Layer$_i$, ΔLayer$_i$, elementwise_sum). It is noted that the original part and the delta part belong to one layer, i.e. the updatable layer. From above Step3, ΔLayer$_i$ is obtained indicating which layers of the existing network N are subject to update. Another neural network Ñ is obtained in so far as the new architecture as the one shown in FIG. 17 is obtained to replace the layer with layer index in updateLayersList in existing neural network N. It is noted that technically there is not actual replacement of said layer. Rather, the decoder has already implemented the updatable layer comprising two sublayers, i.e. the updatable sublayer and the pre-configured sublayer.

In this example, the neural networks are trained for post filter. In this case, the other neural network Ñ will be applied to Vdec to obtain the output video, as shown in FIG. 12.

Since only a part of the layers will be updated, in this implementation, the architecture of the other NN is changed with the existing neural network N, for each layer with layer index in updateLayersList (i.e. updatable layer) comprises besides the original part (pre-configured sublayer) and a delta part (updatable sublayer). In this implementation, a lightweighted convolutional layer based on a TensorTrain convolutional (TTConv) layer is used. A TTconv is an example of a sparse neural network layer. Such a sparse layer provides a less amount of output data. Besides TTConv, other lightweighted convolutional layer scheme also could be used, such as:

MobileNet block
Inverted residual block
Tucker decomposition
Regular convolution with smaller convolutional kernel.

In this implementation, the information used to update the weights of the layers (i.e. information on the one or more updatable parameters) is compressed using a dictionary-based scheme. Besides, a dictionary-based scheme, other kind of neural network compression could be used as well, such as:

Inference time quantization
Train-aware quantization
Train-aware pruning

In the previous discussion of the implementation example, the updatable layer comprised two sublayers, one updatable sublayer and one pre-configured sublayer. In this case, the neural network was trained on the encoder side using pre-configured weights for the pre-configured sublayer and weights for the updatable parameters. In other words, what is updated are actually changes in the weights, using pre-configured weights as reference. This means that the training is performed using residuals of the weights. Accordingly, the respective sublayers are arranged in parallel as FIG. 17 shows by example of original layer 1710 and delta layer 1720. Accordingly, the neural network of the decoder has the same architecture as the encoder, so that the decoder may perform the respective update of those layers in accordance with decoded information on the updated parameters and/or updatable layers.

In the following, another implementation of the encoding and decoding of one or more input pictures is discussed, where the training on the encoder side is performed by updating directly the weights. In this case, the updatable layer may just be one layer without being split into two sublayers.

For the encoder, the respective processing reads as follows:

Step 1: Obtain 1110 the Existing Neural network N and the Reconstructed Data Vrec.

The processing of the encoder is the same as for the implementation case discussed before.

Step 2: Determine 1120 the Index of the Layers (Information of the Updatable Layers) which Will be Updated.

Again, the processing of the encoder is the same as for the implementation case discussed before.

Step 3: Derive and Encode 1170 the Information (Updatable Parameters) Used to Update the Layers in updateLayersList.

Since the architecture will not be changed in the other neural network model Ñ compared with the existing neural network model N, what changes and is subject to update during the training are the weights of the layers with layer index in updateLayersList (i.e. updatable layers).

All the weights of the Ñ are initialized by using the weights of the network N, with the weights of network N being pre-configured. During the training, the weights of those layers whose layer index is in updateLayersList in Ñ could be changed during the retraining, while for the weights of the layers whose layer index is not in the updateLayersList in N are maintained. In other words, the weights of the pre-configured layers retain their respective weights received when initialized.

As mentioned before, the loss function M could be M=Metric (another network($V_{rec}$),V). Here, the "another network ($V_{rec}$)" means the filtering of Vrec by using another network. The Metric(A, B) means the distance between A and B by using a specific metric, such as peak signal noise ratio, PSNR, metric, MSSIM metric, VMAF video metric, or any other image/video quality metric. As shown in FIG. 11, $V_{rec}$ is input into the other neural network Ñ, so that Ñ is trained such that the output of Ñ, "another network ($V_{rec}$)", is as similar as possible to V.

After getting the information used for the updating, the information (i.e. on the updated parameters) will be compressed (e.g. into a parameter bitstream part 1190 in FIG. 11), using existing neural network compression methods, such as the dictionary-based compression. This has been discussed in detail above with reference to FIG. 18. Here, the information is ($W_T$–W), which means, the difference weight value between the weights of the layers with layer index in updateLayersList in Ñ and N. In other words, the newly trained (re-trained weighs WT do not necessarily need to be completely transmitted (but they can in some embodiments). Rather, a difference between the weights W before training and the newly trained weights $W_T$ may be transmitted. Such an approach may lead to less bits necessary to transmit the differences, as they will likely have a smaller value range with higher probability. Thus, a further coding (such as entropy coding) may produce a shorter bitstream.

For the decoder, the respective processing reads as follows:

Step 1: Obtain the Existing Neural Network N and the Decoded Data Vdec 1240.

The processing of the decoder is the same as for the implementation case discussed before.

Step 2: Obtain 1250 the Layer Index of the Layers, which Will be Updated.

Again, the processing of the encoder is the same as for the implementation case discussed before.

Step 3: Decode 1250 the Information Used to Update the Layers with Layer Index in the updateLayersList.

Since only the layers whose layer index is in the updateLayersList will be updated, the weights of those layers whose layer index is not in the updateLayersList) are maintained. In other words, the updatable parameters (weights) of the pre-configured layers are the same as of the existing neural network N.

The corresponding neural network decompression method is used to get the information on the updatable parameters and/or the updatable layers. Similar to the encoder, the dictionary-based compression may be used. Here, the information is ($W_T$–W), which means, the difference weight value between the weights of the layers with layer index in updateLayersList in Ñ and N.

Step 4: Get the Other Neural Network N 1260, Apply N to Vdec 1270.

Compared to the implementation above, the architecture of the neural network does not change in the other neural network model Ñ comparing with the existing NN model N. Hence, the information got from Step3 is used to get the weights of the layers whose layer index is in the updateLayersList by adding the ($W_T$–W) to W in the other neural network model Ñ.

This, specifies the other neural network model Ñ in that the trained weights are used. Then, the other neural network model Ñ is applied to Vdec.

Here, the information used to update the layers in updateLayersList, is ($W_T$–W), which means, the difference weight value between the weights of the layers with layer index in updateLayersList in Ñ and N. In another possible way, the information could also be a weight value of the layers with layer index in the updateLayersList in Ñ, but not the difference value. In other words, $W_T$ will be compressed directly, and in the neural network decompression, the decompressed weights are used as the weights of the layers with layer index in updateLayersList in the other NN model Ñ, directly. For the post filter application scenario, in the encoder, the P frames (P>=1) will be compressed first. For example, assume a video with 1000 frames (f0, f1, . . . . f999), and fi+1 to fi+P will be the P frames. Then, the bitstream for the P frames is obtained, and the reconstructed P frames. Then, an existing network (usually, pre-trained using a larger dataset in advance) needs to be trained by using the original P frames and the reconstructed P frames. Then, the trained network model is compressed and the bitstream of the network model is obtained (network bitstream part). Afterwards, all the bitstream parts are transmitted to the decoder. In the decoder, the P frames are decompressed first, followed by decompressing the network model. The network model is then applied to the decompressed P frames.

In the following, an example is provided for the neural network being trained for post-filter in case of online training by which the neural network may be represented and compressed in an efficient manner.

Taking a CNN filter (online training case) as a post filter for video compression as an example, the method is as follows:

Encoder Side:
1. Obtain an input video V, an existing neural network N, and pre-trained weights W of the neural network N layers
2. Compress the video with the video compression encoder. Obtain the reconstructed video $V_{rec}$ and the video part of the bitstream.
3. Set the layerList—the layerList entails indices of updatable layers, which are a subset of convolutional layers of network N. For example, if Layers=[$Layer_0$, $Layer_1$, ..., $Layer_s$]—list of all convolutional layers of the N, then the layerList could be [$Layer_{lStart}$, ..., $Layer_{lEnd}$], where lStart<lEnd
4. Make the other neural network N with the same architecture as the neural network N, except for those layers from the layerList. Each $Layer_i$ from layersList is changed to 3 parts—($Layer_i$, $\Delta Layer_i$, elementwise_$sum_i$). $Layer_i$ and $\Delta Layer_i$ of another neural network have a similar input as $Layer_i$ of the existing neural network. The elementwise_$sum_i$—is an elementwise sum of $Layer_i$ and $\Delta Layer_i$. The elementwise_$sum_i$ layer of another neural network has a similar output as $Layer_i$ of the existing neural network
5. Initialize ΔLayer weights with random values.
6. Train the other neural network (i.e. the network with the updatable layers being sublayers including $Layer_1$ and $\Delta Layer_i$) on the input video V and reconstructed video $V_{rec}$ with updating only the weights of the ΔLayer layers.
7. Take the ΔLayer layers from the other neural network and perform adaptive neural network compression with one of the neural network compression methods. Obtain the neural network part from bitstream (network bitstream part).
8. Transmit the video part of the bitstream, neural network part of bitstream and layerList.

Decoder Side:
1. Decompress the video part with the video compression decoder. Obtain $V_{dec}$
2. Decompress ΔLayer layers with NN decompression method.
3. Make the other neural network Ñ with the same architecture as the neural network N, except for those layers whose index is in the layerList. Each $Layer_i$ from the layersList is changed to 3 parts—($Layer_i$, $\Delta Layer_i$, elementwise_$sum_i$). $Layer_i$ and $\Delta Layer_i$ of the other neural network Ñ have a similar input as $Layer_i$ of the existing neural network. elementwise_$sum_i$—is elementwise_sum of $Layer_i$ and $\Delta Layer_i$. elementwis-e_$sum_i$ layer of the another neural network N has a similar output as $Layer_i$ of existing neural network.
4. Perform inference using the other neural network Ñ on $\tilde{V}_{dec}$. Obtain result video $\tilde{V}_{dec}$.

The respective representation of the processing flow according to the present disclosure is shown in FIG. 11 and FIG. 12.

For the ΔLayer layer, use a lightweighted convolutional operations—for example a tensor train, TTConv, layer 3006, as shown in FIG. 3, for example.

The proposed method allows to minimize the model transmission cost due to the small number of parameters of the lighweighted convolution and neural network compression.

Another advantage of this method is the possibility of adaptive neural network compression, based on feedback from the inlined decoder in the encoder.

A further advantage of the approach is a flexible choice of updatable parameters and neural network compression parameters, such as:
  Parameter layerList, which define convolutional layers used for content adaptation
  Parameters of lightweighted convolutions, such as ranks of the tensor decomposition
  Parameters of the neural network adaptation frequency like:
    How many frames per 1 adaptation used
    Policy of adaptation
      Scene change
      Required delay One important factor in video compression may be compression speed, and hence relates directly to the online training time of the neural network training. The embodiments and implementation examples of the present disclosure allow to minimize the online training time cost by minimizing the number of updated parameters—only small number of parameters updated. Otherwise, the training time is flexible and could be adjusted in accordance to a particular compression task.

The choice of optimal content adaptation parameters could be done by trying several predefined sets of parameters and the usage of the principle of rate distortion optimization (RDO).

For example, the Delta online training shows a stable compression saving in compared to an offline training scenario The online training-based compression method according to the present disclosure could also be used in CNN loop filter, or other video compression modules, such as the deep-learning-based intra prediction, or deep-learning-based inter prediction, or deep-learning-based adaptive sampling.

The above discussion of the encoding and decoding was made with reference to one or more pictures, with said pictures being still pictures or video. The pictures/video are just one example of data where the above detailed embodiments and implementation examples may be applied. The provided apparatus(es) and method(s) for online training may be applicable to other data compression tasks, including audio compression, 3D data (like point cloud, mesh) compression. Moreover, the data compression scheme may be used in video compression, like loop filter, post filter, intra-prediction, inter-prediction, entropy coding, or other module. Here, the post filter in video compression has been described mainly, for a typical application example. However, the proposed online training based data compression scheme could be applied to other modules or other tasks.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments.

The terminology of "units" is merely used for illustrative purposes of the functionality of embodiments of the encoder/decoder and are not intended to liming the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, optical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, the functional units in the embodiments may be integrated into one processing unit, or each of the units may exist alone physically, or two or more units are integrated into one unit.

Some further implementations in hardware and software are described in the following.

In the following embodiments of a video coding system 10, a video encoder 20 and a video decoder 30 are described based on FIGS. 28 and 29, with reference to the above mentioned FIGS. 25 and 26.

Figure 28:
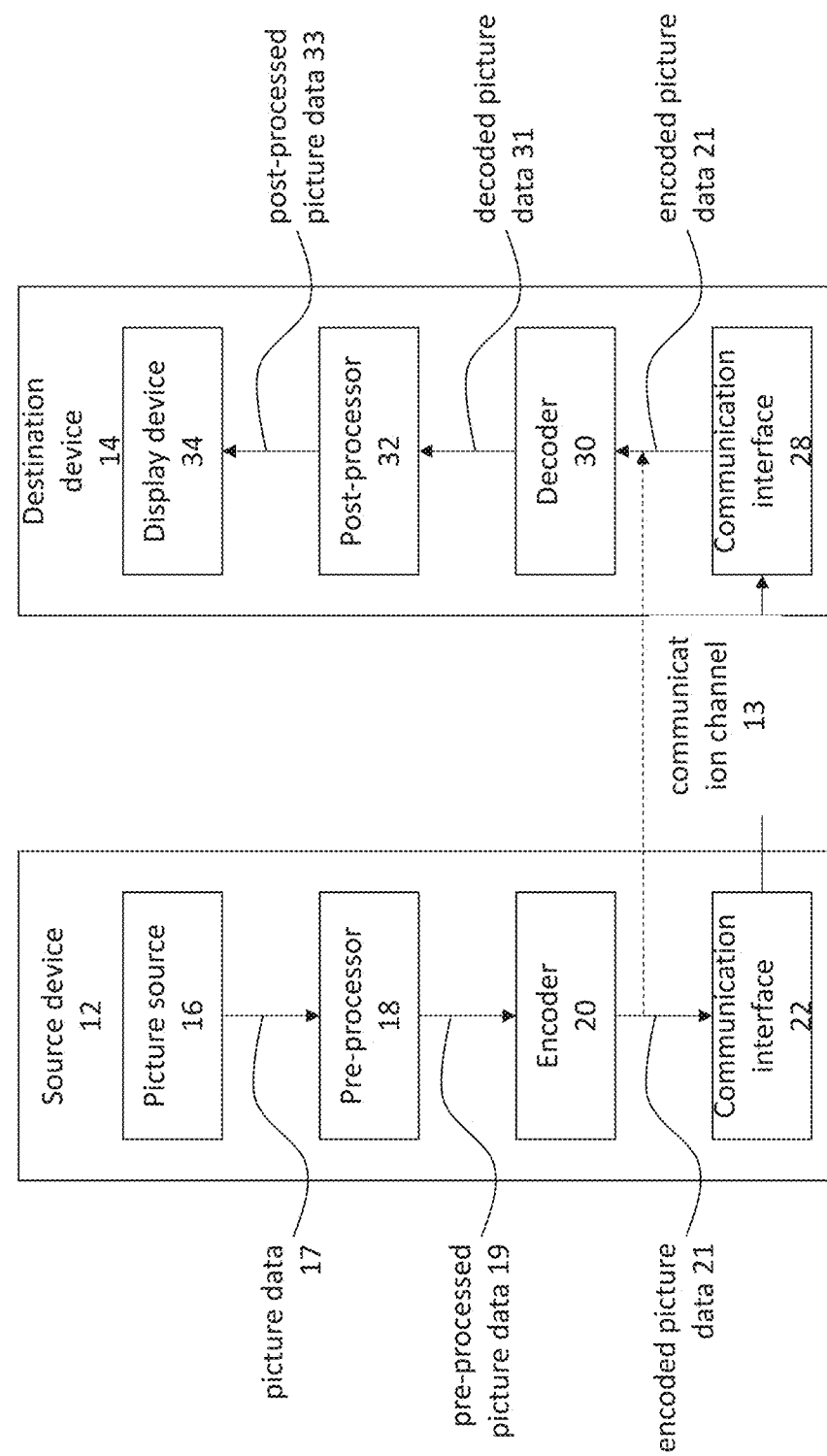
FIG. 28 is a block diagram showing an example of a video coding system configured to implement embodiments of the present disclosure.
Figure 29:
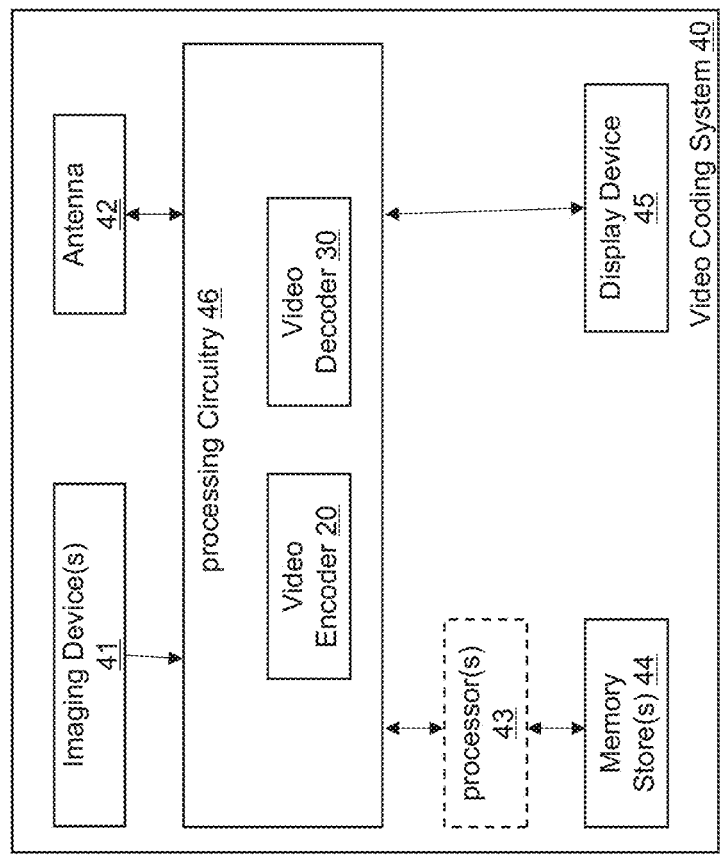
FIG. 29 is a block diagram showing another example of a video coding system configured to implement embodiments of the present disclosure.

FIG. 28 is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 28, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details were described above, e.g., based on FIG. 25, which may be further modified by replacing the loop filter with a loop CNN filter similarly as done in FIG. 27 for the decoder).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 28 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details were described above, e.g., based on FIG. 26 or FIG. 27).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 28 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 28 may vary depending on the actual device and application.

Figure 31:
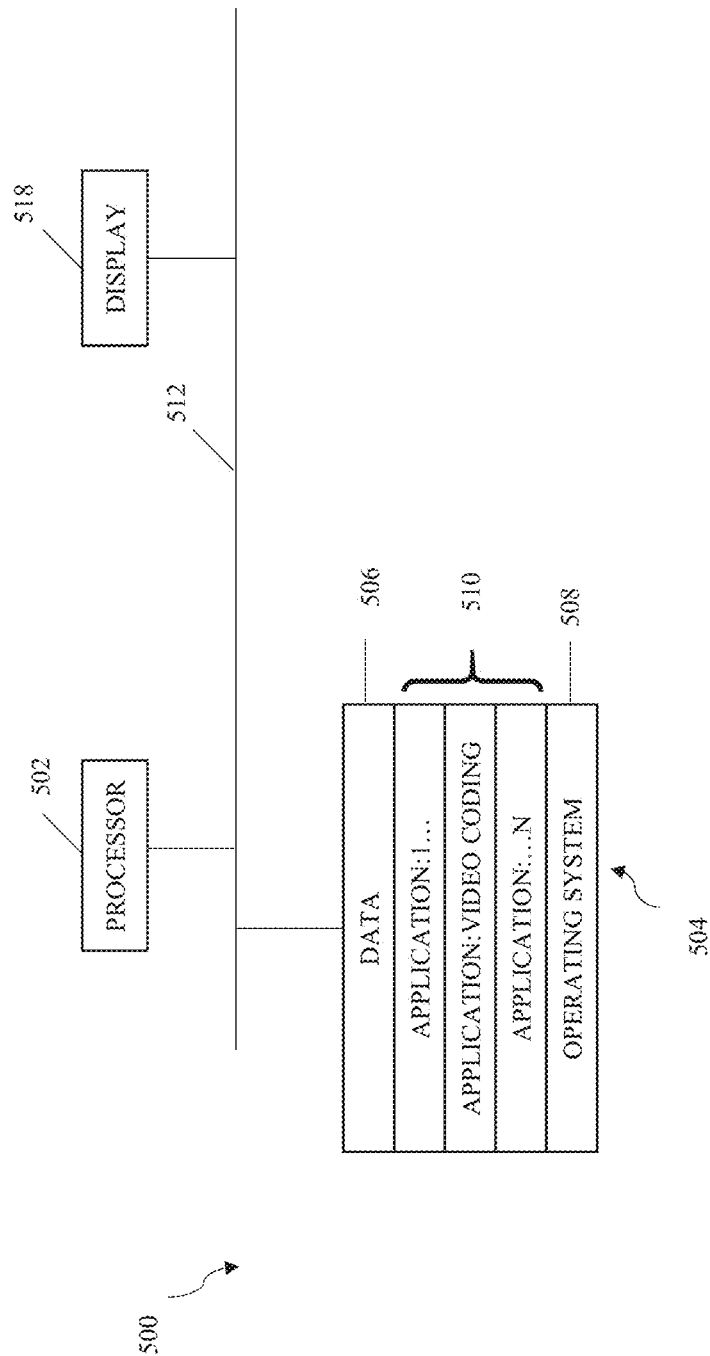
FIG. 31 is a block diagram illustrating another example of an encoding apparatus or a decoding apparatus.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 25 and/or any other encoder system or subsystem described herein. The decoder 30 may be implemented via processing circuitry 46 to embody the various modules as discussed with respect to decoder 30 of FIG. 26 (or FIG. 27) and/or any other decoder system or subsystem described herein. The processing circuitry may be configured to perform the various operations as discussed later. As shown in FIG. 31, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 29.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 28 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Figure 30:
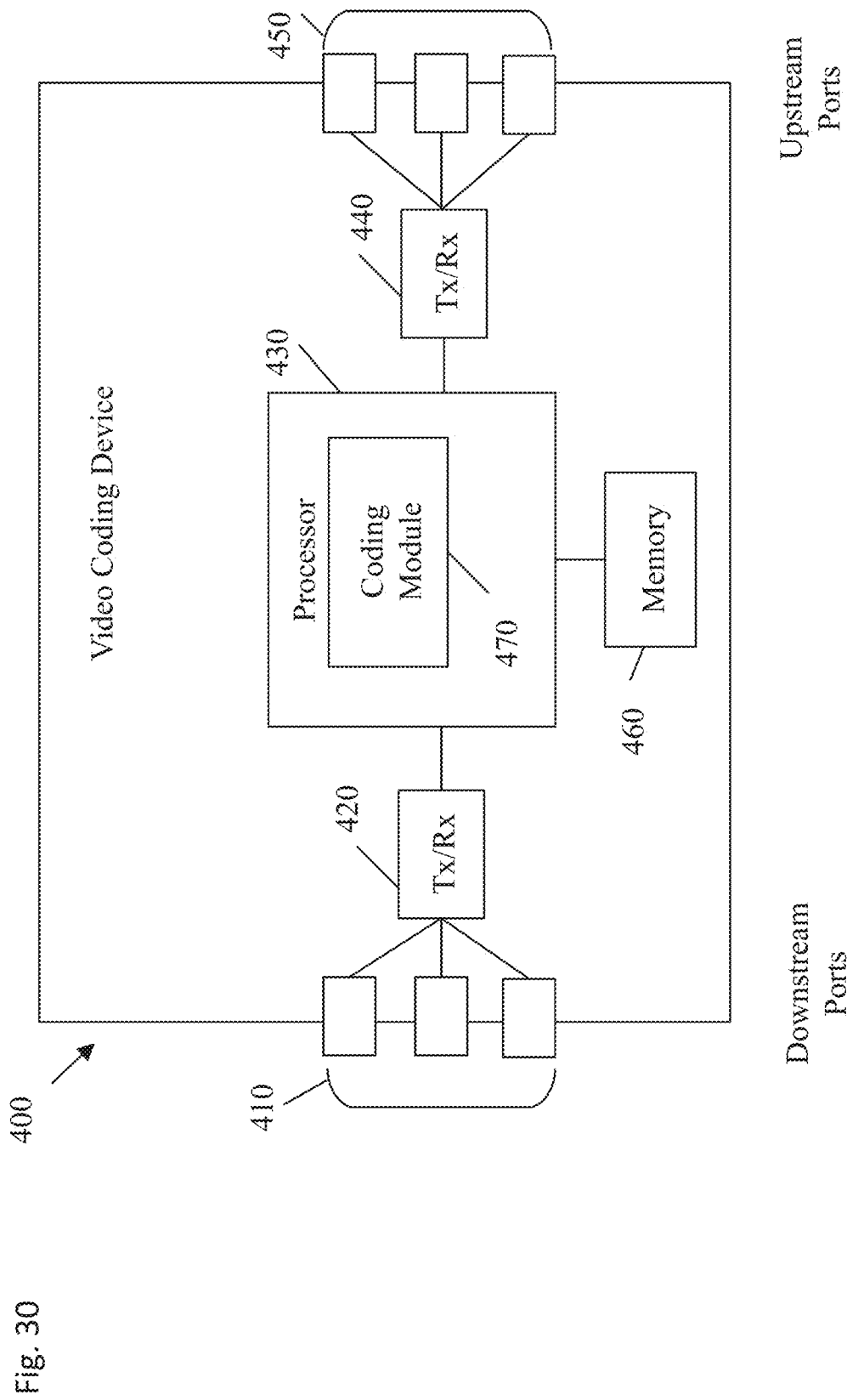
FIG. 30 is a block diagram illustrating an example of an encoding apparatus or a decoding apparatus.

FIG. 30 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 28 or an encoder such as video encoder 20 of FIG. 28.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 31 is a simplified block diagram of an apparatus 500 that may be used as either or both of the source device 12 and the destination device 14 from FIG. 28 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described herein, including the encoding and decoding using a neural network with a subset of partially updatable layers.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Although embodiments have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Summarizing, the present disclosure relates to encoding and decoding of a picture or a plurality of pictures (e.g. video) using a neural network which is partially trained online. Accordingly, at an encoder one or more layers are selected which are to be trained. Then, the training of the neural network is performed in which parameters of the selected layers are updated. The parameters of the remaining layers are maintained and not updated. The updated parameters are provided within a bitstream. The picture(s) is/are also encoded. The decoder receives an indication of the updated parameters, updates only those parameters indicated, and applies the so obtained neural network.

What is claimed is:

1. An apparatus for encoding input pictures, the encoding including using a neural network, the apparatus comprising:
    processing circuitry configured to:
    select, based on rate distortion optimization (RDO) for one or more of the input pictures, one or more updatable layers of the neural network;
    train, using one or more of the input pictures, the neural network by updating one or more parameters of the one or more selected updatable layers while maintaining parameters of unselected layers of the neural network;
    encode information on the updated one or more parameters of the one or more selected updatable layers into a parameter component of a bitstream; and
    encode the input pictures into a picture component of the bitstream,
    wherein an updatable layer has one or more updatable parameters and one or more pre-configured parameters; and
    wherein the processing circuitry is configured to train the neural network by updating the one or more updatable parameters of the one or more updatable layers and maintaining the one or more pre-configured parameters.

2. The apparatus according to claim 1, wherein the processing circuitry is configured to encode information on the one or more selected updatable layers into a layer component of the bitstream.

3. The apparatus according to claim 2, wherein the information on the one or more selected updatable layers includes layer indices of the one or more selected updatable layers, and
    wherein the layer indices are indices specified according to a pre-set rule.

4. The apparatus according to claim 1,
    wherein the updatable layer comprises an updatable sublayer, with weights being the one or more updatable parameters, and a pre-configured sublayer, with weights being the one or more pre-configured parameters,
    wherein the same input of the updatable layer is provided to the updatable sublayer and to the pre-configured sublayer, and
    wherein an output of the updatable layer is an element-wise sum of the updatable sublayer and the pre-configured sublayer.

5. The apparatus according to claim 4, wherein the processing circuitry is configured to update the one or more updatable parameters by a training method less complex than a training method used to train the one or more pre-configured parameters,
    wherein the one or more updatable layers are convolutional layers; and
    wherein at least one of the following:
        the less complex training processes less parameter updates than the training method used to train the one or more pre-configured parameters; and/or
        the less complex training updates a smaller convolutional kernel than the training method used to train the one or more pre-configured parameters.

6. The apparatus according to claim 3, wherein the processing circuitry is configured to:
    train the neural network by updating the one or more parameters of the one or more selected updatable layers by: pseudo-randomly initializing the one or more parameters and perform the training using pairs of an original picture and a reconstructed picture.

7. The apparatus according to claim 1, wherein the processing circuitry is configured to train the neural network by updating the one or more parameters of the one or more selected updatable layers using pairs of an original picture and a reconstructed picture.

8. The apparatus according to claim 1, wherein the processing circuitry is further configured to:
    pre-configure by pre-training, based on the one or more input pictures, the neural network including updating parameters of the one or more pre-configured layers less frequently than the training of the one or more updatable layers; and
    encode information on the updated parameters of the one or more pre-configured layers into a network component of the bitstream,
    obtain a plurality of sets of pre-configured layers, and
    select, out of the plurality of sets of pre-configured layers, a set comprising said one or more pre-configured layers of the neural network,
    wherein the information on the updated parameters is an indication of the selected set.

9. The apparatus according to claim 1, wherein the processing circuitry is configured to perform the selection of the one or more updatable layers and the updating of the one or more parameters of the one or more selected updatable layers at different intervals.

10. The apparatus according to claim 1, wherein information on the one or more updatable layers is encoded less frequently than the information on the updated one or more parameters of the one or more updatable layers.

11. The apparatus according to claim 1, wherein the training is based on a first number of pairs of input pictures and reconstructed pictures:
    wherein the encoding of the information on the updated one or more parameters is performed after encoding of the first number of input pictures, and the trained neural network is to be applied to a second number of reconstructed pictures; and
    wherein the second number is larger than the first number.

12. The apparatus according to claim 1, wherein the processing circuitry is configured to select, based on the rate distortion optimization (RDO) for one or more of the input pictures, the one or more updatable layers of the neural network by optimizing a cost function including at least one of rate, distortion, and complexity.

13. An apparatus for decoding input pictures using a neural network, the apparatus comprising:
processing circuitry configured to:
decode, from a parameter component of a bitstream, one or more parameters of one or more selected updatable layers; and
decode, from a picture component of the bitstream, the input pictures, wherein the decoding includes processing with the neural network,
wherein the neural network comprises:
the one or more selected updatable layers that include the one or more decoded parameters, and
unselected layers with pre-configured parameters,
wherein the one or more selected updatable layers are determined by an encoder via rate distortion optimization (RDO) for one or more of the input pictures,
wherein an updatable layer has one or more updatable parameters and one or more pre-configured parameters, and
wherein the processing circuitry is configured to update the one or more updatable parameters of the one or more updatable layers and maintain the one or more pre-configured parameters.

14. The apparatus according to claim 13, wherein the processing circuitry is further configured to decode, from a layer component of the bitstream, information on the one or more selected updatable layers.

15. The apparatus according to claim 14, wherein the information on the one or more selected updatable layers includes layer indices of the one or more selected updatable layers; and
wherein the layer indices are specified according to a pre-set rule.

16. The apparatus according to claim 13, wherein the updatable layer comprises an updatable sublayer with weights being the one or more updatable parameters and a pre-configured sublayer with weights being the one or more pre-configured parameters:
the same input of the updatable layer is provided to the updatable sublayer and to the pre-configured sublayer; and
the output of the updatable layer is an elementwise sum of the updatable sublayer and the pre-configured sublayer.

17. The apparatus according to claim 16, wherein the updatable sublayer comprises one or more of a sparse neural network layer and a tensor train neural network layer.

18. The apparatus according to claim 16, wherein the one or more updatable layers are convolutional layers; and
wherein at least one of the following:
the updatable sublayer has less parameters than the pre-configured sublayer; and/or
the updatable sublayer applies a smaller convolutional kernel than the pre-configured sublayer.

19. The apparatus according to claim 13, wherein the processing circuitry is further configured to:
decode, from a network component of the bitstream, information on updated parameters of the one or more pre-configured layers;
update the pre-configured parameters based on the information on the updated parameters less frequently than the updatable parameters; and
obtain, from the information on the updated parameters, an indication of a selected set out of a plurality of sets of pre-configured layers, wherein the selected set comprises said one or more pre-configured layers of the neural network.

20. A method for encoding input pictures using a neural network, the method comprising:
selecting, based on rate distortion optimization (RDO) for one or more of the input pictures, one or more updatable layers of the neural network;
training, using one or more of the input pictures, the neural network by updating one or more parameters of the one or more selected updatable layers while maintaining parameters of unselected layers of the neural network;
encoding information on the updated one or more parameters of the one or more selected updatable layers into a parameter component of a bitstream; and
encoding the input pictures into a picture component of the bitstream,
wherein an updatable layer has one or more updatable parameters and one or more pre-configured parameters; and
wherein the training the neural network comprises updating the one or more updatable parameters of the one or more updatable layers and maintaining the one or more pre-configured parameters.

21. A method for decoding input pictures using a neural network, the method comprising:
decoding, from a parameter component of a bitstream, one or more parameters of one or more selected updatable layers; and
decoding, from a picture component of the bitstream, the input pictures including processing with the neural network,
wherein the neural network comprises:
the one or more selected updatable layers that include the one or more decoded parameters, and
unselected layers with pre-configured parameters, and
wherein the one or more selected updatable layers are determined by an encoder via rate distortion optimization (RDO) for one or more of the input pictures,
wherein an updatable layer has one or more updatable parameters and one or more pre-configured parameters, and
wherein the processing circuitry is configured to update the one or more updatable parameters of the one or more updatable layers and maintain the one or more pre-configured parameters.

22. A non-transitory computer-readable medium having stored thereon processor-executable instructions that, when executed by one or more processors, cause the one or more processors to perform the method according to claim 20.

* * * * *